(12) United States Patent
Mihara

(10) Patent No.: US 7,085,071 B2
(45) Date of Patent: Aug. 1, 2006

(54) ZOOM LENS

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 86 days.

(21) Appl. No.: 10/638,308

(22) Filed: Aug. 12, 2003

(65) Prior Publication Data

US 2004/0051960 A1 Mar. 18, 2004

(30) Foreign Application Priority Data

Aug. 29, 2002 (JP) .............................. 2002-251248

(51) Int. Cl.
*G02B 15/14* (2006.01)
*G02B 17/00* (2006.01)

(52) U.S. Cl. ..................... 359/687; 359/678; 359/726

(58) Field of Classification Search ................ 359/687, 359/678, 683–685, 726–736
See application file for complete search history.

(56) References Cited

U.S. PATENT DOCUMENTS

| 5,920,428 A | * | 7/1999 | Kim | ........................... 359/432 |
|---|---|---|---|---|
| 5,978,150 A | * | 11/1999 | Hamanishi et al. | .......... 359/683 |
| 6,124,987 A | | 9/2000 | Kayanuma et al. | ......... 359/692 |
| 6,259,564 B1 | * | 7/2001 | Kamo | ........................ 359/627 |
| 6,308,011 B1 | | 10/2001 | Wachi et al. | .................. 396/72 |
| 6,587,281 B1 | * | 7/2003 | Hozumi et al. | ............. 359/687 |
| 6,754,446 B1 | * | 6/2004 | Hagimori et al. | ............. 396/72 |
| 2003/0206352 A1 | * | 11/2003 | Mihara et al. | .............. 359/684 |

FOREIGN PATENT DOCUMENTS

| JP | 09-211287 | | 8/1997 |
|---|---|---|---|
| JP | 11-194274 | | 7/1999 |
| JP | 2004070235 A | * | 3/2004 |

\* cited by examiner

*Primary Examiner*—Scott J. Sugarman
(74) *Attorney, Agent, or Firm*—Kenyon & Kenyon

(57) ABSTRACT

A zoom lens includes a first lens unit fixed when the magnification of the zoom lens is changed and at least two positive lens units arranged on the image side of the first lens unit so that relative spacings between individual lens units are varied when the magnification is changed. The first lens unit has a prism containing a reflecting surface at the most object-side position, the entrance surface of the prism is configured as a concave surface directed toward the object side, and the concave surface is an aspherical surface that divergence is impaired progressively in separating from the optical axis.

18 Claims, 48 Drawing Sheets

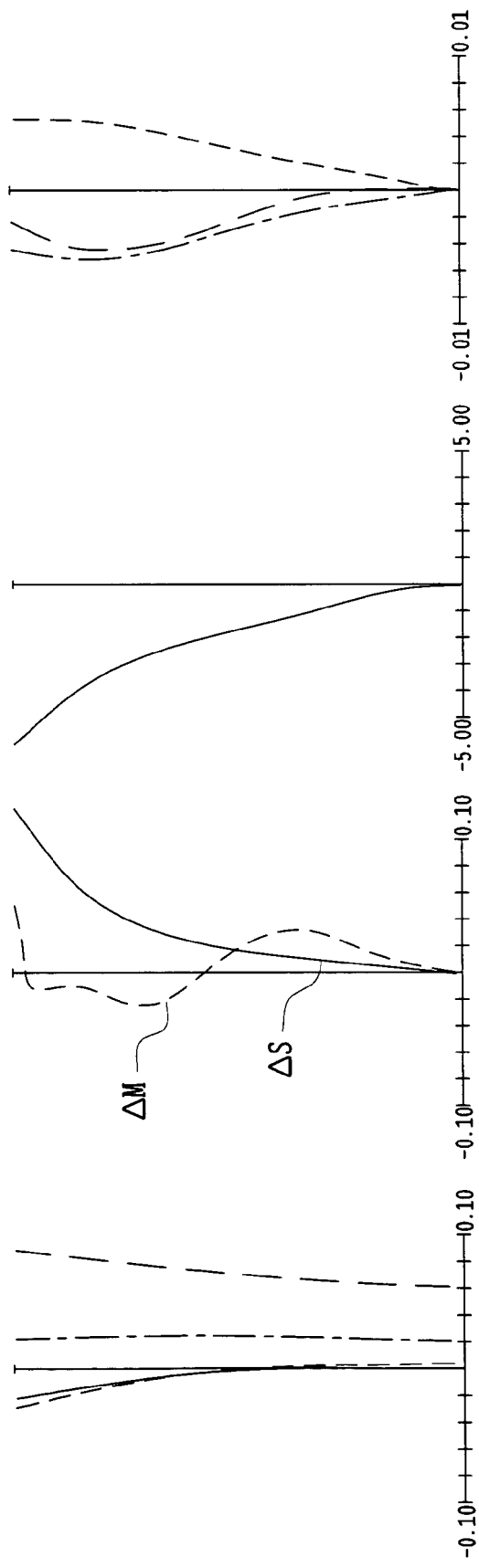

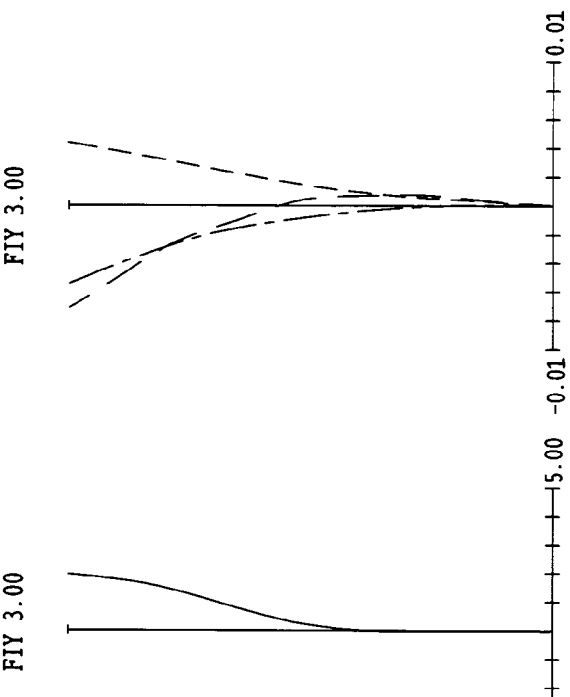

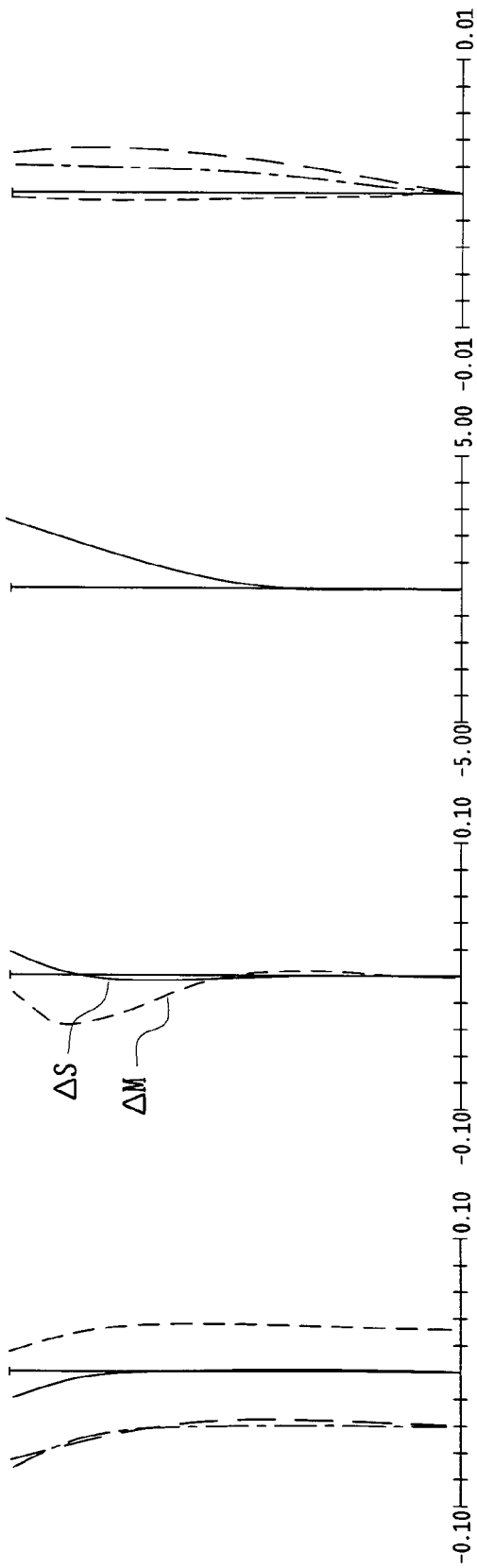

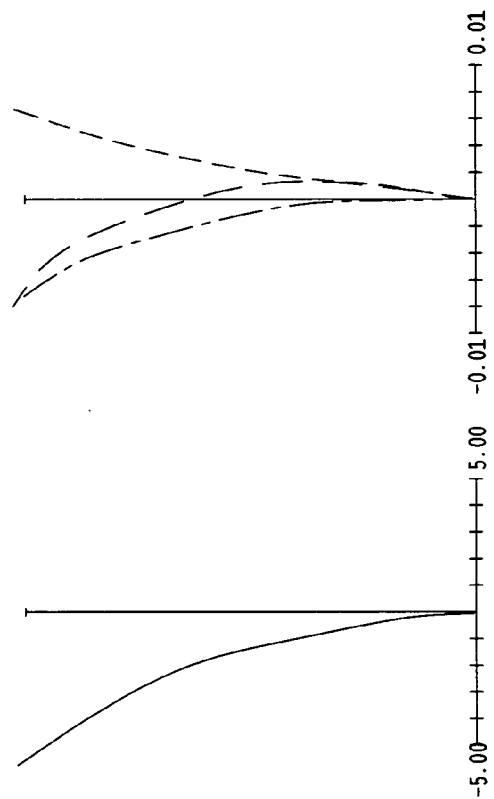

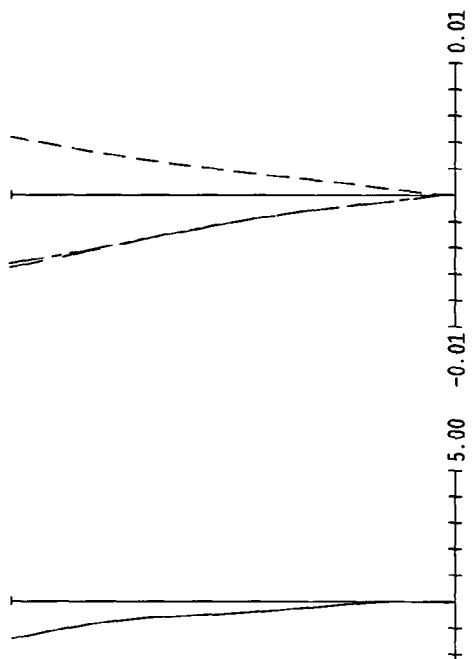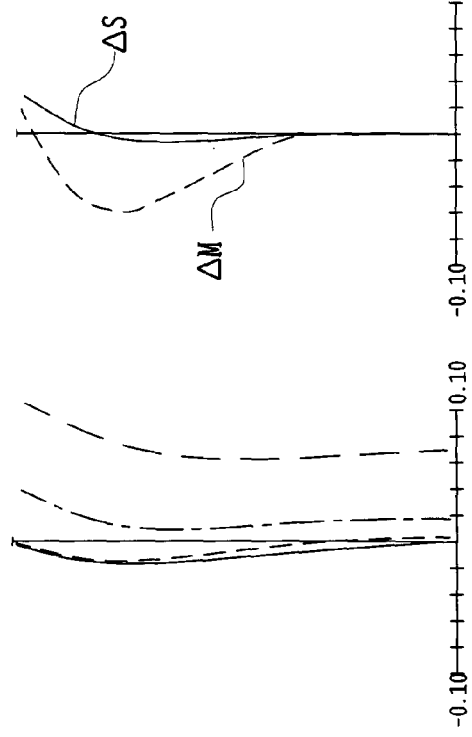

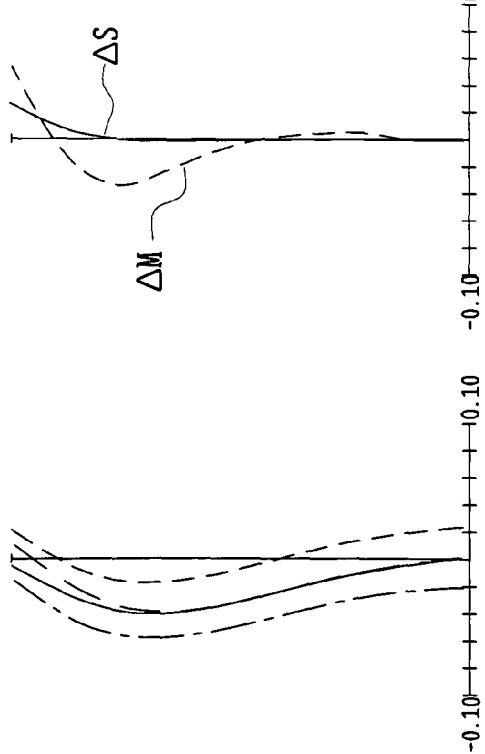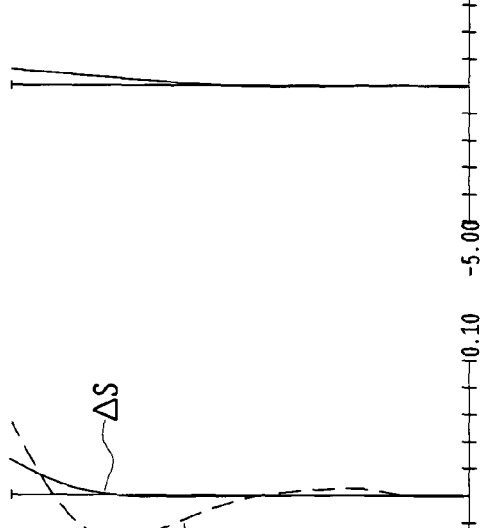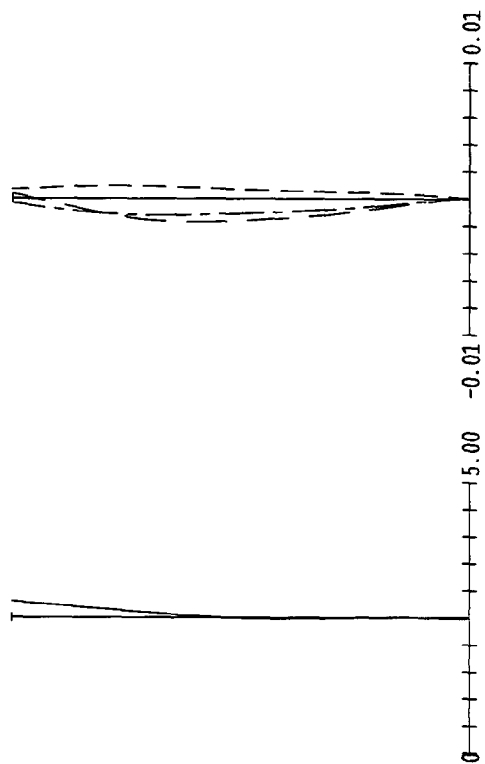

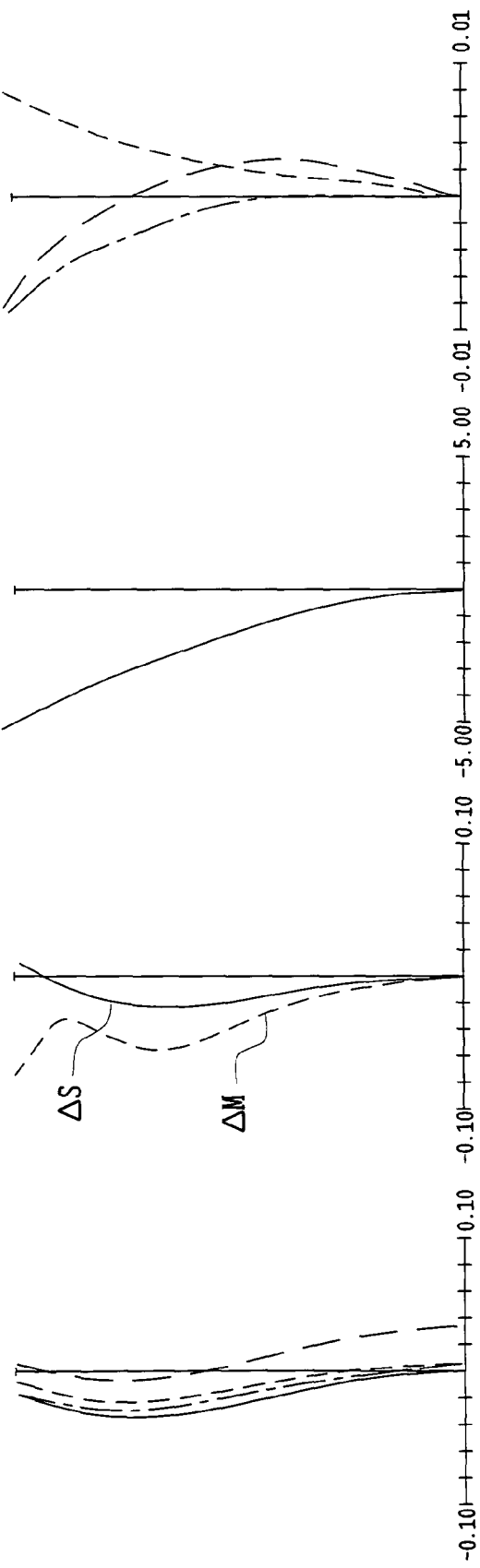

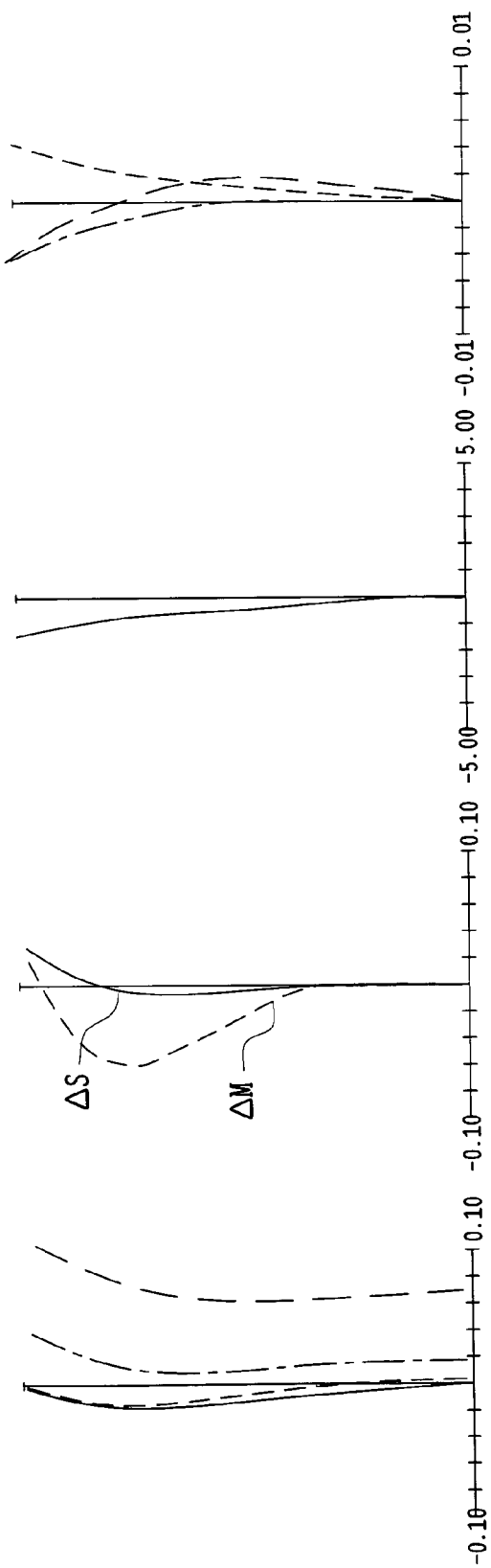

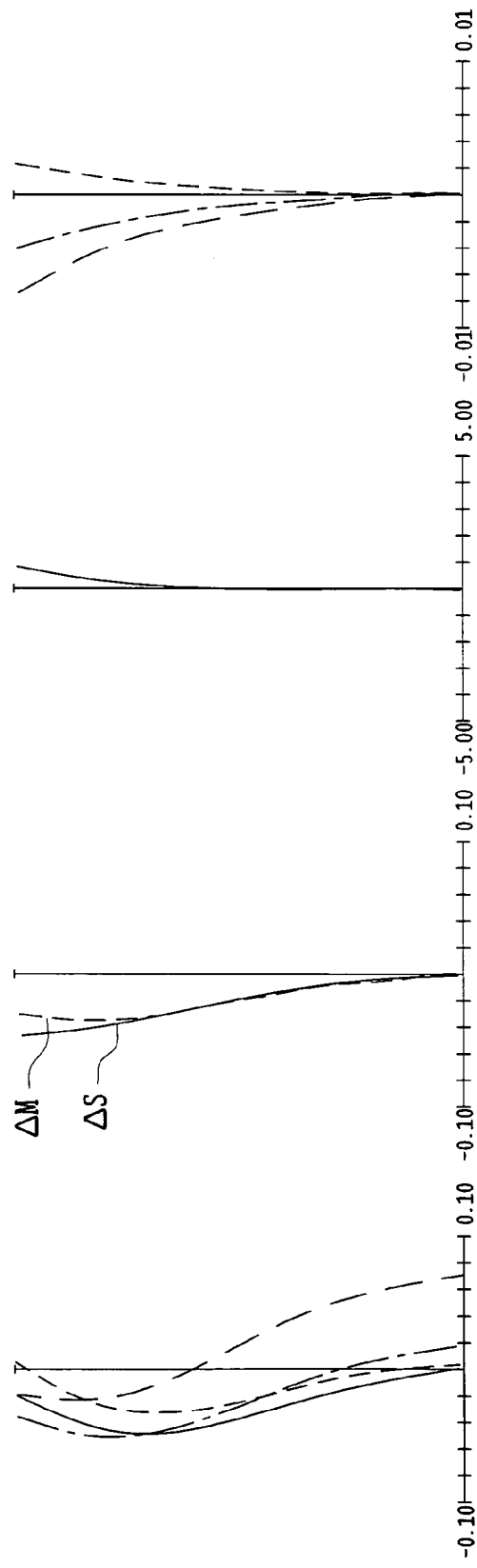
FIG.15A SPHERICAL ABERRATION FNO 4.411
FIG.15B ASTIGMATISM FIY 3.00
FIG.15C DISTORTION FIY 3.00
FIG.15D CHROMATIC ABERRATION OF MAGNIFICATION FIY 3.00
435.84
486.13
656.27
587.56

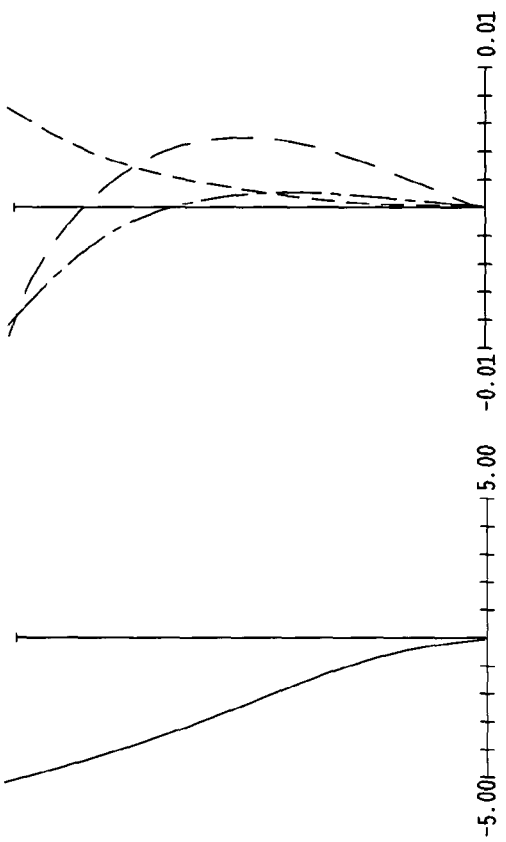
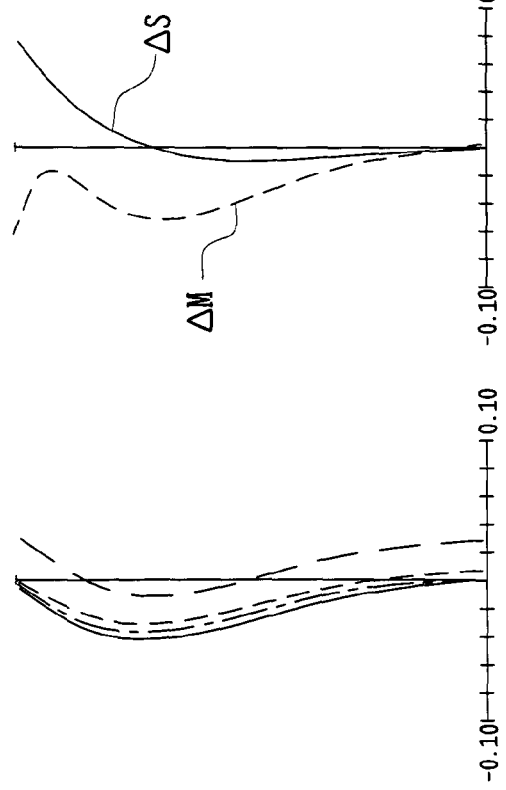
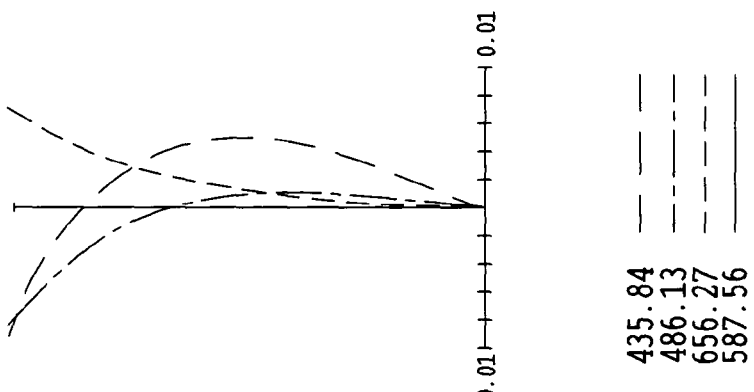
FIG.18A SPHERICAL ABERRATION FNO 2.822
FIG.18B ASTIGMATISM FIY 3.00
FIG.18C DISTORTION FIY 3.00
FIG.18D CHROMATIC ABERRATION OF MAGNIFICATION FIY 3.00
435.84
486.13
656.27
587.56

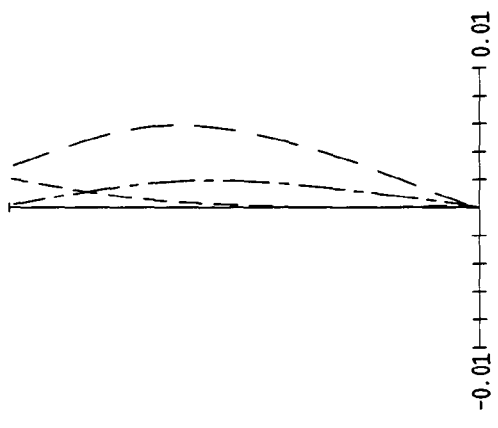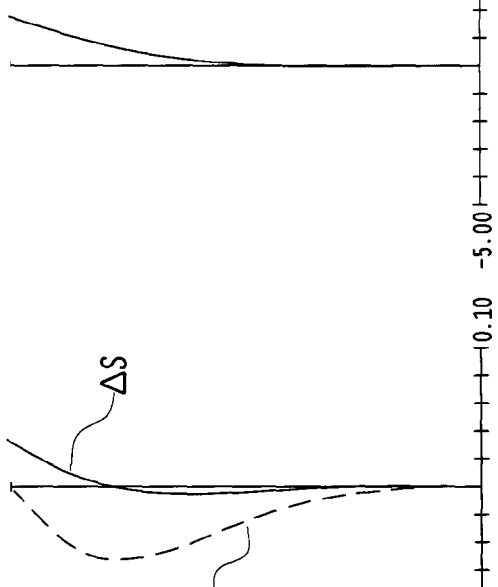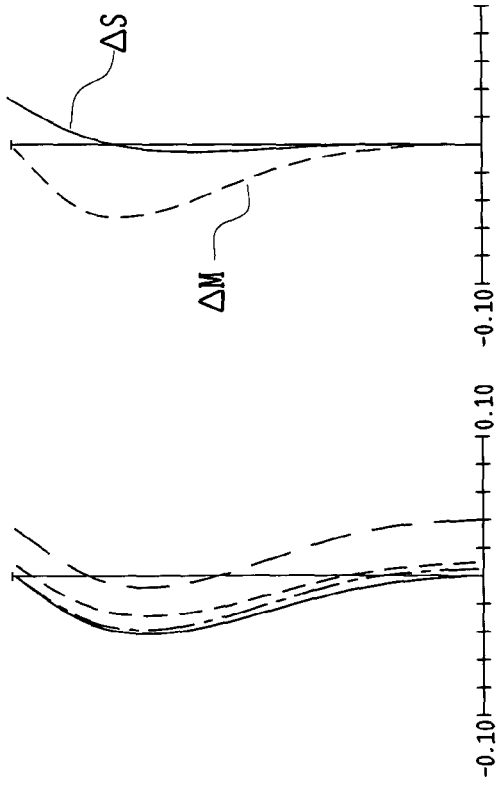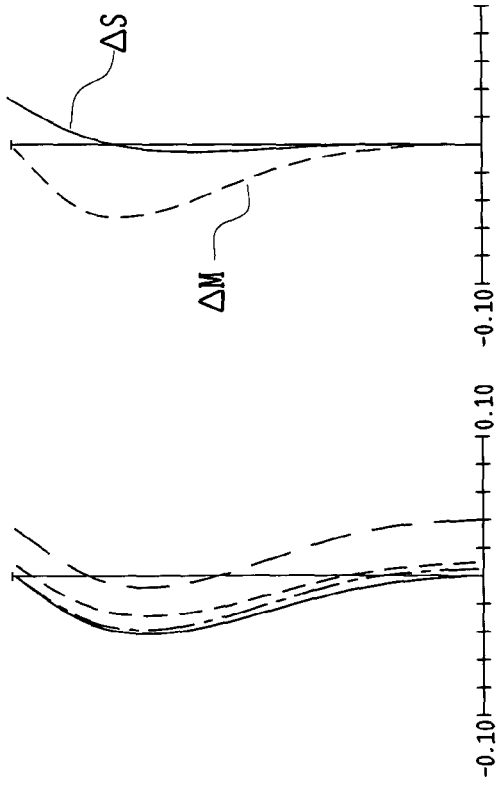

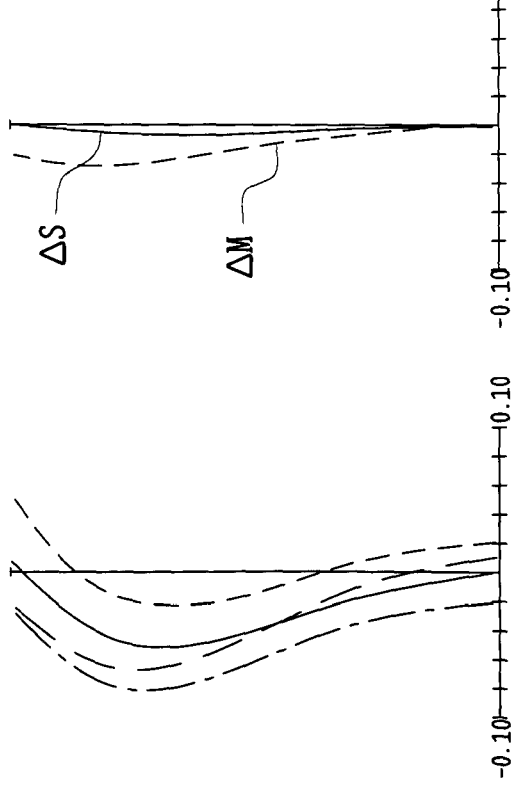
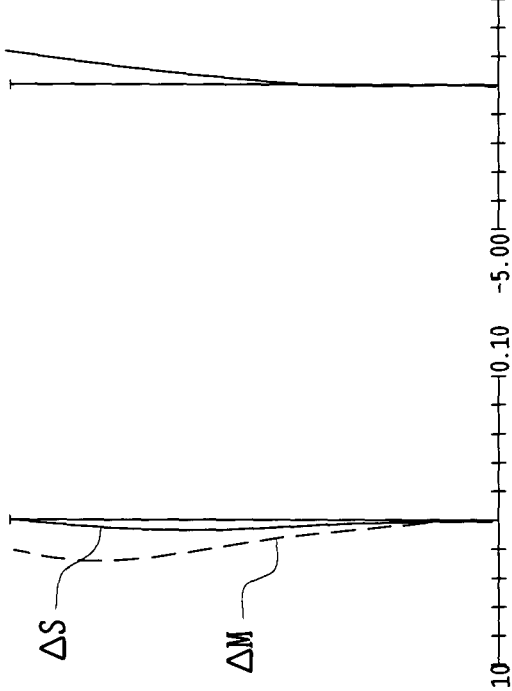
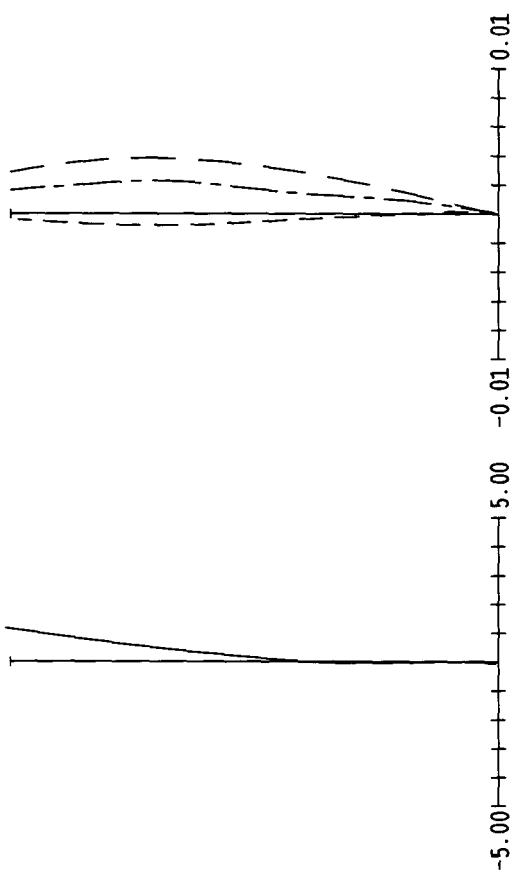
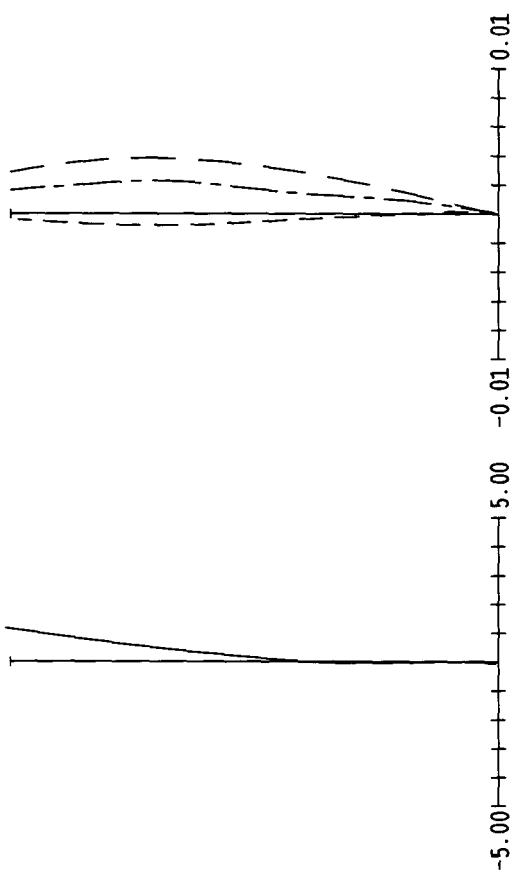

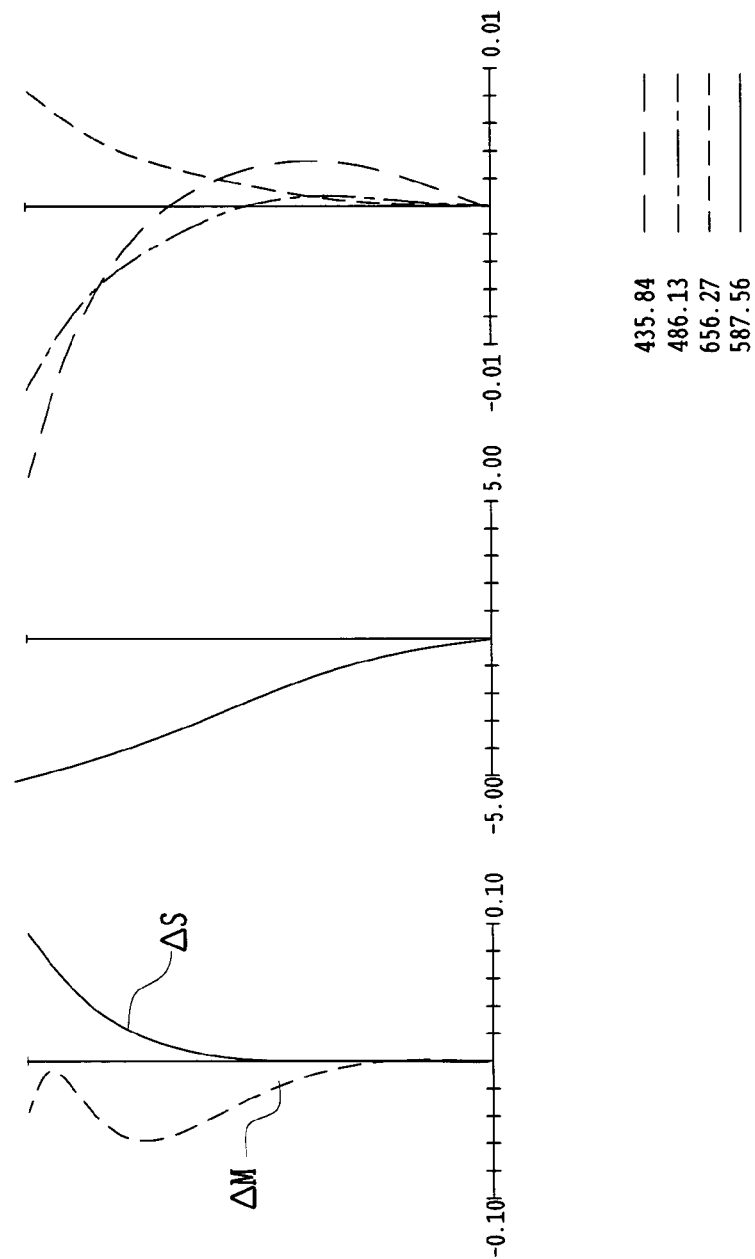
FIG. 23A SPHERICAL ABERRATION FNO 2.802
FIG. 23B ASTIGMATISM FIY 3.00
FIG. 23C DISTORTION FIY 3.00
FIG. 23D CHROMATIC ABERRATION OF MAGNIFICATION FIY 3.00
435.84
486.13
656.27
587.56

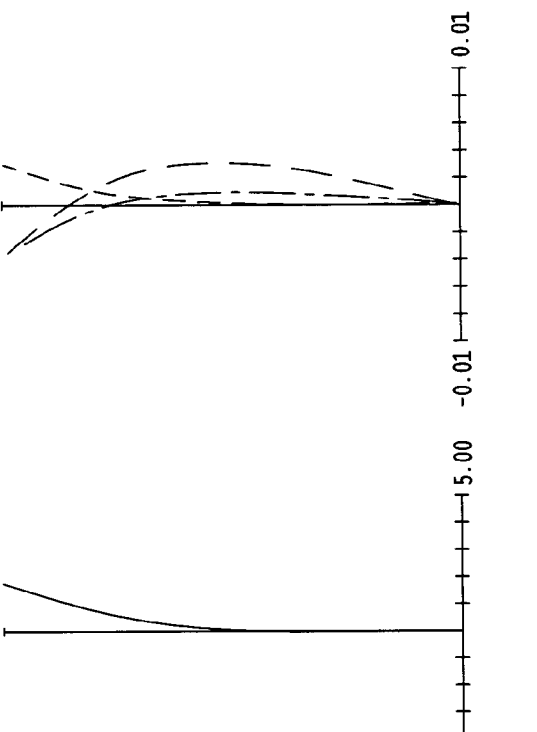
FIG. 24A SPHERICAL ABERRATION FNO 3.382
FIG. 24B ASTIGMATISM FIY 3.00
FIG. 24C DISTORTION FIY 3.00
FIG. 24D CHROMATIC ABERRATION OF MAGNIFICATION FIY 3.00
435.84
486.13
656.27
587.56

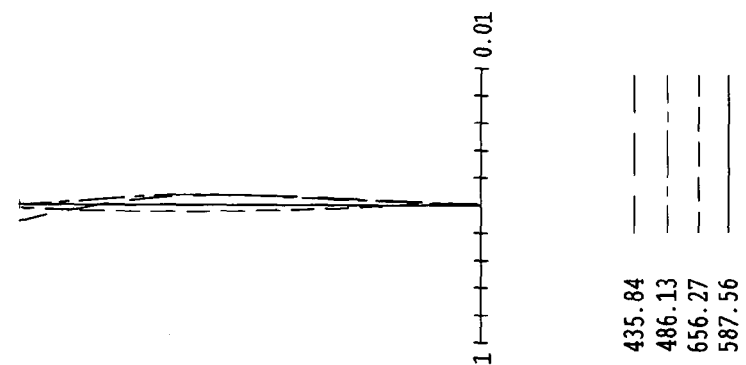
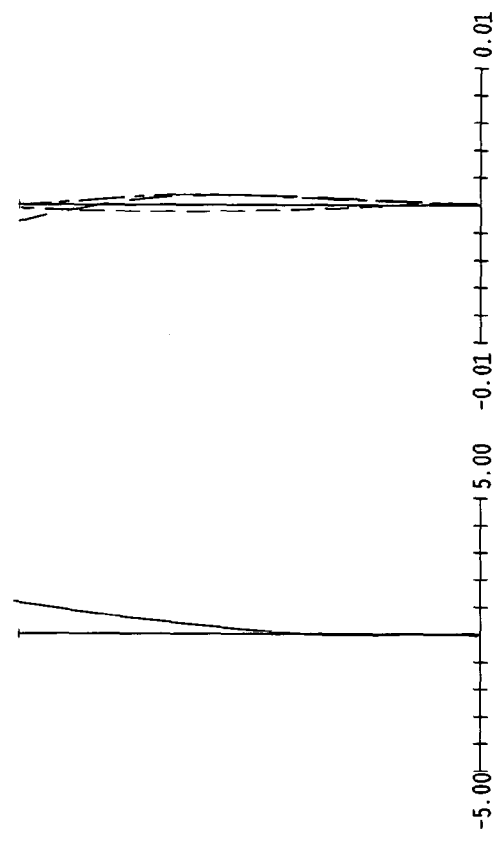
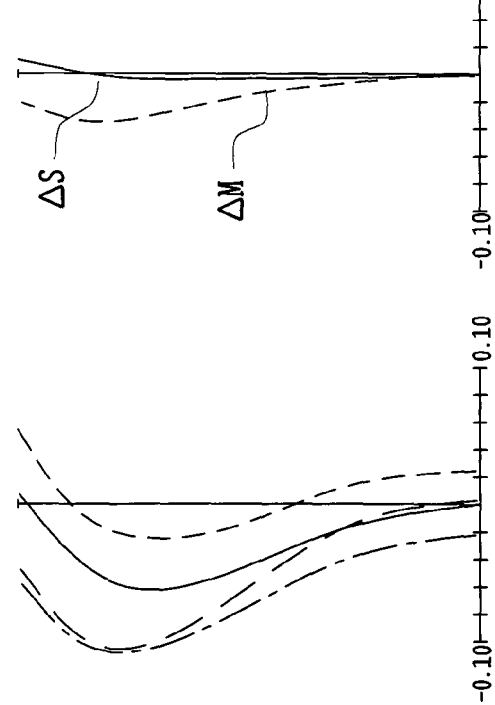

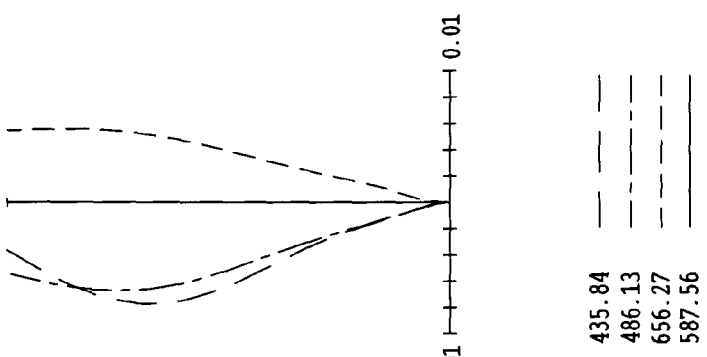
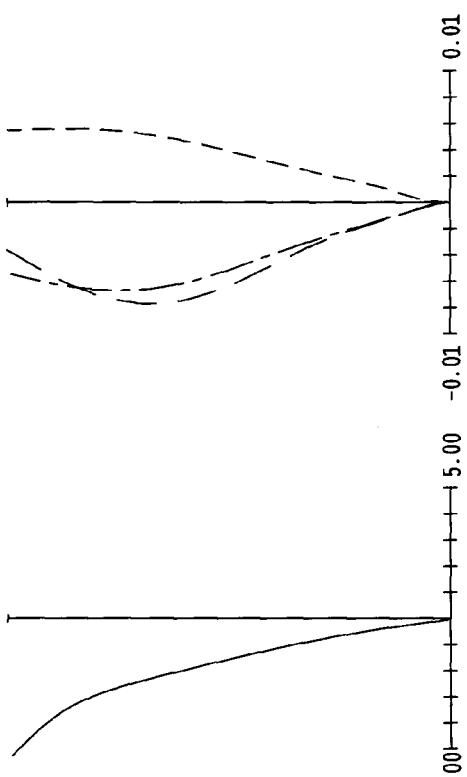
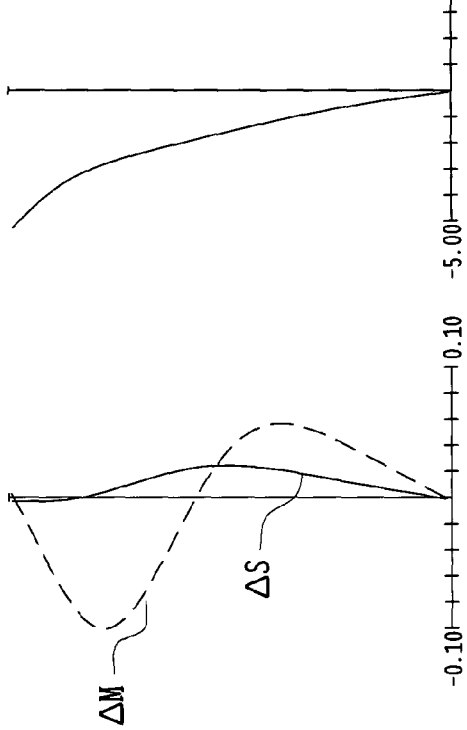
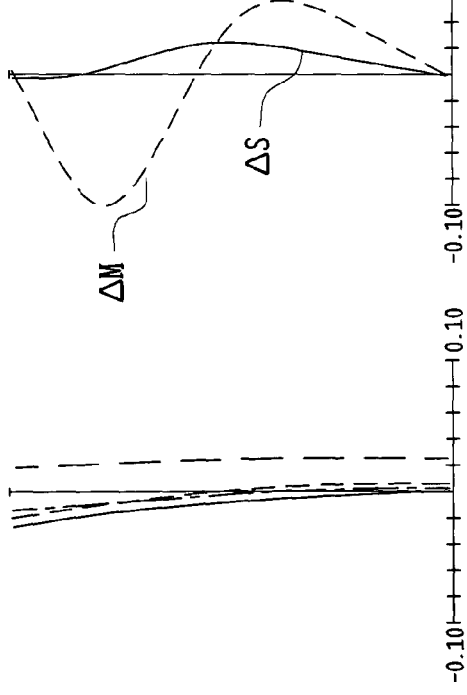

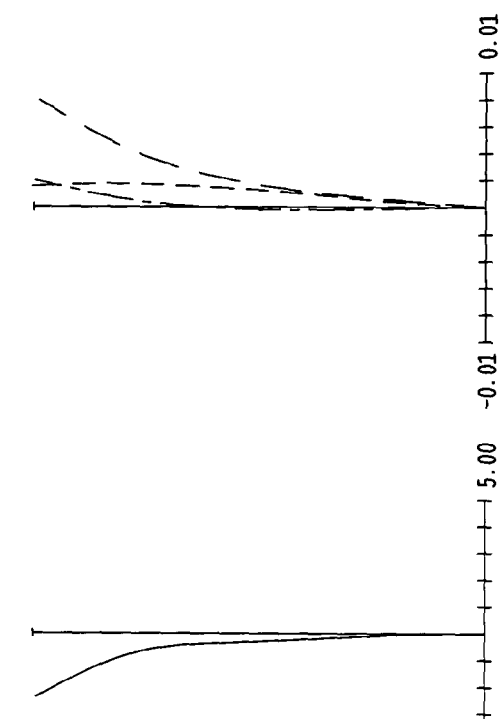
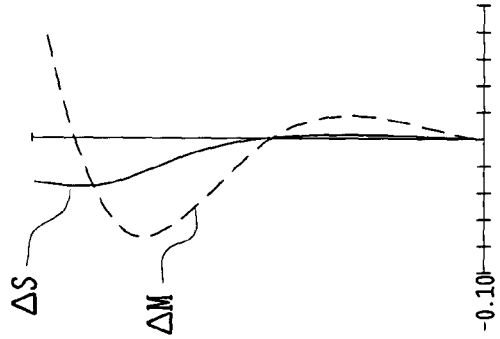
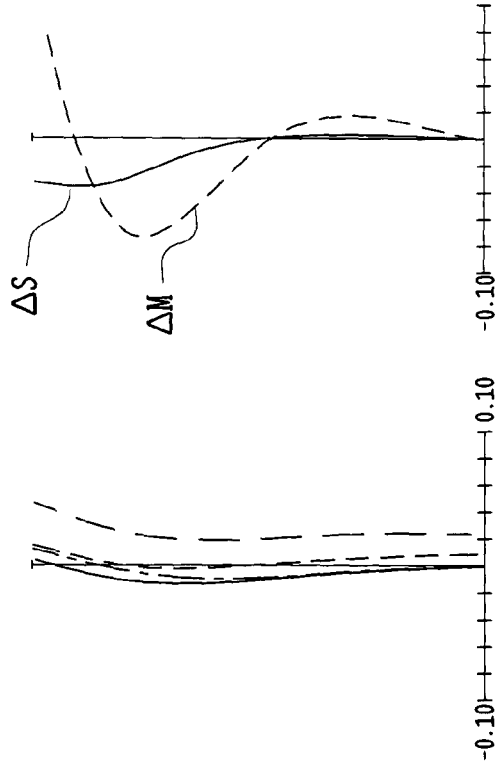
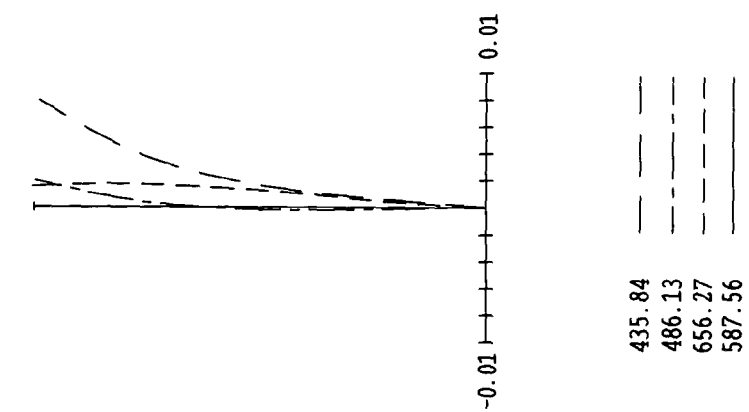

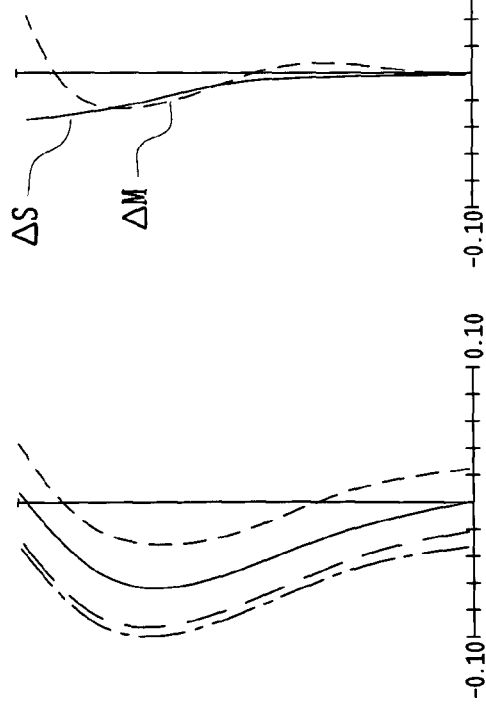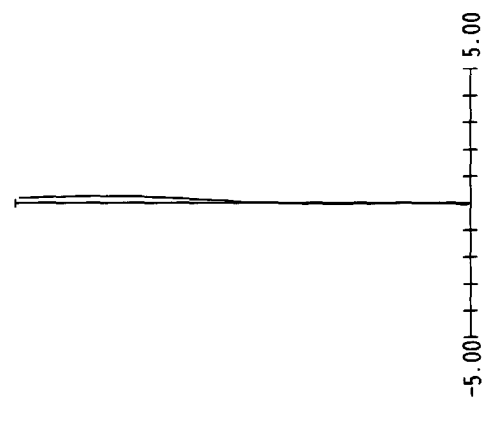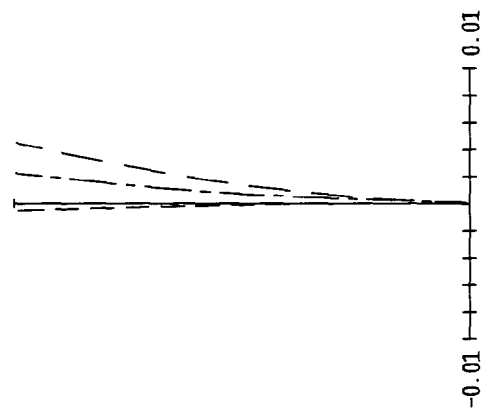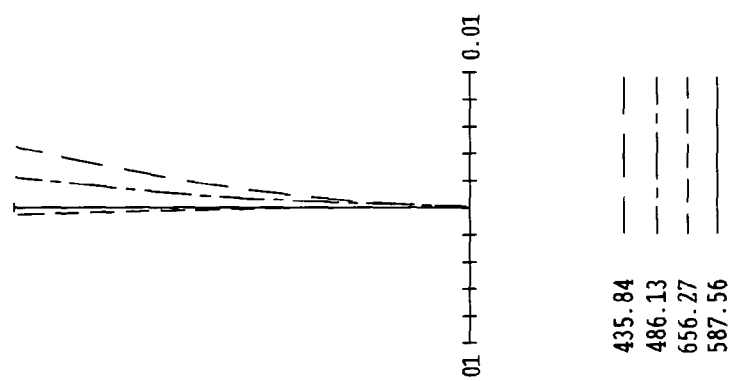

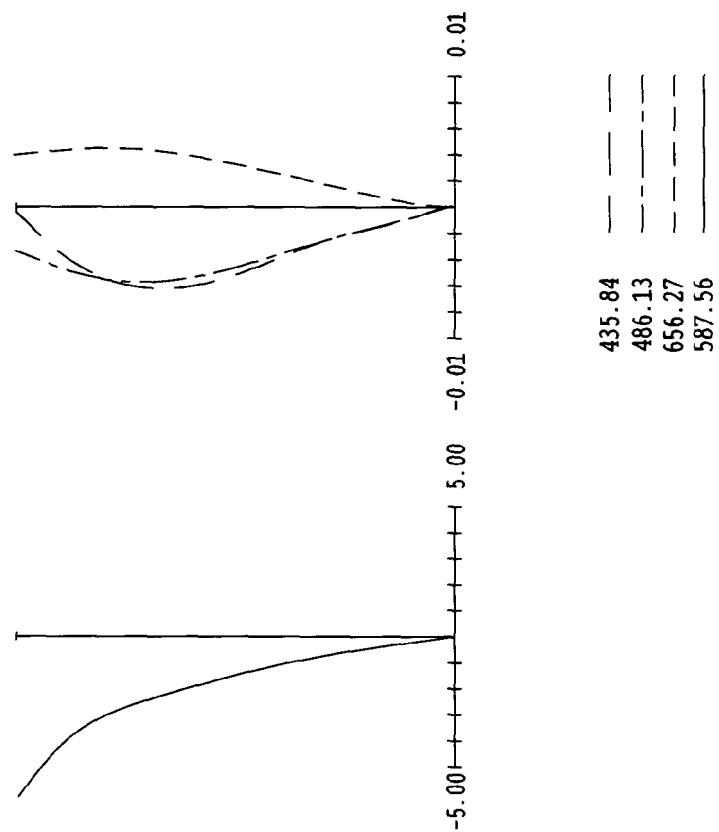
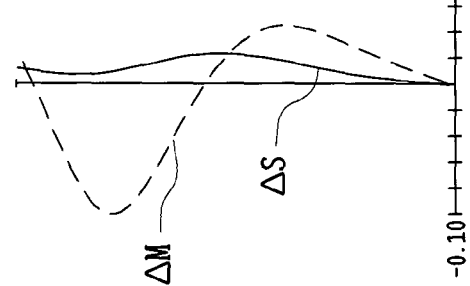
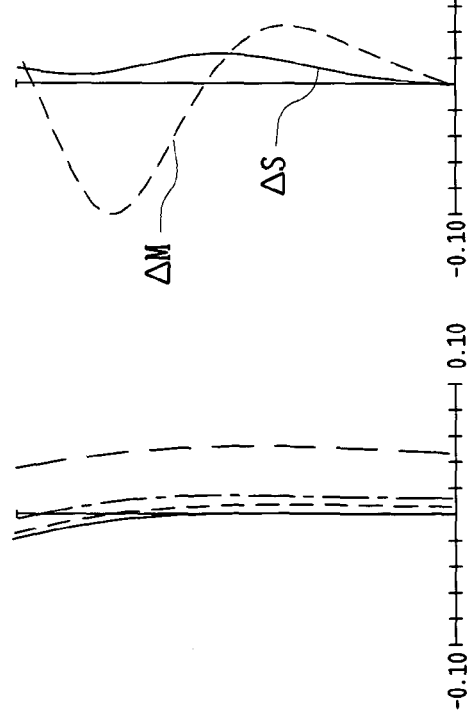

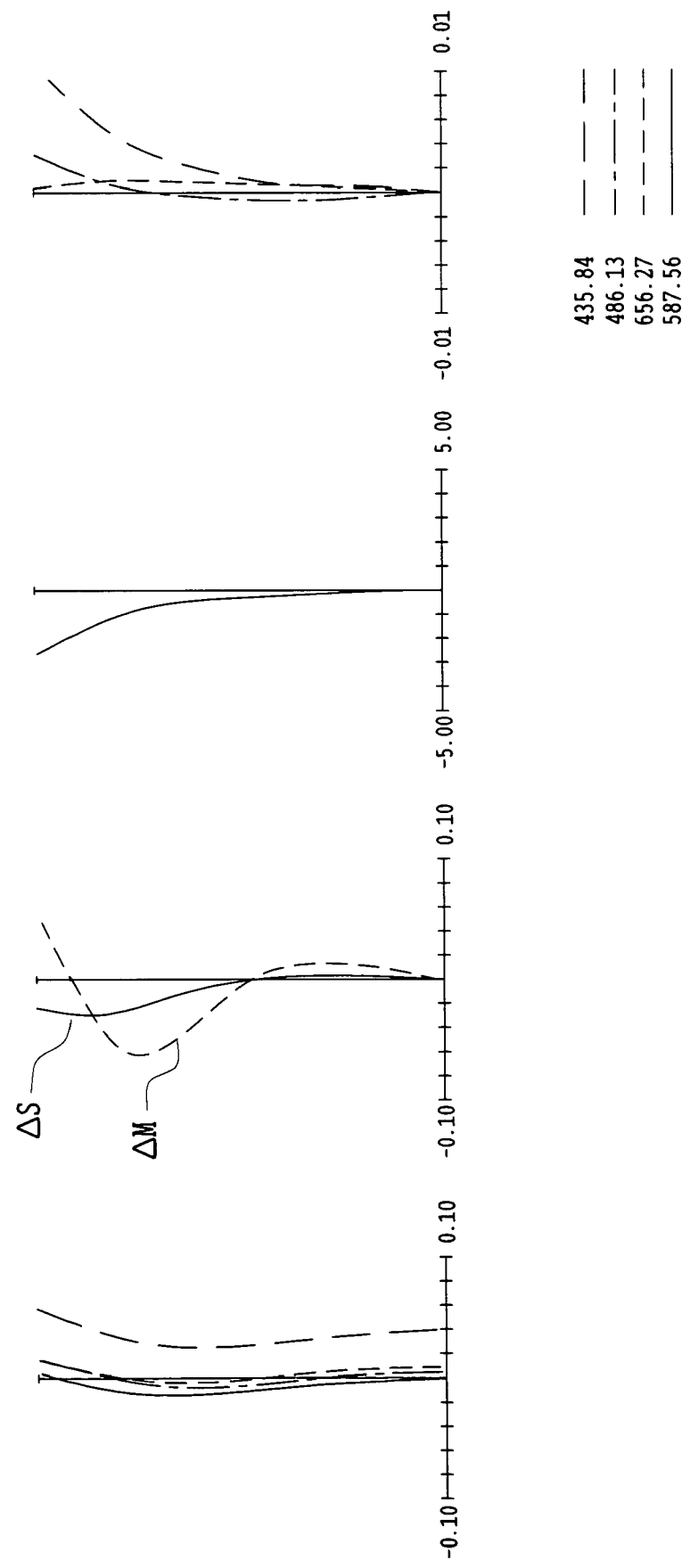

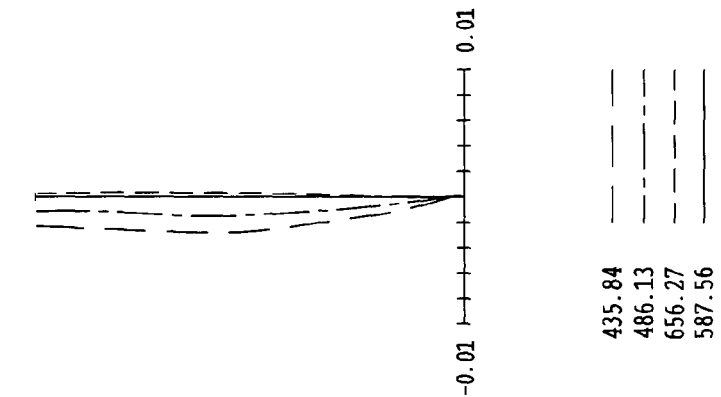
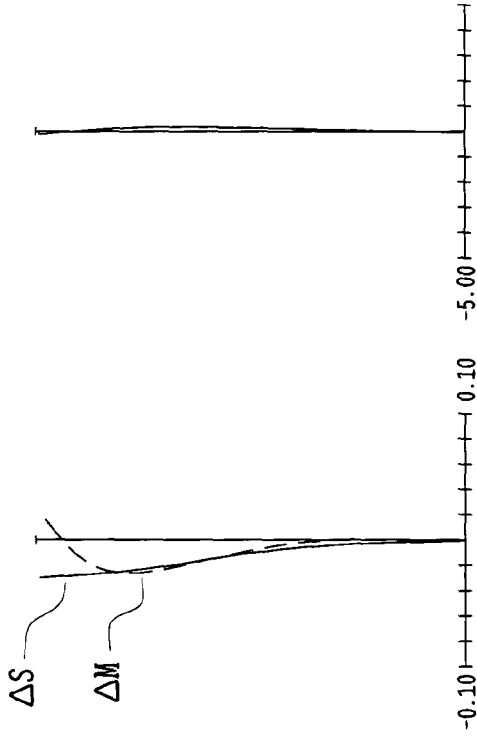
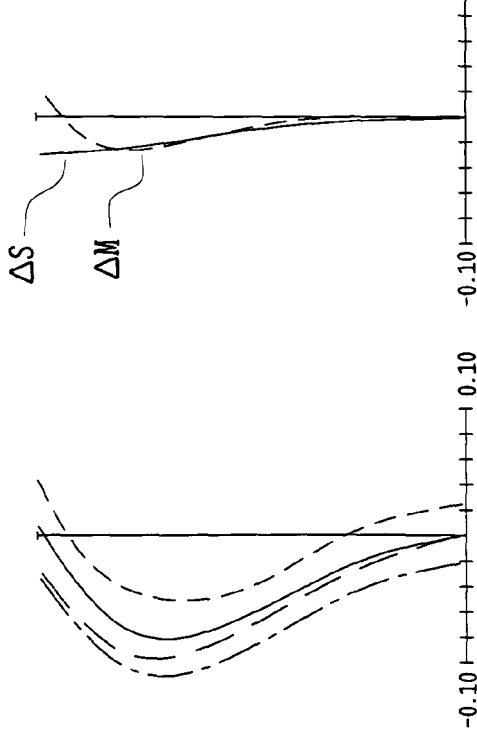

COMPLEMENTARY MOSAIC COLOR FILTER

C : CYAN    M : MAGENTA
Ye : YELLOW    G : GREEN

ZOOM LENS

BACKGROUND OF THE INVENTION

1. Field of the Invention

The present invention relates to a zoom lens and an electronic imaging device having the zoom lens, and in particular, to an electronic imaging device, such as a video camera or a digital camera, in which a slim design of the camera in depth is achieved by considering the optical system of a zoom lens, and a zoom lens used in this electronic imaging device.

2. Description of Related Art

Recently, as a camera for the next generation of an alternative to a silver halide 35 mm film (135 format) camera, special attention has been devoted to a digital camera (an electronic camera). Such digital cameras have come to have many categories in a wide range from a high-function type for business use to a popular portable type.

The thickness of an optical system, notably a zoom lens system, from the most object-side surface to an imaging plane constitutes the greatest obstacle to a reduction in depth of a camera.

The slim design technique of a camera body chiefly used in recent years adopts a so-called collapsible lens barrel that although the optical system protrudes from the front side of the camera body in photography, it is incorporated in the camera body when the camera is not used.

Examples of optical systems having possibilities that the collapsible lens barrel is used and the slim design is effectively achieved are set forth in Japanese Patent Kokai Nos. Hei 11-194274, Hei 11-287953, and 2000-9997. Each of the optical systems includes, in order form the object side, a first lens unit with negative refracting power and a second lens unit with positive refracting power so that when the magnification of the optical system is changed, both the first lens unit and the second lens unit are moved.

Recently, an electronic imaging device which does not have rising time (lens shifting time) required to bring the camera into the working state as in the collapsible lens barrel and is favorable for water and dust proof has been proposed. In order to make the camera extremely small in depth, the optical system of the electronic imaging device is constructed so that the optical path (optical axis) of the optical system is bent by a reflecting optical element such as a mirror or prism. Specifically, the most object-side lens unit is constructed as a position-fixed lens unit, in which the reflecting optical element is provided. The optical path varying behind this lens unit is bent in a longitudinal or lateral direction of the camera body so that the smallest possible dimension of the depth is obtained.

SUMMARY OF THE INVENTION

The zoom lens according to the present invention includes a first lens unit fixed when the magnification of the zoom lens is changed and at least two positive lens units arranged on the image side of the first lens unit so that relative spacings between individual lens units are varied when the magnification is changed. In this case, the first lens unit has a prism containing a reflecting surface at the most object-side position, the entrance surface of the prism is configured as a concave surface directed toward the object side, and the concave surface is an aspherical surface that divergence is impaired progressively in separating from the optical axis.

The zoom lens according to the present invention includes a first lens unit fixed when the magnification of the zoom lens is changed, an aperture stop located on the image side of the first lens unit, and a lens unit interposed between the first lens unit and the aperture stop. In this case, the first lens unit has a prism containing a reflecting surface at the most object-side position, the entrance surface of the prism is configured as a concave surface directed toward the object side, the concave surface is an aspherical surface that divergence is impaired progressively in separating from the optical axis, and the lens unit can be moved in only one direction when the magnification is changed, varying from a wide-angle position to a telephoto position, in focusing of an infinite object point.

Further, the zoom lens according to the present invention includes, in order from the object side, a first lens unit with positive refracting power, a second lens unit with negative refracting power, an aperture stop whose position is nearly fixed with respect to an imaging plane, a lens unit with positive refracting power, and a last lens unit with positive refracting power. When the magnification of the zoom lens is changed, the first lens unit remains fixed and the second lens unit and the lens unit with positive refracting power are moved, and the lens unit with positive refracting power can be moved in only one direction when the magnification is changed, varying from a wide-angle position to a telephoto position, in focusing of an infinite object point.

The electronic imaging device in the present invention includes a zoom lens and an image sensor located at the position of an image plane of the zoom lens. The zoom lens includes a first lens unit fixed when the magnification of the zoom lens is changed and at least two positive lens units arranged on the image side of the first lens unit. In this case, relative spacings between individual lens units are varied when the magnification is changed, the first lens unit has a prism containing a reflecting surface at the most object-side position, the entrance surface of the prism is configured as a concave surface directed toward the object side, and the concave surface is an aspherical surface that divergence is impaired progressively in separating from the optical axis.

These and other features and advantages of the present invention will become apparent from the following detailed description of the preferred embodiments when taken in conjunction with the accompanying drawings.

BRIEF DESCRIPTION OF THE DRAWINGS

FIGS. 3A, 3B, 3C, and 3D are diagrams showing aberration characteristics at the wide-angle position in the first embodiment;

FIGS. 4A, 4B, 4C, and 4D are diagrams showing aberration characteristics at the middle position in the first embodiment;

FIGS. 5A, 5B, 5C, and 5D are diagrams showing aberration characteristics at the telephoto position in the first embodiment;

FIGS. 8A, 8B, 8C, and 8D are diagrams showing aberration characteristics at the wide-angle position in the second embodiment;

FIGS. 9A, 9B, 9C, and 9D are diagrams showing aberration characteristics at the middle position in the second embodiment;

FIGS. 10A, 10B, 10C, and 10D are diagrams showing aberration characteristics at the telephoto position in the second embodiment;

FIGS. 13A, 13B, 13C, and 13D are diagrams showing aberration characteristics at the wide-angle position in the third embodiment;

FIGS. 14A, 14B, 14C, and 14D are diagrams showing aberration characteristics at the middle position in the third embodiment;

FIGS. 15A, 15B, 15C, and 15D are diagrams showing aberration characteristics at the telephoto position in the third embodiment;

FIGS. 18A, 18B, 18C, and 18D are diagrams showing aberration characteristics at the wide-angle position in the fourth embodiment;

FIGS. 19A, 19B, 19C, and 19D are diagrams showing aberration characteristics at the middle position in the fourth embodiment;

FIGS. 20A, 20B, 20C, and 20D are diagrams showing aberration characteristics at the telephoto position in the fourth embodiment;

FIGS. 23A, 23B, 23C, and 23D are diagrams showing aberration characteristics at the wide-angle position in the fifth embodiment;

FIGS. 24A, 24B, 24C, and 24D are diagrams showing aberration characteristics at the middle position in the fifth embodiment;

FIGS. 25A, 25B, 25C, and 25D are diagrams showing aberration characteristics at the telephoto position in the fifth embodiment;

FIGS. 28A, 28B, 28C, and 28D are diagrams showing aberration characteristics at the wide-angle position in the sixth embodiment;

FIGS. 29A, 29B, 29C, and 29D are diagrams showing aberration characteristics at the middle position in the sixth embodiment;

FIGS. 30A, 30B, 30C, and 30D are diagrams showing aberration characteristics at the telephoto position in the sixth embodiment;

FIGS. 33A, 33B, 33C, and 33D are diagrams showing aberration characteristics at the wide-angle position in the seventh embodiment;

FIGS. 34A, 34B, 34C, and 34D are diagrams showing aberration characteristics at the middle position in the seventh embodiment;

FIGS. 35A, 35B, 35C, and 35D are diagrams showing aberration characteristics at the telephoto position in the seventh embodiment;

DETAILED DESCRIPTION OF THE PREFERRED EMBODIMENTS

Figure 1:
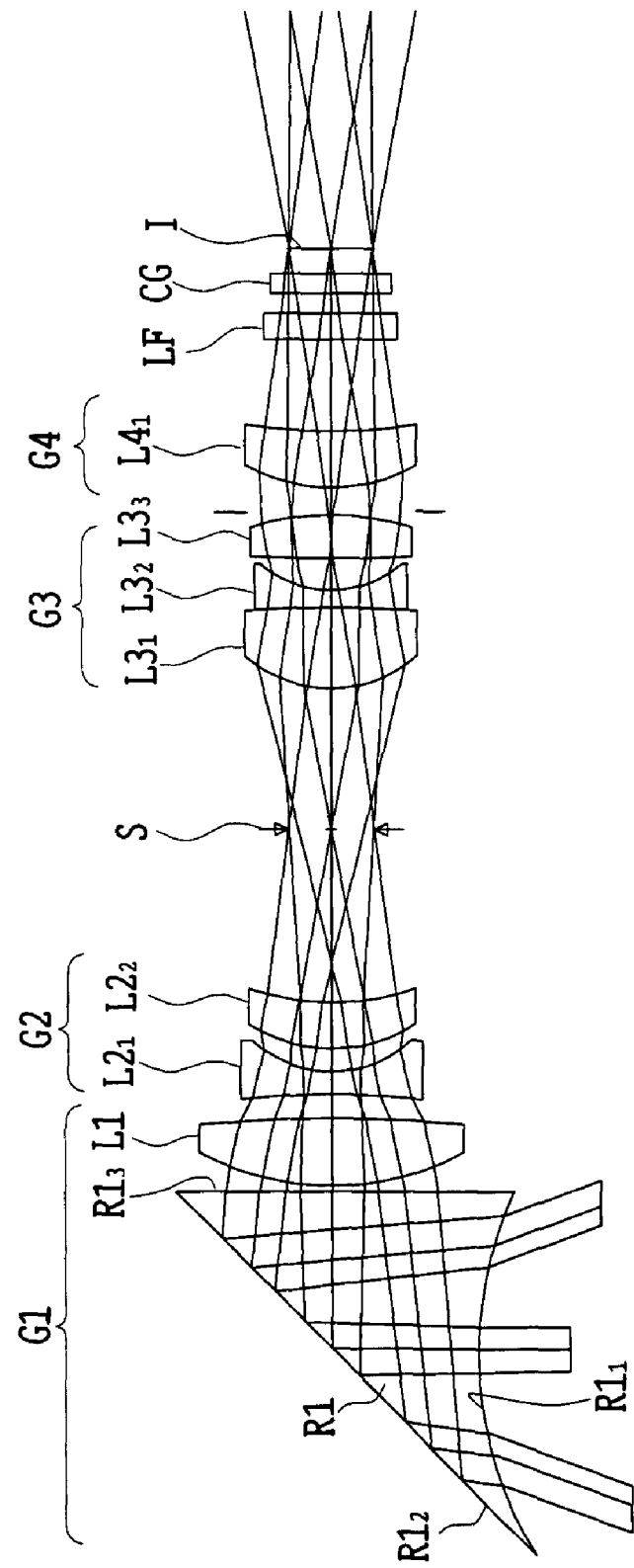
FIG. 1 is a sectional view showing an optical arrangement, developed along the optical axis, at the wide-angle position where the optical path is bent in focusing of the infinite object point, in a first embodiment of the zoom lens used in the electronic imaging device according to the present invention.

Before undertaking the description of the embodiments, grounds for adopting the construction of the present invention and the function thereof will be explained.

The zoom lens of the present invention includes the first lens unit which has a prism containing a reflecting surface for bending the optical path at the most object-side position and remains fixed when the magnification of the zoom lens is changed and at least two positive lens units arranged on the image side of the first lens unit so that relative spacings between individual lens units are varied when the magnification is changed. In this case, the plane of incidence of the optical path on the prism (the entrance surface of the prism) is configured as a concave surface directed toward the object side, and the concave surface is an aspherical surface that divergence is impaired progressively in separating from the optical axis.

In order to reduce the depth of the camera, it is only necessary to eliminate optical elements located on the object side of the reflecting surface of the reflecting optical element as far as possible. However, in order to ensure some angle of view, it is necessary to provide negative refracting power on the object side of the reflecting surface.

Thus, in the present invention, a negative lens element is not provided on the object side of the reflecting surface, but the reflecting optical element is constructed as a prism, the entrance surface of which is configured to be a light-diverging surface, namely into a shape such that a concave surface is directed toward the object side.

In this case, however, the angle of incidence of a ray of light relative to some angle of view is extremely increased, and therefore the production of coma, distortion, or astigmatism becomes prominent.

Hence, as mentioned above, when the concave surface of the prism is configured as the aspherical surface that divergence is impaired progressively in separating from the optical axis, the effect of better correction of off-axis aberration is brought about.

It is favorable that the shape of the aspherical surface satisfies the following condition:

$$0.02 \leq ASP11/fw \leq 0.3 \tag{1}$$

where ASP11 is the amount of deviation (deviation toward the image side is assumed to be positive) measured along the optical axis of the aspherical surface with respect to a reference spherical surface (a spherical surface with its center of curvature on the optical axis) at a height h11 from the optical axis of the entrance surface of the prism of the first lens unit, and fw is the focal length of the entire system at the wide-angle position. Also, the height h11 is expressed by h11=·2·fw·tan ωw (where ωw is a half angle of view corresponding to the maximum image height at the wide-angle position).

Below the lower limit of Condition (1), correction for coma or distortion becomes difficult. Beyond the upper limit of Condition (1), pincushion distortion is liable to occur.

It is further favorable to satisfy the following condition:

$$0.04 \leq ASP11/fw \leq 0.25 \tag{1'}$$

It is more favorable to satisfy the following condition:

$$0.06 \leq ASP11/fw \leq 0.2 \tag{1''}$$

In the present invention, besides configuring the entrance surface of the prism as the aspherical surface, it is desirable that a radius of curvature with its center on the optical axis is limited so as to satisfy the following condition:

$$-0.50 \leq fw \cdot (n1-1)r1 \leq -0.12 \tag{2}$$

where n1 is the medium refractive index (reference wavelength) of the prism and r1 is the radius of curvature of the entrance surface of the prism, with its center on the optical axis.

Beyond the upper limit of Condition (2), the curvature is extremely increased and off-axis aberration is liable to deteriorate, which is unfavorable. Below the lower limit of Condition (2), the position of the entrance pupil is located too far and the prism tends to cause bulkiness. This defeats the purpose of providing the zoom lens which is very small in depth.

It is further desirable to satisfy the following condition:

$$-0.45 \leq fw \cdot (n1-1)/r1 \leq -0.14 \quad (2')$$

It is more desirable to satisfy the following condition:

$$-0.40 \leq fw \cdot (n1-1)/r1 \leq -0.16 \quad (2'')$$

In the present invention, it is desirable that a length dp from the entrance surface to the exit surface of the prism, measured along the optical axis of the zoom lens, satisfies the following condition:

$$1.6 < dp/fw < 3.2 \quad (3)$$

Below the lower limit of Condition (3), on the premise that path bending is physically accomplished, it becomes difficult to ensure the angle of view above some degree. Beyond the upper limit of Condition (3), the curvature of the entrance surface of the prism, with its center on the optical axis, becomes too large, and there is a tendency of exceeding the limit of Condition (2) to be satisfied.

It is rather desirable to satisfy the following condition:

$$1.8 < dp/fw < 3.0 \quad (3')$$

It is more desirable to satisfy the following condition:

$$2.0 < dp/fw < 2.8 \quad (3'')$$

The refractive index of the medium used for the prism is as low as about 1.5 in the embodiments of the present invention to be described later. However, the use of a refractive index of 1.6–1.9 higher than this is more advantageous.

In order to obtain advantageous results in view of paraxial rays and aberrations, it is favorable to provide a shortest possible equivalent-air medium length. On the other hand, in order to physically accomplish the path bending at a wider angle of view, it is favorable to increase the length dp from the entrance surface to the exit surface of the prism as far as possible. When a prism with high refractive index is used, the equivalent-air medium length can be reduced even though the length dp is increased. It is thus desirable that the refractive index of the medium used for the prism is 1.6–1.9.

In the present invention, when the magnification is changed, varying from the wide-angle position to the telephoto position, in focusing of an infinite object point, one of positive lens units located on the image side of the first lens unit is enabled to be moved in one direction only, and relative spacing between other positive lens units is varied. This arrangement contributes to the improvement of a variable magnification ratio, the suppression of the fluctuation of aberration caused when the magnification is changed, and the correction of a focus position (including focusing) where the magnification is changed.

The zoom lens according to the present invention includes a first lens unit which has a prism containing a reflecting surface for bending the optical path at the most object-side position and remains fixed when the magnification of the zoom lens is changed, and at least one lens unit which has an aperture stop on the image side thereof and can be moved in only one direction when the magnification is changed, varying from the wide-angle position to the telephoto position, in focusing of an infinite object point, interposed between the first lens unit and the aperture stop. The entrance surface of the prism is configured as a concave surface directed toward the object side, and the concave surface is configured as an aspherical surface that divergence is impaired progressively in separating from the optical axis.

In this case also, as mentioned above, it is desirable that the prism satisfies at least one of Conditions (1), (1'), and (1''), Conditions (2), (2'), and (2''), and Conditions (3), (3'), and (3'').

The aperture stop can be fixed in position, moved integral with a moving lens unit, or moved independently of individual lens units. However, a mechanical shutter, because of its time characteristic (that there is a time difference over the whole range of the aperture of the shutter itself, called asynchronism), must be placed close to the aperture stop or the imaging plane. The setting of the shutter at a position close to the aperture stop structurally facilitates compactness and lightens restrictions on its construction and accuracy. Consequently, the position close to the aperture stop is generally chosen for the setting position of the mechanical shutter. As such, when the aperture stop is moved during the change of the magnification, a shutter mechanism must also be moved together.

However, in the zoom lens of a path bending system of the present invention, the thickness of the camera body increases with increasing thickness of a lens barrel, and hence space required for moving a complicated and large unit like the shutter is responsible for an increase in thickness of the camera body.

Thus, it is good practice to fix the aperture stop and the shutter in position. In this case, as the change of the magnification of the combination system of all lens units located behind the stop increases, variation in F value by the change of the magnification becomes considerable.

Hence, in the present invention, in order to set the variable magnification ratio of the lens units located behind the stop as low as possible, the zoom lens has at least one moving lens unit VF, on the object side of the stop, which can be moved in only one direction when the magnification is changed, varying from the wide-angle position to the telephoto position, in focusing of an infinite object point.

In the present invention, it is effective to satisfy the following condition:

$$0.04 \leq \log \gamma R/\log \gamma \leq 0.75 \quad (4)$$

where γR is the ratio between the combined magnification of all lens systems located behind the stop at the wide-angle position and that at the telephoto position and γ is the ratio between the focal length of the entire system at the wide-angle position and that at the telephoto position.

Below the lower limit of Condition (4), a load of the change of the magnification on the moving lens unit VF is increased, and the fluctuation of aberration by the change of the magnification becomes heavy, or the position of the entrance pupil is located so far that the prism tends to be bulky.

Beyond the upper limit of Condition (4), the variation of the F value by the change of the magnification becomes prominent and the optical system is subject to the influence of diffraction at the telephoto position.

It is rather desirable to satisfy the following condition:

$$0.07 \leq \log \gamma R/\log \gamma \leq 0.70 \quad (4')$$

It is more desirable to satisfy the following condition:

$$0.10 \leq \log \gamma R/\log \gamma \leq 0.65 \quad (4'')$$

The present invention becomes effective when the half angle of view ωw at the wide-angle position of the zoom lens satisfies the following condition:

$$27.5° \leq \omega w \leq 42.5° \quad (5)$$

Below the lower limit of Condition (5), the entrance surface of the prism may be flat, which impairs the merit of the present invention. Beyond the upper limit of Condition (5), correction for aberration or the physical accomplishment of the path bending by the prism becomes difficult even though the present invention is used.

In particular, it is desirable that the half angle of view ωw at the wide-angle position of the zoom lens satisfies the following condition:

$$27.5° \leq \omega w \leq 37.5° \quad (5')$$

It is more desirable that the half angle of view ωw at the wide-angle position of the zoom lens satisfies the following condition:

$$27.5° \leq \omega w \leq 34.5° \quad (5'')$$

The signification of Conditions (4), (4'), and (4'') is that it is rather favorable to impose the load of the change of the magnification on the lens unit VF as far as possible. Consequently, it is favorable that the first lens unit has positive refracting power and the lens unit VF has negative refracting power. By doing so, the lens unit VF is easy to ensure a high variable magnification ratio with slight movement.

It is desirable that a magnification βVF of the lens unit VF at the wide-angle position in focusing of the infinite object point satisfies the following condition:

$$0.40 \leq -\beta VF \leq 1.2 \quad (6)$$

Below the lower limit of Condition (6), the variable magnification ratio is liable to lower for the amount of movement of the lens unit VF. Beyond the upper limit of Condition (6), the positive refracting power of the first lens unit becomes extremely strong and coma is liable to be produced.

It is further desirable to satisfy the following condition:

$$0.45 \leq -\beta VF \leq 1.1 \quad (6')$$

It is more desirable to satisfy the following condition:

$$0.50 \leq -\beta VF \leq 1.0 \quad (6'')$$

In a focal length fVF of the lens unit VF, it is favorable to satisfy the following condition:

$$0.9 \leq -fVF/fw \leq 3.5 \quad (7)$$

Below the lower limit of Condition (7), the negative Petzval sum tends to increase. Beyond the upper limit of Condition (7), the variable magnification ratio is liable to lower for the amount of movement of the lens unit VF.

It is further favorable to satisfy the following condition:

$$1.1 \leq -fVF/fw \leq 3.0 \quad (7')$$

It is more favorable to satisfy the following condition:

$$1.3 \leq -fVF/fw \leq 2.5 \quad (7'')$$

More specifically, the zoom lens according to the present invention includes, in order from the object side, a first lens unit fixed when the magnification of the zoom lens is changed; a second lens unit (corresponding to the lens unit VF) which has negative refracting power and can be moved when the magnification is changed; an aperture stop whose position is nearly fixed with respect to an imaging plane; a lens unit M which has positive refracting power and can be moved in only one direction when the magnification is changed, varying from the wide-angle position to the telephoto position, in focusing of an infinite object point; and a last lens unit R with positive refracting power. In this case, the second lens unit and the lens unit M are moved in directions opposite to each other.

It is desirable to satisfy the following condition:

$$0.1 < -MM/M2 < 1.8 \quad (8)$$

where M2 is the amount of movement of the second lens unit (the movement toward the image side is assumed to be positive) varying from the wide-angle position to the telephoto position, and MM is the amount of movement of the lens unit M (the movement toward the image side is assumed to be positive) varying from the wide-angle position to the telephoto position.

Beyond the upper limit of Condition (8), variations in the F value and in the position of the exit pupil by the change of the magnification become pronounced, which is unfavorable. Below the lower limit of Condition (8), the entrance pupil is located too far and it is difficult to physically accomplish the path bending.

If the zoom lens fails to satisfy Condition (8), a sufficiently high variable magnification ratio will not be obtained in the entire system of the zoom lens, or space for lens movement becomes so wide that the system is bulky.

It is further desirable to satisfy the following condition:

$$0.3 < -MM/M2 < 1.5 \quad (8')$$

It is more desirable to satisfy the following condition:

$$0.5 < -MM/M2 < 1.2 \quad (8'')$$

Also, it is favorable that focusing is performed by the most image-side lens unit, except for a normally fixed lens unit.

In this case, it is desirable to satisfy the following condition:

$$0.10 < D34W/fw < 1.20 \quad (9)$$

where D34W is air spacing provided along the optical axis between the most image-side lens unit (a focus moving lens unit), except for the normally fixed lens unit, in focusing of an infinite object point at the wide-angle position and the nearest lens unit moved in focusing of a shorter-distance object point.

Below the lower limit of Condition (9), space for lens movement in focusing is lacked and the focus moving lens unit is liable to interfere with an approaching lens unit. Beyond the upper limit of Condition (9), space for lens movement in the change of the movement becomes insufficient.

It is further desirable to satisfy the following condition:

$$0.15 < D34W/fw < 1.00 \quad (9')$$

It is more desirable to satisfy the following condition:

$$0.20 < D34W/fw < 0.80 \quad (9'')$$

It is desirable that the last lens unit R satisfies the following condition:

$$-6.00 < (R_{RF}+R_{RR})/(R_{RF}-R_{RR}) < -0.5 \quad (10)$$

where $R_{RF}$ is the radius of curvature of the most object-side surface of the last lens unit R, with its center on the optical axis, and $R_{RR}$ is the radius of curvature of the most image-side surface of the last lens unit R, with its center on the optical axis.

Beyond the upper limit of Condition (10), the principal point of the combined system located behind the lens unit M tends to be far away from an image point formed by the second lens unit. This is unfavorable for variable magnification efficiency. Below the lower limit of Condition (10), lens space is liable to involve waste.

It is rather desirable to satisfy the following condition:

$$-5.00<(R_{RF}+R_{RR})/(R_{RF}-R_{RR})<-0.7 \qquad (10')$$

It is more desirable to satisfy the following condition:

$$-4.00<(R_{RF}+R_{RR})/(R_{RF}-R_{RR})<-0.9 \qquad (10'')$$

The lens unit M is designed to have at least one cemented lens component made up of a positive lens and a negative lens. It is good practice to set the lens unit M as a moving lens unit first located on the image side of the aperture stop whose position is nearly fixed with respect to the imaging plane.

In order to enhance a magnification-increasing effect, the lens unit M is moved in one direction when the magnification is changed, varying from the wide-angle position to the telephoto position. However, since the height of the axial ray is increased, the fluctuation of aberration is produced by the change of the magnification. Although a negative lens element is thus required, a relative sensitivity to decentration with another positive lens in the lens unit tends to heighten. Therefore, it is desirable that the negative lens element in the lens unit M is cemented with one positive lens.

For example, the lens unit M is set as a third lens unit including, in order from the object side, a cemented lens component made up of a positive lens and a negative lens and a single positive lens so that the lens unit is constructed with two lens components including three lens elements (which is called a type A).

As another way, the lens unit M is set as a third lens unit including, in order from the object side, a single positive lens and a cemented lens component made up of a positive lens and a negative lens so that the lens unit is constructed with two lens components including three lens elements (which is called a type B).

As still another way, a single lens element is fixed close to the aperture stop, and the lens unit M is set as a fourth lens unit including a cemented lens component made up of a positive lens and a negative lens so that the lens unit is constructed with one lens component including two lens elements (which is called a type C).

In addition, it is desirable to satisfy the following conditions. Also, symbols A, B, and C attached to the numbers of the conditions correspond to individual types.

$$0.70<R_{C3}/R_{C1}<1.05 \qquad (11)\text{-A}$$

$$0.40<R_{C3}/R_{C1}<0.80 \qquad (11)\text{-B}$$

where $R_{C1}$ is the radius of curvature of the most object-side surface of the cemented lens component of the lens unit M, with its center on the optical axis, and $R_{C3}$ is the radius of curvature of the most image-side surface of the cemented lens component of the lens unit M, with its center on the optical axis.

Beyond the upper limit of each of Conditions (11)-A and (11)-B, the result is beneficial to correction for spherical aberration, coma, or astigmatism in the entire system, but there is little effect on the moderation of the sensitivity to decentration caused by cementation. Below the lower limit of each of Conditions (11)-A and (11)-B, correction for spherical aberration, coma, or astigmatism in the entire system becomes difficult.

Also, in the type C, the lens unit M contains only one lens component, and thus there is no problem of the sensitivity to decentration in the lens unit. Therefore, the corresponding condition is not set.

It is further desirable to satisfy the following conditions:

$$0.75<R_{C3}/R_{C1}<1.00 \qquad (11')\text{-A}$$

$$0.45<R_{C3}/R_{C1}<0.75 \qquad (11')\text{-B}$$

It is more desirable to satisfy the following conditions:

$$0.80<R_{C3}/R_{C1}<0.95 \qquad (11'')\text{-A}$$

$$0.50<R_{C3}/R_{C1}<0.70 \qquad (11'')\text{-B}$$

On the other hand, in correction for chromatic aberration, it is favorable to satisfy the following conditions:

$$-0.6<fw/R_{C2}<0.7 \qquad (12)\text{-A}$$

$$-0.5<fw/R_{C2}<0.8 \qquad (12)\text{-B}$$

$$15<\nu_{CP}-\nu_{CN} \qquad (13)\text{-A}$$

$$25<\nu_{CP}-\nu_{CN} \qquad (13)\text{-B}$$

where $R_{C2}$ is the radius of curvature of the interface of the cemented lens component of the lens unit M, with its center on the optical axis, $\nu_{CP}$ is the Abbe's number of the medium of the positive lens contained in the cemented lens component of the lens unit M, and $V_{CN}$ is the Abbe's number of the medium of the negative lens contained in the cemented lens component of the lens unit M.

Below the lower limit of each of Conditions (12)-A and (12)-B, the result is beneficial to correction for axial chromatic aberration or chromatic aberration of magnification, but spherical aberration or chromatic aberration is liable to be produced. In particular, even though spherical aberration at a reference wavelength has been favorably corrected, spherical aberration at a short wavelength is overcorrected. This is responsible for color blot in an image and thus is unfavorable.

Beyond the upper limit of each of Conditions (12)-A and (12)-B, there is a tendency that axial chromatic aberration, chromatic aberration of magnification, or spherical aberration at the short wavelength is undercorrected.

Below the lower limit of each of Condition (13)-A and (13)-B, axial chromatic aberration is liable to be undercorrected. The combinations of media exceeding the upper limit thereof do not exist in the natural field.

It is rather favorable to satisfy the following conditions:

$$-0.4<fw/R_{C2}<0.5 \qquad (12')\text{-A}$$

$$-0.3<fw/R_{C2}<0.6 \qquad (12')\text{-B}$$

$$20<\nu_{CP}-\nu_{CN} \qquad (13')\text{-A}$$

$$30<\nu_{CP}-\nu_{CN} \qquad (13')\text{-B}$$

It is more favorable to satisfy the following conditions:

$$-0.2<fw/R_{C2}<0.3 \qquad (12'')\text{-A}$$

$$-0.1<fw/R_{C2}<0.4 \qquad (12'')\text{-B}$$

$$25<\nu_{CP}-\nu_{CN} \qquad (13'')\text{-A}$$

$$35<\nu_{CP}-\nu_{CN} \qquad (13'')\text{-B}$$

Movements, relative to the position of an image plane, of the lens unit M and a nearest moving lens unit X on the image side thereof affect a variable magnification effect and the fluctuation of aberration caused when the magnification is changed.

Hence, it is desirable to move the lens unit so as to satisfy the following conditions:

$$0.03 < MX/s < 0.20 \qquad (14)\text{-A}$$

$$-0.07 < MX/s < 0.10 \qquad (14)\text{-B}$$

$$0.0 < MX/s < 0.25 \qquad (14)\text{-C}$$

where MX is the amount of movement of the lens unit X caused when the magnification changed, varying from the wide-angle position to the telephoto position, in focusing of an infinite object point, and s is a distance, measured along the optical axis, from the most-object surface of the lens unit M to the image plane at the telephoto position in focusing of an infinite object point. Also, it is assumed that the distance s has a positive value and the lens unit MX is positive when the lens unit X is moved toward the image side.

Below the lower limit of each of Conditions (14)-A and (14)-B, the variable magnification ratio ceases to be effectively obtainable with narrow space for lens movement. Beyond the upper limit thereof, space for movement of the lens unit M is narrowed, and the variable magnification ratio ceases to be effectively obtainable.

It is further desirable to satisfy the following conditions:

$$0.05 < MX/s < 0.15 \qquad (14')\text{-A}$$

$$-0.04 < MX/s < 0.06 \qquad (14')\text{-B}$$

$$0.05 < MX/s < 0.20 \qquad (14')\text{-C}$$

It is more desirable to satisfy the following conditions:

$$0.07 < MX/s < 0.10 \qquad (14'')\text{-A}$$

$$-0.01 < MX/s < 0.03 \qquad (14'')\text{-B}$$

$$0.10 < MX/s < 0.15 \qquad (14'')\text{-C}$$

When it is considered that the magnification is effectively changed with narrow space for lens movement in the types A, B, and C, it is desirable that the principal point of the combined system of all lens units on the image side of the aperture stop whose position is nearly fixed with respect to an imaging plane is located as close to the object side as possible. According to such a combined system, the variable magnification efficiency is improved and loads on lens units located on the object side of the aperture stop are lessened, which is advantageous to correction for aberration. In view of this, the type B is favorable. However, variation in the F value by the change of the magnification is liable to become pronounced. In the type A or C, the variable magnification ratio of lens units located behind the aperture stop is low and thus variation in the F value is slight, but power loads are liable to be imposed on individual lens units. As such, this type is somewhat inferior in correction for aberration.

It is desirable that the second lens unit is constructed with two lenses including, in order from the object side, a negative lens and a positive lens, and that at least one surface of the negative lens is configured as an aspherical surface.

In addition, it is desirable that the second lens unit satisfies the following condition:

$$0.30 < (R_{2NF}+R_{2NR})/(R_{2NF}-R_{2NR}) < 0.85 \qquad (15)$$

where $R_{2NF}$ is the radius of curvature of the object-side surface of the negative lens of the second lens unit, with its center on the optical axis, and $R_{2NR}$ is the radius of curvature of the image-side surface of the negative lens of the second lens unit, with its center on the optical axis.

Beyond the upper limit of Condition (15), coma is liable to be produced. Below the lower limit thereof, barrel distortion is liable to be produced.

It is rather desirable to satisfy the following condition:

$$0.35 < (R_{2NF}+R_{2NR})/(R_{2NF}-R_{2NR}) < 0.80 \qquad (15')$$

It is more desirable to satisfy the following condition:

$$0.40 < (R_{2NF}+R_{2NR})/(R_{2NF}-R_{2NR}) < 0.75 \qquad (15'')$$

The first lens unit has two elements including, in order from the object side, a prism whose entrance surface is configured as a concave surface of aspherical shape, containing a reflecting surface for bending the optical path, and a positive lens. In particular, in order to shift the position of the entrance pupil closer and to hold a prism compact, it is desirable that the prism has negative refracting power so as to satisfy at least one of Conditions (2), (2'), and (2''). On the other hand, in order to improve the variable magnification efficiency of the second lens unit (the lens unit VF), it is necessary that the whole of the first lens unit has the strongest possible power so as to satisfy the following condition:

$$2.4 \leq f1/fw \leq 7.0 \qquad (16)$$

where f1 is the focal length of the whole of the first lens unit.

Below the lower limit of Condition (16), the variable magnification ratio is low for the amount of movement of the second lens unit where the magnification is changed. Below the lower limit thereof, correction for off-axis aberration or chromatic aberration becomes difficult, or the prism tends to be bulky.

It is further desirable to satisfy the following condition:

$$2.6 \leq f1/fw \leq 6.0 \qquad (16')$$

It is more desirable to satisfy the following condition:

$$2.8 \leq f1/fw \leq 5.0 \qquad (16'')$$

It is necessary that the positive lens mentioned above has power which is strong for the height of the off-axis ray passing therethrough so as to satisfy Condition (17) described below. At the same time, it is desirable that the positive lens is configured to satisfy Condition (18) described below.

$$1.8 \leq f12/fw \leq 4.0 \qquad (17)$$

$$-2.0 < (R_{1PF}+R_{1PR})/(R_{1PF}-R_{1PR}) < -0.2 \qquad (18)$$

where f12 is the focal length of the positive lens of the first lens unit, $R_{1PF}$ is the radius of curvature of the object-side surface of the positive lens in the first lens unit, with its center on the optical axis, and $R_{1PR}$ is the radius of curvature of the image-side surface of the positive lens in the first lens unit, with its center on the optical axis.

Beyond the upper limit of Condition (17), there is a tendency that the variable magnification ratio of the second lens unit (the lens unit VF) is low for the amount of movement and the optical system becomes bulky. Below the lower limit thereof, correction for off-axis aberration, such as coma or astigmatism, is liable to become difficult.

Beyond the upper limit of Condition (18), the principal point of the first lens unit is liable to be shifted to the image side, and the variable magnification efficiency of the second lens unit is impaired. In addition, there is a tendency that coma is produced. Below the lower limit, the positive lens assumes a strong meniscus shape and thus is liable to interfere with the second lens unit satisfying Condition (15).

It is further desirable to satisfy the following conditions:

$$2.0 \leq f12/fw \leq 3.6 \tag{17'}$$

$$-1.6 < (R_{1PF}+R_{1PR})/(R_{1PF}-R_{1PR}) < -0.4 \tag{18'}$$

It is more desirable to satisfy the following conditions:

$$2.2 \leq f12/fw \leq 3.2 \tag{17''}$$

$$-1.2 < (R_{1PF}+R_{1PR})/(R_{1PF}-R_{1PR}) < -0.6 \tag{18''}$$

In the present invention, an aspherical surface that divergence is impaired progressively in separating from the optical axis is introduced into the object-side surface of the positive lens, and thereby considerable effects of correction for off-axis aberrations are brought about.

It is desirable that the aspherical surface satisfies the following condition:

$$-0.10 \leq ASP12/fw < -0.00 \tag{19}$$

where ASP12 is the amount of deviation (deviation toward the image side is assumed to be positive) measured along the optical axis at a height h12 from the optical axis of the aspherical surface of the positive lens of the first lens unit, with respect to a reference spherical surface (a spherical surface with its center of curvature on the optical axis). Also, the height h12 is expressed by $h12=1.4 \cdot fw \cdot \tan \omega w$.

Below the lower limit of Condition (19), the effect of correction for coma produced by the entrance surface of the prism of the first lens unit is lessened. Beyond the upper limit thereof, correction for coma or distortion produced in the positive lens itself of the first lens unit is liable to become difficult, and pincushion distortion is also liable to be produced.

It is further desirable to satisfy the following condition:

$$-0.07 \leq ASP12/fw \leq -0.01 \tag{19'}$$

It is more desirable to satisfy the following condition:

$$-0.04 \leq ASP12/fw \leq -0.02 \tag{19''}$$

In the disclosure so far, reference has been made to means for improving imaging performance while rendering the zoom lens system slim.

Subsequently, requirements for reducing the thicknesses of filters will be described below.

In the electronic imaging device, an infrared absorbing filter of certain thickness is usually placed on the object side of the image sensor so as to prevent infrared light from entering the imaging plane.

Consider the infrared absorbing filter to be replaced by a coating with little thickness in order to render the optical system short or slim. In this case, of course, the thickness of the optical system is reduced accordingly, but a secondary effect is brought about.

When a near-infrared sharp-cutoff coat which has a transmittance of 80% or more at a wavelength of 600 nm and a transmittance of 8% or less at a wavelength of 700 nm is introduced into the optical path on the object side of the image sensor located behind the zoom lens system, the transmittance in a near-infrared region of more than 700 nm wavelengths is lower than in the absorption type and the transmittance for red becomes relatively high. A tendency of blue-violet to magenta which is a defect of a solid-state image sensor, such as a CCD, having a complementary mosaic filter is moderated by gain adjustment, and color reproduction which is the same as in the solid-state image sensor, such as a CCD, having a primary-color filter can be obtained. Moreover, the color reproduction of color having a high reflectance in the near-infrared region, like plants or human skin, not to speak of the primary or complementary colors, is improved.

That is, it is desirable to satisfy the following conditions:

$$\tau 600/\tau 550 \geq 0.8 \tag{20}$$

$$\tau 700/\tau 550 \leq 0.08 \tag{21}$$

where τ600 is a transmittance at a wavelength of 600 nm, τ550 is a transmittance at a wavelength of 550 nm, and τ700 is a transmittance at a wavelength of 700 nm.

It is rather desirable to satisfy the following conditions:

$$\tau 600/\tau 550 \geq 0.85 \tag{20'}$$

$$\tau 700/\tau 550 \leq 0.05 \tag{21'}$$

It is more desirable to satisfy the following conditions:

$$\tau 600/\tau 550 \geq 0.9 \tag{20''}$$

$$\tau 700/\tau 550 \leq 0.03 \tag{21''}$$

Another defect of the solid-state image sensor, such as the CCD, is that the sensitivity to a wavelength of 550 nm in a near-ultraviolet region is much higher than that of the human eye. This gives rise to a considerable color blot at the edge of an image because of chromatic aberration in the near-ultraviolet region. In particular, when the optical system is downsized, a fatal result is brought about. Thus, when an absorber or reflector such that the ratio of the transmittance (τ400) at a wavelength of 400 nm to the transmittance (τ550) at a wavelength of 550 nm is 0.08 or less, and the ratio of the transmittance (τ440) at a wavelength of 440 nm to the transmittance (τ550) at a wavelength of 550 nm is 0.4 or more, is introduced into the optical path, a noise, such as the color blot, is lessened significantly without losing the wavelength region required for color reproduction (while holding good color reproduction).

That is, it is desirable to satisfy the following conditions:

$$\tau 400/\tau 550 \leq 0.08 \tag{22}$$

$$\tau 400/\tau 550 \geq 0.4 \tag{23}$$

It is further desirable to satisfy the following conditions:

$$\tau 400/\tau 550 \leq 0.06 \tag{22'}$$

$$\tau 400/\tau 550 \geq 0.5 \tag{23'}$$

It is more desirable to satisfy the following conditions:

$$\tau 400/\tau 550 \leq 0.04 \tag{22''}$$

$$\tau 400/\tau 550 \geq 0.6 \tag{23''}$$

Also, it is favorable that such a filter is located between the imaging optical system and the image sensor.

On the other hand, in the complementary color filter, a substantial sensitivity is higher than in a CCD with a primary-color filter and resolution is advantageous because of the magnitude of transmission light energy. Hence, there is a great merit when a small-sized CCD is used.

In order to render the optical system short or slim, it is desirable that the thickness of an optical low-pass filter which is an alternative to the above filter is made as small as possible. In general, the optical low-pass filter makes use of the birefringence function of a uniaxial crystal like a quartz crystal. Here, when the optical system includes a plurality of crystal optical low-pass filters in which angles made by crystal axes with the optical axis of the zoom lens are in the range of 35 to 55° and directions where the crystal axes are projected on the image plane are different, or a single crystal optical low-pass filter, it is desirable that the thickness of the filter satisfies the following conditions:

when a <4 μm, $$0.08a < t_{LPF} < 0.16a \quad (24)$$

when a <3 μm, $$0.075a < t_{LPF} < 0.15a \quad (25)$$

where $t_{LPF}$ (mm) is the thickness of the optical low-pass filter which is largest along the optical axis of the zoom lens, the filter having one crystal axis where an angle made by the crystal axis with the optical axis of the zoom lens is between 35 and 55°, and a is a horizontal pixel pitch (μm) of an electronic image sensor.

Of the single optical low-pass filter and the plurality of optical low-pass filters, a filter of the largest thickness is set so that, theoretically, contrast becomes zero at a Nyquist rate. The thickness is about a/5.88 (mm). In larger thicknesses than this, an effect is produced on the prevention of false signals, such as moire fringes, but the resolution of the image sensor cannot be completely exerted. On the other hand, in less thicknesses, false signals, such as moire fringes, cannot be completely elimiated. However, the false signals, such as moire fringes, have a close relation with the imaging performance of a photographic lens, and when the imaging performance is high, the false signals, such as moire fringes, are liable to be produced. Hence, it is good practice that the thickness of the optical low-pass filter is set so as to be somewhat large when the imaging performance is high and to be somewhat small when it is not so high.

On the other hand, as the pixel pitch diminishes, the contrast of a frequency component above the Nyquist limit is decreased by the influence of diffraction of an imaging lens system, and thus the production of the false signals, such as moire fringes, is reduced. Therefore, when a thickness of a/5.88 (mm) is reduced by a few percents to several tens of percents, the contrast at a spatial frequency below the frequency corresponding to the Nyquist limit is rather improved, which is favorable.

It is more effective to satisfy the following conditions:

when a <4 μm, $$0.075a < t_{LPF} < 0.15a \quad (24')$$

when a <3 μm, $$0.07a < t_{LPF} < 0.14a \quad (25')$$

It is still more effective to satisfy the following conditions:

when a <4 μm, $$0.07a < t_{LPF} < 0.14a \quad (24'')$$

when a <3 μm, $$0.065a < t_{LPF} < 0.13a \quad (25'')$$

In a <4 μm, when the thickness of the optical low-pass filter is extremely reduced, the fabrication of the filter becomes difficult. As such, there is another technique of increasing the spatial frequency (a cutoff frequency) that the contrast becomes zero without extremely reducing the thickness of the optical low-pass filter, that is, even when the upper limits of Conditions (24), (24'), and (24'') are exceeded. This technique is that the angle made by the crystal axis of the optical low-pass filter with the optical axis of the zoom lens is set within the range of 15–35° or 55–75°, or the low-pass filter is eliminated, as the case may be. In the range of such angles, the amount of separation of incident light into an ordinary ray and an extraordinary ray is smaller than in the case of about 45°, and at 0° or 90°, the light ceases to be separated (however, at 90°, both are different in velocity and a phase difference is produced—the principle of a quarter-wave plate).

Moreover, as mentioned above, when the pixel pitch diminishes, the imaging performance of a high spatial frequency corresponding to this is degraded by the influence of diffraction, and thus it is difficult to increase the F-number. Hence, aperture stops in the case of the camera may include only two kinds: a state where considerable degradation is produced by geometric aberration (full aperture) and a state where a diffraction limit is produced. In this case, the optical low-pass filter need not necessarily be used.

In particular, when the pixel pitch is small and imaging performance where the stop is full aperture is best, an aperture stop whose inside diameter is variable may be used as a means for limiting the size of a light beam of incidence on the imaging plane, or an aperture stop whose diameter is constantly fixed may be used without replacement with another stop of different inside diameter. In this case, at least one of lens surfaces adjacent to the aperture stop is configured as a convex surface directed toward the aperture stop, and this lens surface is penetrated into the inside diameter portion of the aperture stop. By doing so, unnecessary space of the stop is eliminated and the overall length of the optical system can be reduced. Moreover, it is good practice to place an optical element (in which preferably, both the entrance and exit surfaces are flat) with a transmittance of 90% or less in space including the optical axis, across at least one lens surface from the aperture stop, on either side of the aperture stop, or to provide a means for replacing the optical element with another optical element of different transmittance.

Alternatively, a plurality of apertures in which the aperture size is fixed are provided so that one of them can be introduced into the optical path between the most image-side lens surface of the first lens unit and the most object-side lens surface of the third lens surface and can be replaced with another. In this way, the electronic imaging device is provided in which the illuminance of the image plane can be adjusted. In addition, it is favorable that the amount of light is adjusted in such a way that media that transmittances at a wavelength of 550 nm are different and less than 80% are provided in a few of the plurality of apertures.

As another way, when the amount of light is adjusted so as to correspond to the F value satisfying a condition: a (μm)/F-number <0.4, it is desirable that the electronic imaging device has media that transmittances at a wavelength of 550 nm are different and less than 80% in apertures. For example, it is desirable that the media are not used outside the limit of the condition from the open value or dummy media that transmittances at a wavelength of 550 nm are more than 91% are used, and the amount of light is adjusted, for instance, by an ND filter, without making the diameter of the aperture stop so small that the influence of diffraction is exerted, within the limit of the condition.

It is also desirable that individual diameters of the plurality of apertures are rendered small in reverse proportion to the F value, and instead of the ND filter, optical low-pass filters of different frequency characteristics are inserted in apertures. In this case, as the stop is stopped down, the degradation by diffraction becomes pronounced, and thus it is favorable that the optical filter is set so that the frequency characteristic of the optical filter is improved as the aperture diameter becomes small.

When the open F value at the wide-angle position and the pixel pitch a (μm) used satisfy a condition: F>a, the optical low-pass filter need not necessarily be used. That is, a medium on the optical path between the zoom lens system and the image sensor may be thought of as only air or a non-crystalline medium. It is for reason that because of the degradation of imaging performance caused by diffraction and geometric aberration, the frequency component which is capable of producing aliasing does not virtually exist.

Also, by properly combining the conditions and constructions mentioned above, a favorable electronic imaging device can be provided. In each of the conditions, only the upper limit value or only the lower limit value may be limited by the upper limit value or the lower limit value corresponding to a more favorable condition. Each of the corresponding values of the conditions in the embodiments to be described later may also be set as the upper limit value or the lower limit value.

In accordance with the drawings, the embodiments of the present invention will be described below.

First Embodiment

Figure 2A:
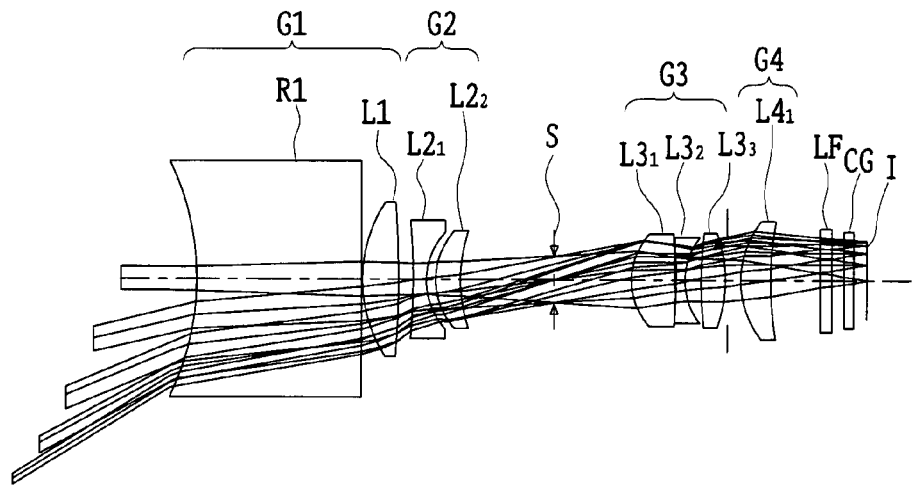
FIGS. 2A, 2B, and 2C are sectional views showing optical arrangements, developed along the optical axis, at wide-angle, middle, and telephoto positions, respectively, in focusing of the infinite object point of the zoom lens in the first embodiment.
Figure 2B:
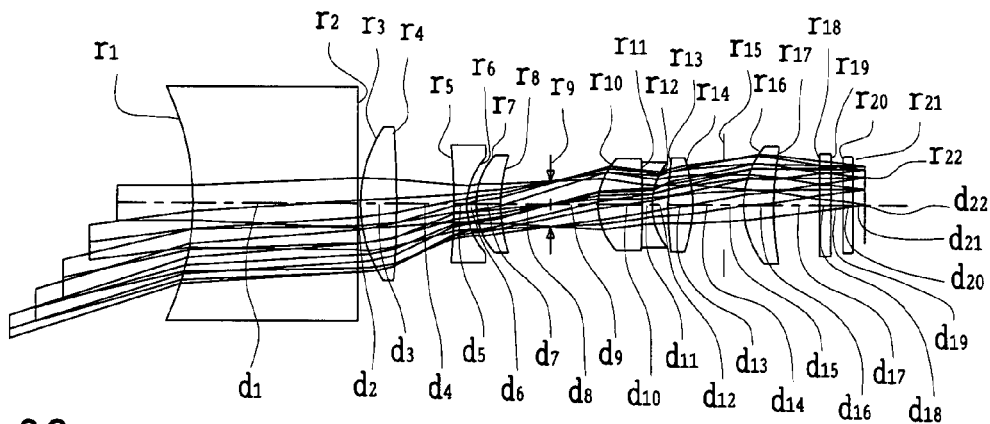
Figure 2C:
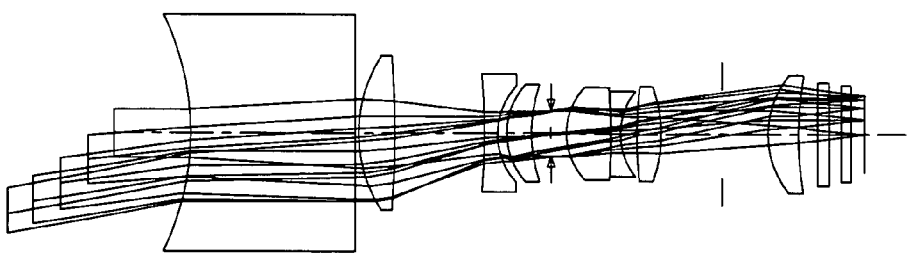

FIG. 1 shows an optical arrangement of the first embodiment of the zoom lens used in the electronic imaging device according to the present invention. FIGS. 2A, 2B, and 2C show optical arrangements at wide-angle, middle, and telephoto positions, respectively, of the zoom lens in the first embodiment. FIGS. 3A–3D, 4A–4D, and 5A–5D show aberration characteristics of the zoom lens in the first embodiment.

The electronic imaging device of the first embodiment, as shown in FIG. 1, has, in order from the object side, a zoom lens and a CCD which is an electronic image sensor. In FIG. 1, reference symbol I represents the imaging plane of the CCD. A planar plate-like optical low-pass filter LF and a CCD cover glass CG are provided between the zoom lens and the imaging plane I. Also, the maximum thickness of the optical low-pass filter LF in each of the embodiments will be described later. For the near-infrared sharp-cutoff coat in each embodiment, for example, the coat may be applied directly to the optical low-pass filter LF, otherwise an infrared cutoff absorbing filter may be placed, or the near-infrared sharp-cutoff coat may be applied to the entrance surface of a transparent planar plate.

The zoom lens of the first embodiment comprises, in order from the object side, a first lens unit G1, a second lens unit G2, an aperture stop S, a third lens unit G3, and a fourth lens unit G4.

The first lens unit G1 includes, in order from the object side, a reflecting optical element R1 for bending the optical path and a rear-side lens sub-unit with positive refracting power, and has positive refracting power as a whole.

The reflecting optical element R1 is constructed with a prism which has a path entrance surface $R1_1$, a reflecting surface $R1_2$ for bending the optical path, and an exit surface $R1_3$. The path entrance surface $R1_1$ is a concave surface directed toward the object side and is configured as an aspherical surface that divergence is impaired progressively in separating from the optical axis.

The rear-side lens sub-unit is constructed with a positive biconvex lens L1.

Also, the aspect ratio of an effective imaging area in each embodiment of the present invention is 3:4, and the optical path is bent in a lateral direction.

The second lens unit G2 includes, in order from the object side, a negative biconcave lens $L2_1$ and a positive meniscus lens $L2_2$ with a convex surface directed toward the object side, and has negative refracting power as a whole.

The third lens unit G3 includes a cemented lens component made up of a positive biconvex lens $L3_1$ and a negative biconcave lens $L3_2$ and a positive biconvex lens $L3_3$, and has positive refracting power as a whole.

The fourth lens unit G4 includes a positive meniscus lens $L4_1$ with a convex surface directed toward the object side, and has positive refracting power as a whole.

When the magnification of the zoom lens is changed, varying from the wide-angle position to the telephoto position, in focusing of an infinite object point, the first lens unit G1 is fixed in position, the second lens unit G2 is moved toward only the image side, the aperture stop S is nearly fixed in position, the third lens unit G3 is moved toward only the object side, and the fourth lens unit G4 is moved toward only the image side.

In a focusing operation, the fourth lens unit G4 is moved along the optical axis.

Aspherical surfaces are provided to the path entrance surface $R1_1$ of the reflecting optical element R1 in the first lens unit G1, the object-side surface of the positive biconvex lens L1 in the first lens unit G1, and the object-side surface of the negative biconcave lens $L2_1$ in the second lens unit G2.

Subsequently, numerical data of optical members constituting the zoom lens of the first embodiment are shown below.

Also, in the numerical data of the first embodiment, $r_1, r_2, \ldots$ denote radii of curvature of individual lens surfaces; $d_1, d_2, \ldots$ denote thicknesses of individual lenses or air spacings between them; $n_{d1}, n_{d2}, \ldots$ denote refractive indices of individual lenses at the d line; $\nu_{d1}, \nu_{d2}, \ldots$ denote Abbe's numbers of individual lenses; Fno denotes an F-number; f denotes the focal length of the entire system; and D0 denotes a distance from an object to a first surface.

Also, when z is taken as the coordinate in the direction of the optical axis, y is taken as the coordinate normal to the optical axis, K represents a conic coefficient, and $A_4, A_6, A_8,$ and $A_{10}$ represent aspherical coefficients, the configuration of each of the aspherical surfaces is expressed by the following equation:

$$z=(y^2/r)/[1+\{1-(1+K)(y/r)^2\}^{1/2}]+A_4y^4+A_6y^6+A_8y^8+A_{10}y^{10}$$

These symbols hold for the numerical data of the embodiments to be described later.

Numerical Data 1

| | | |
|---|---|---|
| $r_1 = -10.6053$ (aspherical) | $d_1 = 12.500$ | $n_{d1} = 1.58423$ $\nu_{d1} = 30.49$ |
| $r_2 = \infty$ | $d_2 = 0.1500$ | |
| $r_3 = 9.0934$ (aspherical) | $d_3 = 2.8000$ | $n_{d3} = 1.69350$ $\nu_{d3} = 53.21$ |
| $r_4 = -67.6293$ | $d_4 = D4$ | |
| $r_5 = -27.5574$ (aspherical) | $d_5 = 0.9000$ | $n_{d5} = 1.74320$ $\nu_{d5} = 49.34$ |
| $r_6 = 4.7156$ | $d_6 = 0.9525$ | |
| $r_7 = 5.8126$ | $d_7 = 1.9000$ | $n_{d7} = 1.84666$ $\nu_{d7} = 23.78$ |
| $r_8 = 10.2732$ | $d_8 = D8$ | |
| $r_9 = \infty$ (stop) | $d_9 = D9$ | |
| $r_{10} = 4.9855$ (aspherical) | $d_{10} = 3.3547$ | $n_{d10} = 1.74320$ $\nu_{d10} = 49.34$ |
| $r_{11} = -40.0000$ | $d_{11} = 0.7000$ | $n_{d11} = 1.84666$ $\nu_{d11} = 23.78$ |
| $r_{12} = 4.4836$ | $d_{12} = 1.3000$ | |

-continued

| | | |
|---|---|---|
| $r_{13} = 51.7818$ | $d_{13} = 1.8000$ $n_{d13} = 1.69350$ $v_{d13} = 53.21$ | |
| $r_{14} = -10.8001$ | $d_{14} = D14$ | |
| $r_{15} = \infty$ | $d_{15} = D15$ | |
| (position of variable transmittance means or shutter) | | |
| $r_{16} = 7.1465$ | $d_{16} = 2.3000$ $n_{d16} = 1.63930$ $v_{d16} = 44.87$ | |
| $r_{17} = 22.4866$ | $d_{17} = D17$ | |
| $r_{18} = \infty$ | $d_{18} = 1.0500$ $n_{d18} = 1.54771$ $v_{d18} = 62.84$ | |
| $r_{19} = \infty$ | $d_{19} = 0.8000$ | |
| $r_{20} = \infty$ | $d_{20} = 0.8000$ $n_{d20} = 1.51633$ $v_{d20} = 64.14$ | |
| $r_{21} = \infty$ | $d_{21} = D21$ | |
| $r_{22} = \infty$ (imaging plane) | $d_{22} = 0$ | |

Aspherical coefficients

First surface $K = 0$
$A_2 = 0$       $A_4 = 5.4542 \times 10^{-4}$   $A_6 = -3.8239 \times 10^{-6}$
$A_8 = 2.4998 \times 10^{-8}$   $A_{10} = 0$ Third surface $K = 0$
$A_2 = 0$       $A_4 = -2.8489 \times 10^{-4}$   $A_6 = -5.8883 \times 10^{-7}$
$A_8 = -1.0797 \times 10^{-8}$   $A_{10} = 0$ Fifth surface $K = 0$
$A_2 = 0$       $A_4 = 1.4736 \times 10^{-4}$   $A_6 = 1.1080 \times 10^{-5}$
$A_8 = -2.3720 \times 10^{-7}$   $A_{10} = 0$ Tenth surface $K = 0$
$A_2 = 0$       $A_4 = -4.4622 \times 10^{-4}$   $A_6 = -8.1489 \times 10^{-6}$
$A_8 = -7.0861 \times 10^{-7}$   $A_{10} = 0$ Zoom data
When the distance D0 is ∞,

| | Wide-angle | Middle | Telephoto |
|---|---|---|---|
| f (mm) | 5.00506 | 8.69831 | 14.59911 |
| Fno | 2.7396 | 3.2400 | 3.9920 |
| D0 | ∞ | ∞ | ∞ |
| D4 | 0.99851 | 4.26725 | 6.68010 |
| D8 | 7.17869 | 3.90788 | 1.49717 |
| D9 | 5.81377 | 3.47300 | 1.09935 |
| D14 | 0.09877 | 2.44081 | 4.81310 |
| D15 | 1.00032 | 1.43048 | 3.23772 |
| D17 | 3.73689 | 3.30817 | 1.49955 |
| D21 | 1.00000 | 1.00000 | 1.00000 |

Second Embodiment

Figure 6:
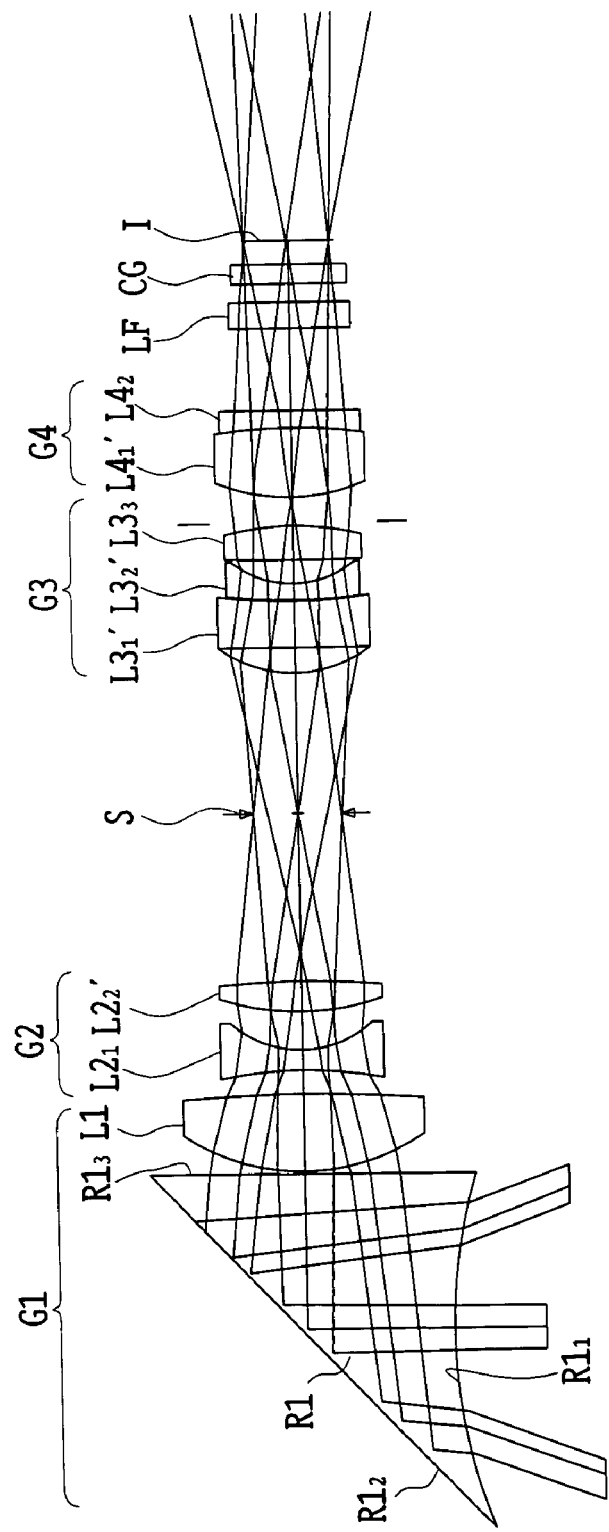
FIG. 6 is a sectional view showing an optical arrangement, developed along the optical axis, at the wide-angle position where the optical path is bent in focusing of the infinite object point, in a second embodiment of the zoom lens used in the electronic imaging device according to the present invention.
Figure 7A:
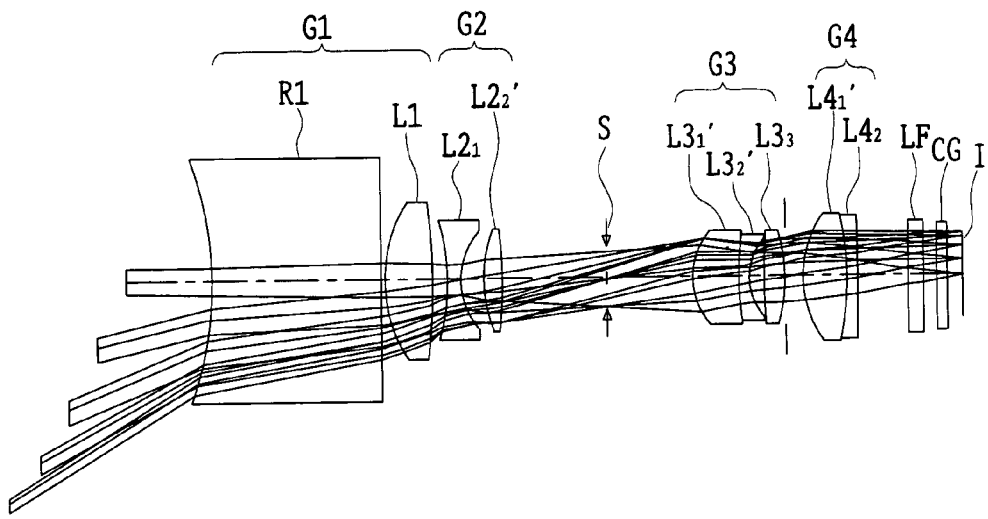
FIGS. 7A, 7B, and 7C are sectional views showing optical arrangements, developed along the optical axis, at wide-angle, middle, and telephoto positions, respectively, in focusing of the infinite object point of the zoom lens in the second embodiment.
Figure 7B:
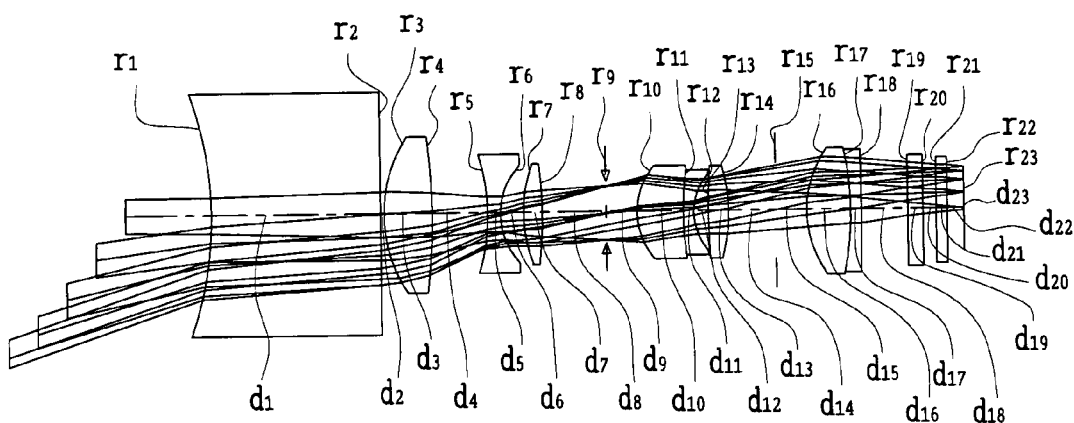
Figure 7C:
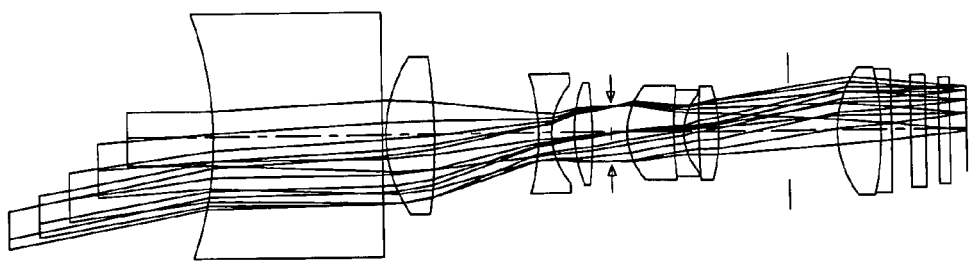

FIG. 6 shows an optical arrangement of the second embodiment of the zoom lens used in the electronic imaging device according to the present invention. FIGS. 7A, 7B, and 7C show optical arrangements at wide-angle, middle, and telephoto positions, respectively, of the zoom lens in the second embodiment. FIGS. 8A–8D, 9A–9D, and 10A–10D show aberration characteristics of the zoom lens in the second embodiment.

The electronic imaging device of the second embodiment, as shown in FIG. 6, has, in order from the object side, the zoom lens and the CCD which is the electronic image sensor. The planar plate-like optical low-pass filter LF and the CCD cover glass CG are provided between the zoom lens and the imaging plane I.

The zoom lens comprises, in order from the object side, the first lens unit G1, the second lens unit G2, the aperture stop S, the third lens unit G3, and the fourth lens unit G4.

The first lens unit G1 includes, in order from the object side, the reflecting optical element R1 for bending the optical path and a rear-side lens sub-unit with positive refracting power, and has positive refracting power as a whole.

The reflecting optical element R1 is constructed with the prism which has the path entrance surface $R1_1$, the reflecting surface $R1_2$ for bending the optical path, and the exit surface $R1_3$. The path entrance surface $R1_1$ is a concave surface directed toward the object side and is configured as an aspherical surface that divergence is impaired progressively in separating from the optical axis.

The rear-side lens sub-unit is constructed with the positive biconvex lens L1.

The second lens unit G2 includes, in order from the object side, the negative biconcave lens $L2_1$ and a positive biconvex lens $L2_2'$, and has negative refracting power as a whole.

The third lens unit G3 includes a cemented lens component made up of a positive meniscus lens $L3_1'$ with a convex surface directed toward the object side and a negative meniscus lens $L3_2'$ with a convex surface directed toward the object side and a positive biconvex lens $L3_3$, and has positive refracting power as a whole.

The fourth lens unit G4 includes a positive biconvex lens $L4_1'$ and a negative biconcave lens $L4_2$, and has positive refracting power as a whole.

When the magnification of the zoom lens is changed, varying from the wide-angle position to the telephoto position, in focusing of an infinite object point, the first lens unit G1 is fixed in position, the second lens unit G2 is moved toward only the image side, the aperture stop S is nearly fixed in position, the third lens unit G3 is moved toward only the object side, and the fourth lens unit G4 is moved toward only the image side.

In the focusing operation, the fourth lens unit G4 is moved along the optical axis.

Aspherical surfaces are provided to the path entrance surface $R1_1$ of the reflecting optical element R1 in the first lens unit G1, the object-side surface of the positive biconvex lens L1 in the first lens unit G1, and both surfaces of the negative biconcave lens $L2_1$ in the second lens unit G2.

Subsequently, numerical data of optical members constituting the zoom lens of the second embodiment are shown below.

Numerical Data 2

| | | |
|---|---|---|
| $r_1 = -13.7597$ (aspherical) | $d_1 = 11.4997$ $n_{d1} = 1.68893$ $v_{d1} = 31.07$ | |
| $r_2 = \infty$ | $d_2 = 0.1500$ | |
| $r_3 = 8.2086$ (aspherical) | $d_3 = 3.3000$ $n_{d3} = 1.61800$ $v_{d3} = 63.33$ | |
| $r_4 = -49.7588$ | $d_4 = D4$ | |
| $r_5 = -11.3680$ (aspherical) | $d_5 = 0.9000$ $n_{d5} = 1.74320$ $v_{d5} = 49.34$ | |
| $r_6 = 4.3173$ (aspherical) | $d_6 = 1.5983$ | |
| $r_7 = 10.2292$ | $d_7 = 1.3000$ $n_{d7} = 1.71736$ $v_{d7} = 29.52$ | |
| $r_8 = -32.6994$ | $d_8 = D8$ | |
| $r_9 = \infty$ (stop) | $d_9 = D9$ | |
| $r_{10} = 4.7862$ (aspherical) | $d_{10} = 3.1647$ $n_{d10} = 1.74320$ $v_{d10} = 49.34$ | |
| $r_{11} = 20.0000$ | $d_{11} = 0.7000$ $n_{d11} = 1.84666$ $v_{d11} = 23.78$ | |
| $r_{12} = 4.1429$ | $d_{12} = 1.0000$ | |
| $r_{13} = 56.6663$ | $d_{13} = 1.4000$ $n_{d13} = 1.69350$ $v_{d13} = 53.21$ | |
| $r_{14} = -12.7945$ | $d_{14} = D14$ | |
| $r_{15} = \infty$ | $d_{15} = D15$ | |
| (position of variable transmittance means or shutter) | | |
| $r_{16} = 7.8917$ | $d_{16} = 3.0000$ $n_{d16} = 1.60311$ $v_{d16} = 60.64$ | |
| $r_{17} = -20.0000$ | $d_{17} = 0.7000$ $n_{d17} = 1.84666$ $v_{d17} = 23.78$ | |
| $r_{18} = 304.7498$ | $d_{18} = D18$ | |
| $r_{19} = \infty$ | $d_{19} = 1.0500$ $n_{d19} = 1.54771$ $v_{d19} = 62.84$ | |

-continued

| | |
|---|---|
| $r_{20} = \infty$ | $d_{20} = 0.8000$ |
| $r_{21} = \infty$ | $d_{21} = 0.8000$  $n_{d21} = 1.51633$  $v_{d21} = 64.14$ |
| $r_{22} = \infty$ | $d_{22} = D22$ |
| $r_{23} = \infty$ (imaging plane) | $d_{23} = 0$ |

Aspherical coefficients

First surface $K = 0$
$A_2 = 0$  $A_4 = 3.6062 \times 10^{-4}$  $A_6 = -2.8033 \times 10^{-6}$
$A_8 = 1.5008 \times 10^{-8}$  $A_{10} = 0$ Third surface $K = 0$
$A_2 = 0$  $A_4 = -3.7455 \times 10^{-4}$  $A_6 = -7.5607 \times 10^{-7}$
$A_8 = -3.3775 \times 10^{-8}$  $A_{10} = 0$ Fifth surface $K = 0$
$A_2 = 0$  $A_4 = 6.1124 \times 10^{-4}$  $A_6 = 8.9600 \times 10^{-6}$
$A_8 = -1.0452 \times 10^{-6}$  $A_{10} = 0$ Sixth surface $K = 0$
$A_2 = 0$  $A_4 = -1.6183 \times 10^{-3}$  $A_6 = 4.0365 \times 10^{-5}$
$A_8 = -9.1482 \times 10^{-6}$  $A_{10} = 0$ Tenth surface $K = 0$
$A_2 = 0$  $A_4 = -4.5256 \times 10^{-4}$  $A_6 = -1.2357 \times 10^{-5}$
$A_8 = -9.2827 \times 10^{-7}$  $A_{10} = 0$ Zoom data
When the distance D0 is ∞,

| | Wide-angle | Middle | Telephoto |
|---|---|---|---|
| f (mm) | 5.00105 | 8.70106 | 14.59966 |
| Fno | 2.8257 | 3.6392 | 3.9902 |
| D0 | ∞ | ∞ | ∞ |
| D4 | 0.99857 | 3.65006 | 6.94968 |
| D8 | 7.15056 | 4.49602 | 1.19946 |
| D9 | 5.89443 | 2.01648 | 0.99960 |
| D14 | 0.09997 | 3.14699 | 4.80619 |
| D15 | 1.09996 | 2.13853 | 3.23284 |
| D18 | 3.44559 | 3.23816 | 1.49935 |
| D22 | 1.00000 | 1.00000 | 1.00000 |

Third Embodiment

Figure 11:
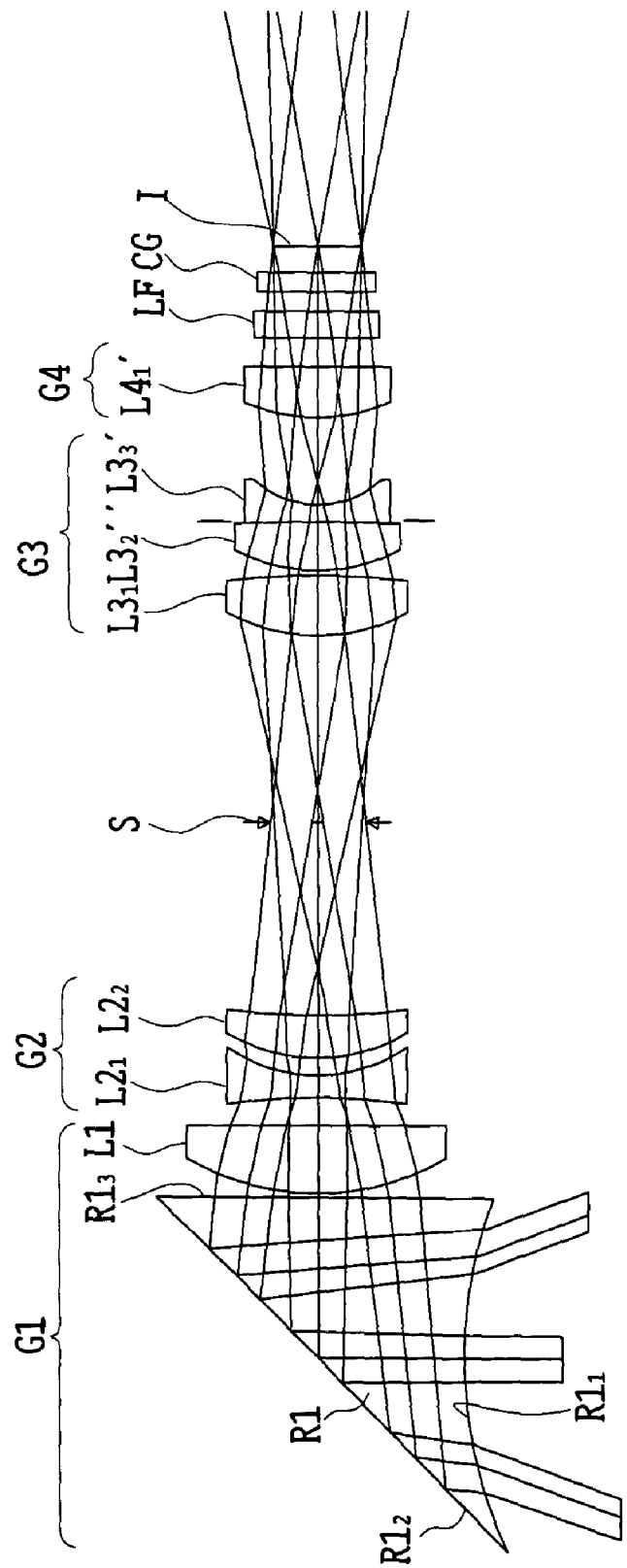
FIG. 11 is a sectional view showing an optical arrangement, developed along the optical axis, at the wide-angle position where the optical path is bent in focusing of the infinite object point, in a third embodiment of the zoom lens used in the electronic imaging device according to the present invention.
Figure 12A:
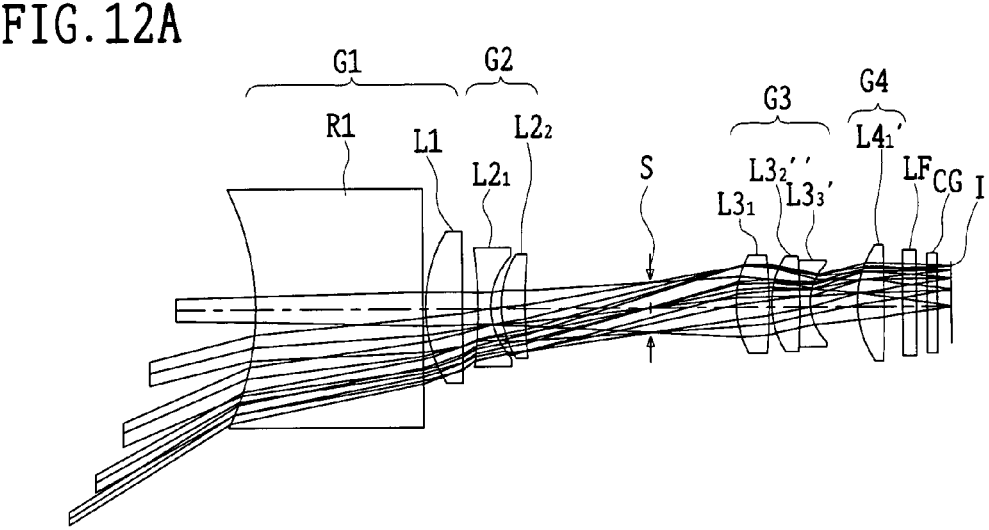
FIGS. 12A, 12B, and 12C are sectional views showing optical arrangements, developed along the optical axis, at wide-angle, middle, and telephoto positions, respectively, in focusing of the infinite object point of the zoom lens in the third embodiment.
Figure 12B:
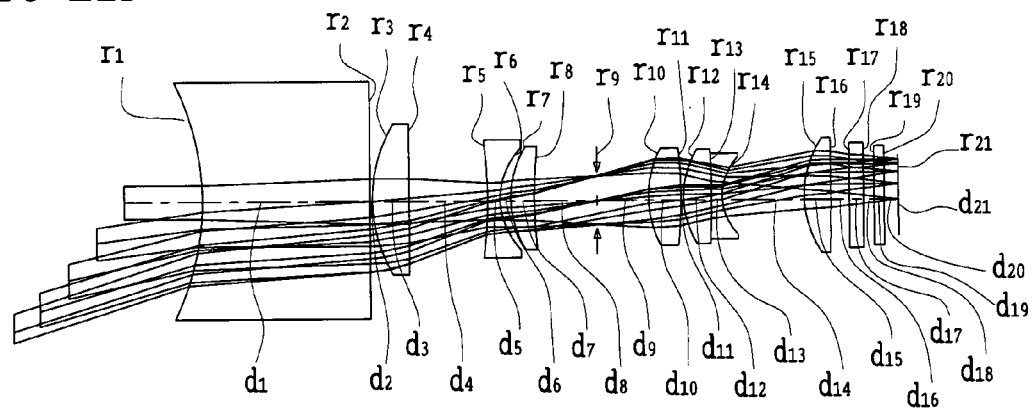
Figure 12C:
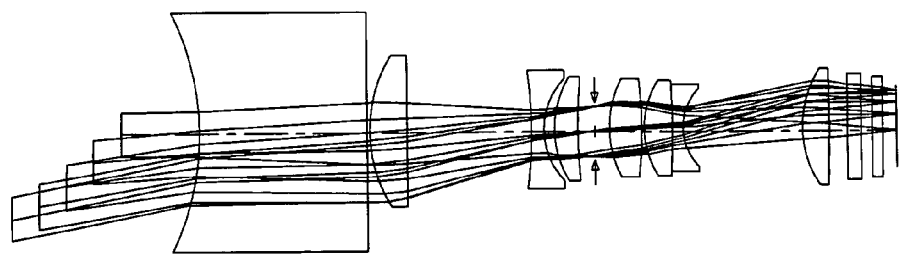

FIG. 11 shows an optical arrangement of the third embodiment of the zoom lens used in the electronic imaging device according to the present invention. FIGS. 12A, 12B, and 12C show optical arrangements at wide-angle, middle, and telephoto positions, respectively, of the zoom lens in the third embodiment. FIGS. 13A–13D, 14A–14D, and 15A–15D show aberration characteristics of the zoom lens in the third embodiment.

The electronic imaging device of the third embodiment, as shown in FIG. 11, has, in order from the object side, the zoom lens and the CCD which is the electronic image sensor. The planar plate-like optical low-pass filter LF and the CCD cover glass CG are provided between the zoom lens and the imaging plane I.

The zoom lens comprises, in order from the object side, the first lens unit GI, the second lens unit G2, the aperture stop S, the third lens unit G3, and the fourth lens unit G4.

The first lens unit G1 includes, in order from the object side, the reflecting optical element R1 for bending the optical path and a rear-side lens sub-unit with positive refracting power, and has positive refracting power as a whole.

The reflecting optical element R1 is constructed with the prism which has the path entrance surface $R1_1$, the reflecting surface $R1_2$ for bending the optical path, and the exit surface $R1_3$. The path entrance surface $R1_1$ is a concave surface directed toward the object side and is configured as an aspherical surface that divergence is impaired progressively in separating from the optical axis.

The rear-side lens sub-unit is constructed with the positive biconvex lens L1.

The second lens unit G2 includes, in order from the object side, the negative biconcave lens $L2_1$ and the positive meniscus lens $L2_2$ with a convex surface directed toward the object side, and has negative refracting power as a whole.

The third lens unit G3 includes the positive biconvex lens $L3_1$ and a cemented lens component made up of a positive biconvex lens $L3_2$" and a negative biconcave lens $L3_3$', and has positive refracting power as a whole.

The fourth lens unit G4 includes the positive biconvex lens $L4_1$', and has positive refracting power as a whole.

When the magnification of the zoom lens is changed, varying from the wide-angle position to the telephoto position, in focusing of an infinite object point, the first lens unit G1 is fixed in position, the second lens unit G2 is moved toward only the image side, the aperture stop S is nearly fixed in position, the third lens unit G3 is moved toward only the object side, and the fourth lens unit G4 remains fixed in position.

In the focusing operation, the third lens unit G3 is moved along the optical axis.

Aspherical surfaces are provided to the path entrance surface $R1_1$, of the reflecting optical element R1 in the first lens unit G1, the object-side surface of the positive biconvex lens L1 in the first lens unit G1, both surfaces of the negative biconcave lens $L2_1$, in the second lens unit G2, and both surfaces of the positive biconvex lens $L3_1$, in the third lens unit G3.

Subsequently, numerical data of optical members constituting the zoom lens of the third embodiment are shown below.

Numerical Data 3

| | | |
|---|---|---|
| $r_1 = -11.3542$ (aspherical) | $d_1 = 12.5000$  $n_{d1} = 1.58423$  $v_{d1} = 30.49$ |
| $r_2 = \infty$ | $d_2 = 0.1500$ |
| $r_3 = 9.0445$ (aspherical) | $d_3 = 2.8000$  $n_{d3} = 1.58313$  $v_{d3} = 59.38$ |
| $r_4 = -382.1602$ | $d_4 = D4$ |
| $r_5 = -27.3827$ (aspherical) | $d_5 = 0.9000$  $n_{d5} = 1.80610$  $v_{d5} = 40.92$ |
| $r_6 = 5.1693$ (aspherical) | $d_6 = 0.7000$ |
| $r_7 = 7.1225$ | $d_7 = 1.8000$  $n_{d7} = 1.84666$  $v_{d7} = 23.78$ |
| $r_8 = 30.6902$ | $d_8 = D8$ |
| $r_9 = \infty$ (stop) | $d_9 = D9$ |
| $r_{10} = 7.1380$ (aspherical) | $d_{10} = 2.5000$  $n_{d10} = 1.74320$  $v_{d10} = 49.34$ |
| $r_{11} = -27.5424$ (aspherical) | $d_{11} = 0.1500$ |
| $r_{12} = 7.2126$ | $d_{12} = 1.9993$  $n_{d12} = 1.58913$  $v_{d12} = 61.14$ |
| $r_{13} = -100.0000$ | $d_{13} = 0.7000$  $n_{d13} = 1.84666$  $v_{d13} = 23.78$ |
| $r_{14} = 3.9513$ | $d_{14} = D14$ |
| $r_{15} = 7.7782$ | $d_{15} = 2.0000$  $n_{d15} = 1.61800$  $v_{d15} = 63.33$ |
| $r_{16} = -381.4171$ | $d_{16} = D16$ |
| $r_{17} = \infty$ | $d_{17} = 1.0500$  $n_{d17} = 1.54771$  $v_{d17} = 62.84$ |
| $r_{18} = \infty$ | $d_{18} = 0.8000$ |
| $r_{19} = \infty$ | $d_{19} = 0.8000$  $n_{d19} = 1.51633$  $v_{d19} = 64.14$ |
| $r_{20} = \infty$ | $d_{20} = D20$ |
| $r_{21} = \infty$ (imaging plane) | $d_{21} = 0$ |

Aspherical coefficients

First surface $K = 0$
$A_2 = 0$  $A_4 = 4.5480 \times 10^{-4}$  $A_6 = -2.7092 \times 10^{-6}$
$A_8 = 1.5948 \times 10^{-8}$  $A_{10} = 0$ -continued Third surface $K = 0$
$A_2 = 0$       $A_4 = -2.9898 \times 10^{-4}$    $A_6 = -9.7346 \times 10^{-7}$
$A_8 = -1.6495 \times 10^{-9}$   $A_{10} = 0$ Fifth surface $K = 0$
$A_2 = 0$       $A_4 = 3.7614 \times 10^{-6}$    $A_6 = 6.5555 \times 10^{-6}$
$A_8 = -1.9164 \times 10^{-7}$   $A_{10} = 0$ Sixth surface $K = 0$
$A_2 = 0$       $A_4 = -5.1829 \times 10^{-4}$   $A_6 = 1.0921 \times 10^{-5}$
$A_8 = -1.6448 \times 10^{-6}$   $A_{10} = 0$ Tenth surface $K = 0$
$A_2 = 0$       $A_4 = -1.4632 \times 10^{-4}$   $A_6 = -7.8272 \times 10^{-6}$
$A_8 = -4.4522 \times 10^{-7}$   $A_{10} = 0$ Eleventh surface $K = 0$
$A_2 = 0$       $A_4 = 3.0501 \times 10^{-4}$    $A_6 = -5.0277 \times 10^{-6}$
$A_8 = -7.2756 \times 10^{-7}$   $A_{10} = 0$ Zoom data
When the distance D0 is ∞,

|        | Wide-angle | Middle   | Telephoto |
|--------|------------|----------|-----------|
| f (mm) | 5.00129    | 8.69970  | 14.59960  |
| Fno    | 2.8183     | 3.4910   | 4.4109    |
| D0     | ∞          | ∞        | ∞         |
| D4     | 1.10030    | 5.56209  | 8.99644   |
| D8     | 9.19626    | 4.72989  | 1.30016   |
| D9     | 6.36534    | 3.83244  | 1.00059   |
| D14    | 3.52296    | 6.08876  | 8.82056   |
| D16    | 1.30081    | 1.26767  | 1.36800   |
| D20    | 1.00000    | 1.00000  | 1.00000   |

Fourth Embodiment

Figure 16:
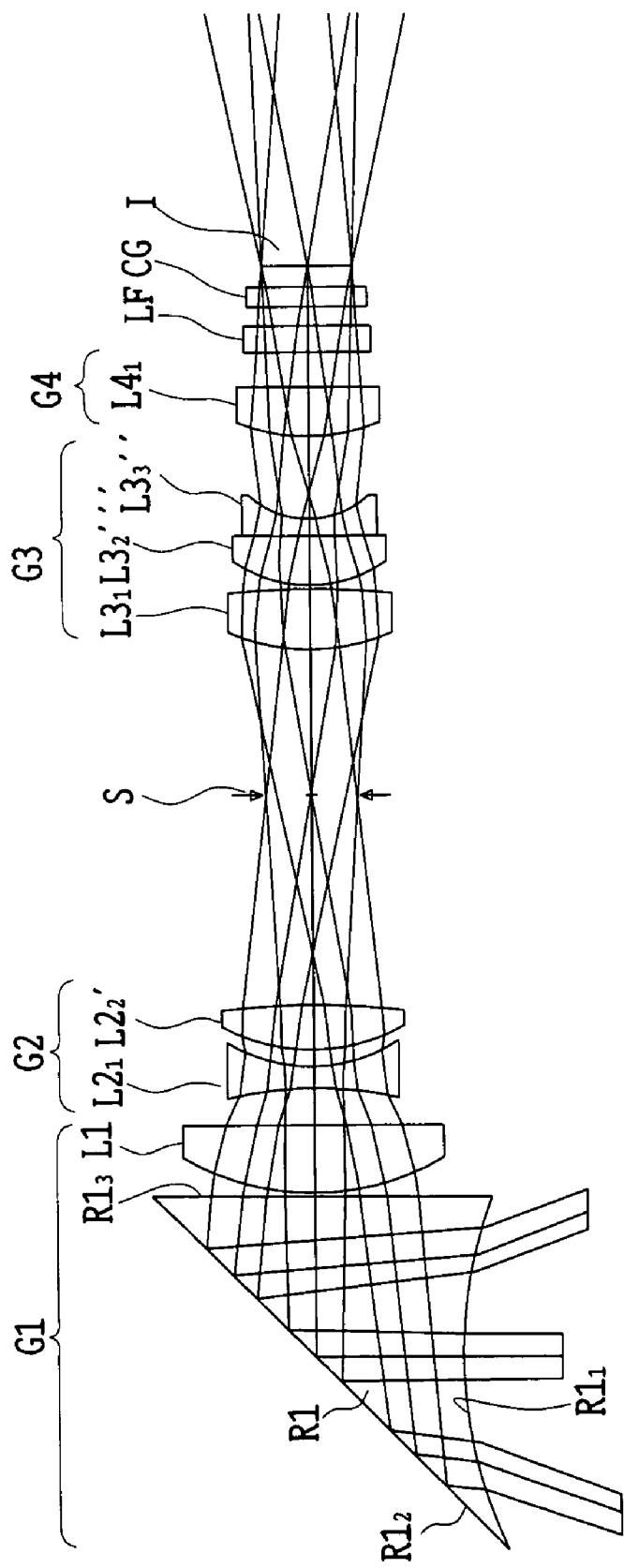
FIG. 16 is a sectional view showing an optical arrangement, developed along the optical axis, at the wide-angle position where the optical path is bent in focusing of the infinite object point, in a fourth embodiment of the zoom lens used in the electronic imaging device according to the present invention.
Figure 17A:
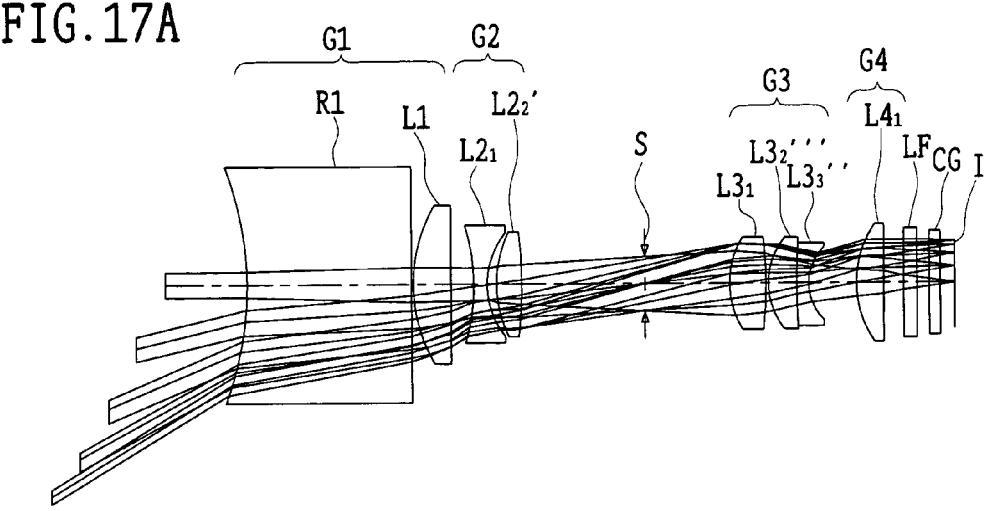
FIGS. 17A, 17B, and 17C are sectional views showing optical arrangements, developed along the optical axis, at wide-angle, middle, and telephoto positions, respectively, in focusing of the infinite object point of the zoom lens in the fourth embodiment.
Figure 17B:
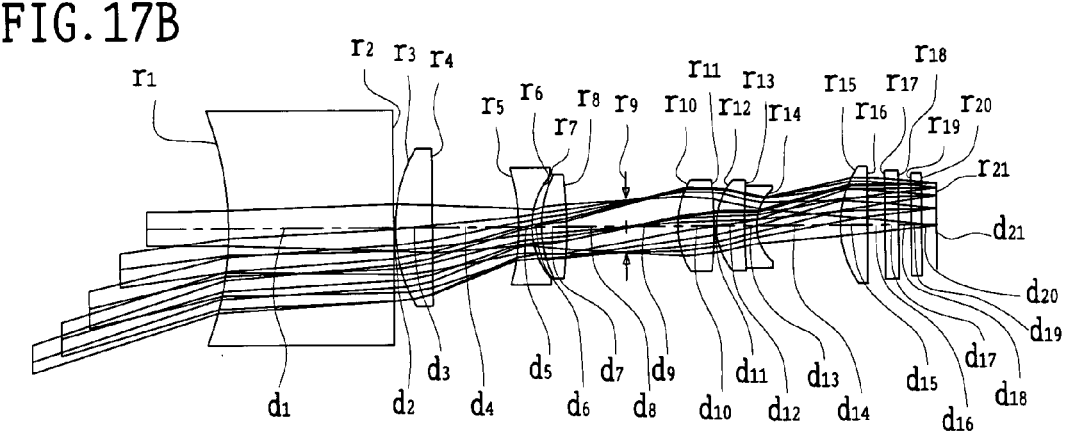
Figure 17C:
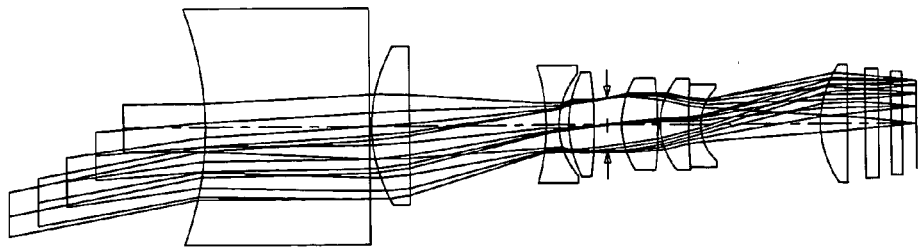

FIG. 16 shows an optical arrangement of the fourth embodiment of the zoom lens used in the electronic imaging device according to the present invention. FIGS. 17A, 17B, and 17C show optical arrangements at wide-angle, middle, and telephoto positions, respectively, of the zoom lens in the fourth embodiment. FIGS. 18A–18D, 19A–19D, and 20A–20D show aberration characteristics of the zoom lens in the fourth embodiment.

The electronic imaging device of the fourth embodiment, as shown in FIG. 16, has, in order from the object side, the zoom lens and the CCD which is the electronic image sensor. The planar plate-like optical low-pass filter LF and the CCD cover glass CG are provided between the zoom lens and the imaging plane I.

The zoom lens comprises, in order from the object side, the first lens unit G1, the second lens unit G2, the aperture stop S, the third lens unit G3, and the fourth lens unit G4.

The first lens unit G1 includes, in order from the object side, the reflecting optical element R1 for bending the optical path and a rear-side lens sub-unit with positive refracting power, and has positive refracting power as a whole.

The reflecting optical element R1 is constructed with the prism which has the path entrance surface $R1_1$, the reflecting surface $R1_2$ for bending the optical path, and the exit surface $R1_3$. The path entrance surface $R1_1$ is a concave surface directed toward the object side and is configured as an aspherical surface that divergence is impaired progressively in separating from the optical axis.

The rear-side lens sub-unit is constructed with the positive biconvex lens L1.

The second lens unit G2 includes, in order from the object side, the negative biconcave lens $L2_1$ and the positive biconvex lens $L2_2'$, and has negative refracting power as a whole.

The third lens unit G3 includes the positive biconvex lens L3, and a cemented lens component made up of a positive meniscus lens $L3_2'''$ with a convex surface directed toward the object side and a positive meniscus lens $L3_3''$ with a convex surface directed toward the object side, and has positive refracting power as a whole.

The fourth lens unit G4 includes the positive meniscus lens $L4_1$ with a convex surface directed toward the object side, and has positive refracting power as a whole.

When the magnification of the zoom lens is changed, varying from the wide-angle position to the telephoto position, in focusing of an infinite object point, the first lens unit G1 is fixed in position, the second lens unit G2 is moved toward only the image side, the aperture stop S is nearly fixed in position, the third lens unit G3 is moved toward only the object side, and the fourth lens unit G4 is slightly moved toward only the image side.

In the focusing operation, the fourth lens unit G4 is moved along the optical axis.

Aspherical surfaces are provided to the path entrance surface $R1_1$ of the reflecting optical element R1 in the first lens unit G1, the object-side surface of the positive biconvex lens L1 in the first lens unit G1, both surfaces of the negative biconcave lens $L2_1$ in the second lens unit G2, and both surfaces of the positive biconvex lens $L3_1$ in the third lens unit G3.

Subsequently, numerical data of optical members constituting the zoom lens of the fourth embodiment are shown below.

Numerical Data 4

$r_1 = -12.0150$ (aspherical)    $d_1 = 11.5002$    $n_{d1} = 1.68893$    $v_{d1} = 31.07$
$r_2 = \infty$                    $d_2 = 0.1500$
$r_3 = 9.6706$ (aspherical)       $d_3 = 2.8000$    $n_{d3} = 1.69350$    $v_{d3} = 53.21$
$r_4 = -1256.8092$                $d_4 = D4$
$r_5 = -13.5835$ (aspherical)     $d_5 = 0.9000$    $n_{d5} = 1.80610$    $v_{d5} = 40.92$
$r_6 = 5.0290$ (aspherical)       $d_6 = 0.7000$
$r_7 = 7.9277$                    $d_7 = 1.8000$    $n_{d7} = 1.78470$    $v_{d7} = 26.29$
$r_8 = -49.5064$                  $d_8 = D8$
$r_9 = \infty$ (stop)             $d_9 = D9$
$r_{10} = 7.7617$ (aspherical)    $d_{10} = 2.5000$  $n_{d10} = 1.74320$  $v_{d10} = 49.34$
$r_{11} = -36.1068$ (aspherical)  $d_{11} = 0.1500$
$r_{12} = 5.3610$                 $d_{12} = 1.9996$  $n_{d12} = 1.58913$  $v_{d12} = 61.14$
$r_{13} = 100.0000$               $d_{13} = 0.7000$  $n_{d13} = 1.84666$  $v_{d13} = 23.78$
$r_{14} = 3.4724$                 $d_{14} = D14$
$r_{15} = 7.4451$                 $d_{15} = 2.0000$  $n_{d15} = 1.61800$  $v_{d15} = 63.33$
$r_{16} = 114.2284$               $d_{16} = D16$
$r_{17} = \infty$                 $d_{17} = 1.0500$  $n_{d17} = 1.54771$  $v_{d17} = 62.84$
$r_{18} = \infty$                 $d_{18} = 0.8000$
$r_{19} = \infty$                 $d_{19} = 0.8000$  $n_{d19} = 1.51633$  $v_{d19} = 64.14$
$r_{20} = \infty$                 $d_{20} = D20$
$r_{21} = \infty$ (imaging plane) $d_{21} = 0$ Aspherical coefficients First surface $K = 0$
$A_2 = 0$       $A_4 = 4.3188 \times 10^{-4}$    $A_6 = -2.7049 \times 10^{-6}$
$A_8 = 1.5176 \times 10^{-8}$    $A_{10} = 0$ -continued Third surface K = 0
$A_2 = 0$                     $A_4 = -2.7285 \times 10^{-4}$    $A_6 = -3.8722 \times 10^{-7}$
$A_8 = -3.3127 \times 10^{-9}$    $A_{10} = 0$ Fifth surface K = 0
$A_2 = 0$                     $A_4 = 1.9559 \times 10^{-4}$     $A_6 = 1.1706 \times 10^{-5}$
$A_8 = -6.1169 \times 10^{-7}$    $A_{10} = 0$ Sixth surface K = 0
$A_2 = 0$                     $A_4 = -8.5939 \times 10^{-4}$    $A_6 = 1.7473 \times 10^{-5}$
$A_8 = -2.9463 \times 10^{-6}$    $A_{10} = 0$ Tenth surface K = 0
$A_2 = 0$                     $A_4 = -1.0831 \times 10^{-4}$    $A_6 = 2.2118 \times 10^{-7}$
$A_8 = -2.0957 \times 10^{-6}$    $A_{10} = 0$ Eleventh surface K = 0
$A_2 = 0$                     $A_4 = 1.3033 \times 10^{-4}$     $A_6 = 4.7877 \times 10^{-6}$
$A_8 = -2.8645 \times 10^{-6}$    $A_{10} = 0$ Zoom data
When the distance D0 is ∞,

|        | Wide-angle | Middle  | Telephoto |
|--------|-----------|---------|-----------|
| f (mm) | 5.00151   | 8.70017 | 14.59990  |
| Fno    | 2.8223    | 3.4914  | 4.3598    |
| D0     | ∞         | ∞       | ∞         |
| D4     | 1.49971   | 5.85028 | 9.30131   |
| D8     | 8.70172   | 4.34758 | 0.90015   |
| D9     | 5.99374   | 3.54173 | 1.00056   |
| D14    | 3.35911   | 5.92333 | 8.63544   |
| D16    | 1.30077   | 1.18795 | 1.01765   |
| D20    | 1.00000   | 1.00000 | 1.00000   |

Fifth Embodiment

Figure 21:
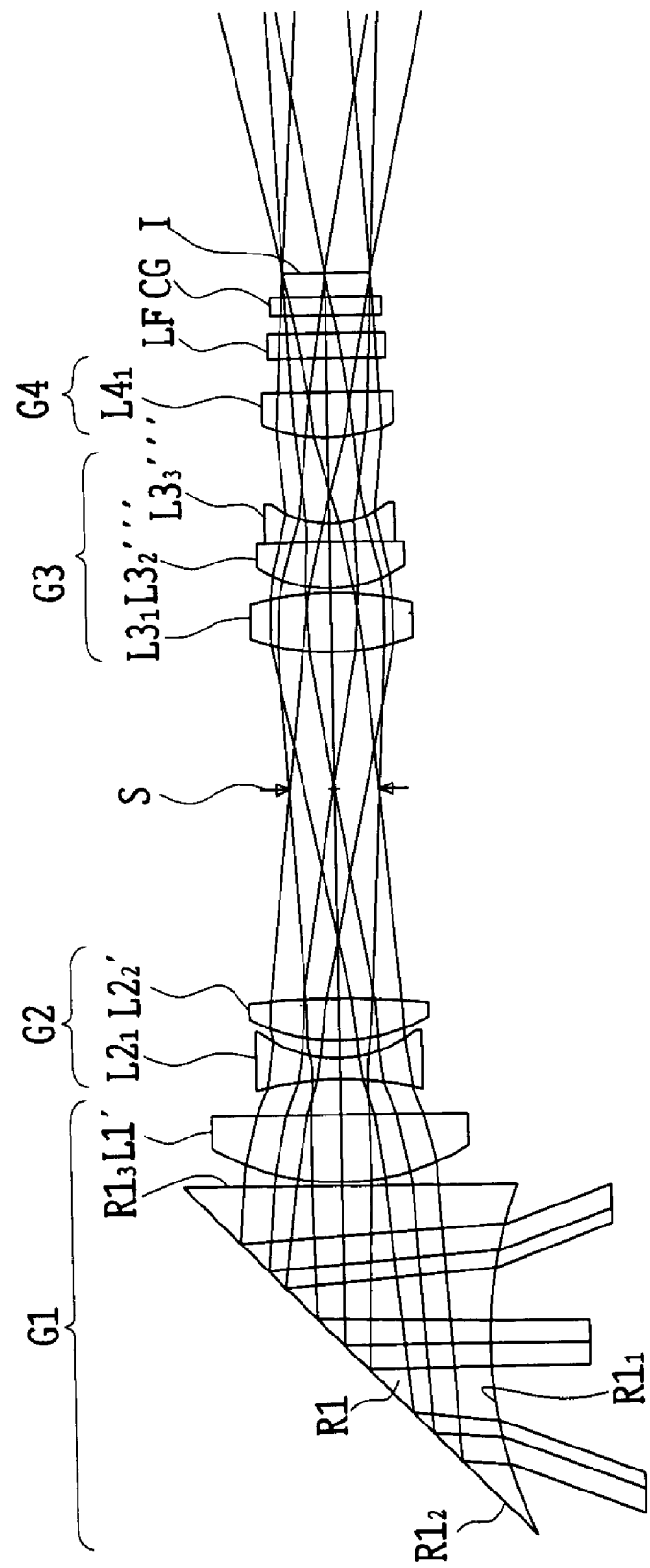
FIG. 21 is a sectional view showing an optical arrangement, developed along the optical axis, at the wide-angle position where the optical path is bent in focusing of the infinite object point, in a fifth embodiment of the zoom lens used in the electronic imaging device according to the present invention.
Figure 22A:
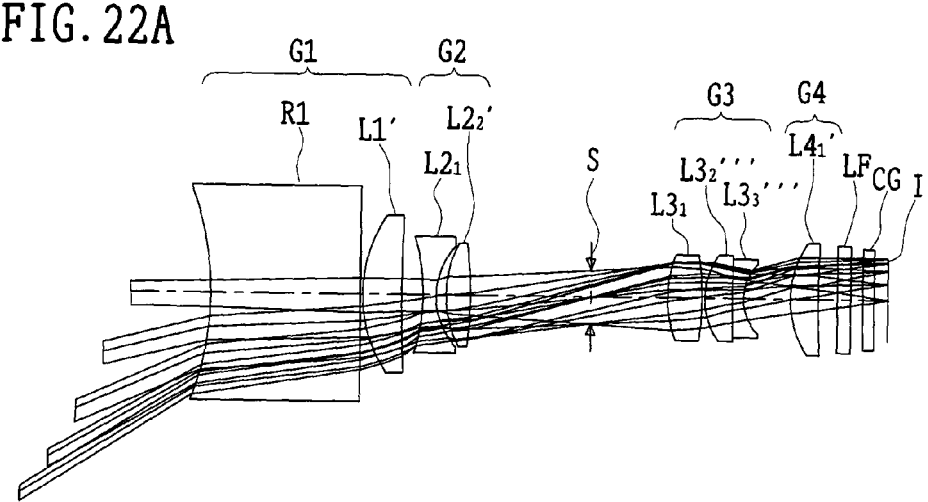
FIGS. 22A, 22B, and 22C are sectional views showing optical arrangements, developed along the optical axis, at wide-angle, middle, and telephoto positions, respectively, in focusing of the infinite object point of the zoom lens in the fifth embodiment.
Figure 22B:
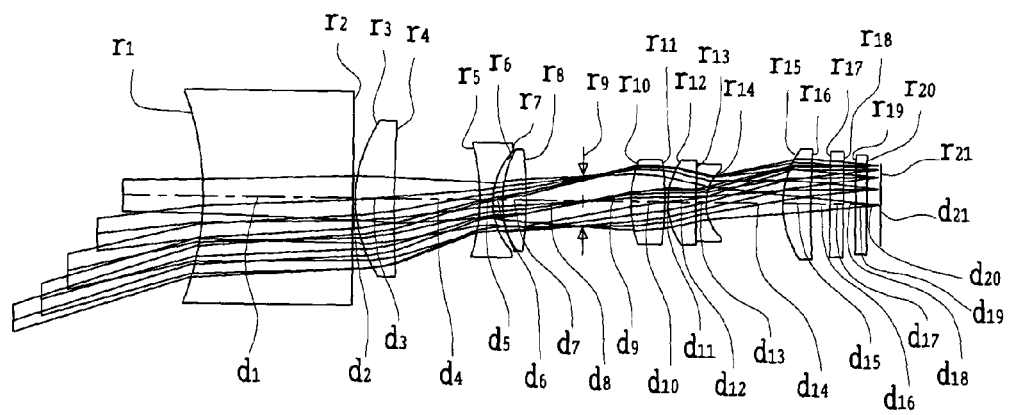
Figure 22C:
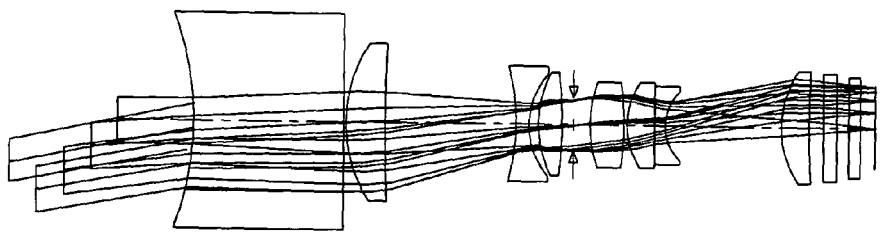

FIG. 21 shows an optical arrangement of the fifth embodiment of the zoom lens used in the electronic imaging device according to the present invention. FIGS. 22A, 22B, and 22C show optical arrangements at wide-angle, middle, and telephoto positions, respectively, of the zoom lens in the fifth embodiment. FIGS. 23A–23D, 24A–24D, and 25A–25D show aberration characteristics of the zoom lens in the fifth embodiment.

The electronic imaging device of the fifth embodiment, as shown in FIG. 21, has, in order from the object side, the zoom lens and the CCD which is the electronic image sensor. The planar plate-like optical low-pass filter LF and the CCD cover glass CG are provided between the zoom lens and the imaging plane I.

The zoom lens comprises, in order from the object side, the first lens unit G1, the second lens unit G2, the aperture stop S, the third lens unit G3, and the fourth lens unit G4.

The first lens unit G1 includes, in order from the object side, the reflecting optical element R1 for bending the optical path and a rear-side lens sub-unit with positive refracting power, and has positive refracting power as a whole.

The reflecting optical element R1 is constructed with the prism which has the path entrance surface $R1_1$, the reflecting surface $R1_2$ for bending the optical path, and the exit surface $R1_3$. The path entrance surface $R1_1$ is a concave surface directed toward the object side and is configured as an aspherical surface that divergence is impaired progressively in separating from the optical axis.

The rear-side lens sub-unit is constructed with a positive meniscus lens L1' with a convex surface directed toward the object side.

The second lens unit G2 includes, in order from the object side, the negative biconcave lens $L2_1$ and the positive biconvex lens $L2_2'$, and has negative refracting power as a whole.

The third lens unit G3 includes the positive biconvex lens $L3_1$ and a cemented lens component made up of the positive lens $L3_2'''$ with a convex surface directed toward the object side and a negative plano-concave lens $L3_3'''$, the object-side surface of which is flat and the image-side surface is concave, and has positive refracting power as a whole.

The fourth lens unit G4 includes the positive meniscus lens $L4_1$ with a convex surface directed toward the object side, and has positive refracting power as a whole.

When the magnification of the zoom lens is changed, varying from the wide-angle position to the telephoto position, in focusing of an infinite object point, the first lens unit G1 is fixed in position, the second lens unit G2 is moved toward only the image side, the aperture stop S is nearly fixed in position, the third lens unit G3 is moved toward only the object side, and the fourth lens unit G4 is slightly moved toward only the image side.

In the focusing operation, the fourth lens unit G4 is moved along the optical axis.

Aspherical surfaces are provided to the path entrance surface $R1_1$ of the reflecting optical element R1 in the first lens unit G1, the object-side surface of the positive meniscus lens L1' in the first lens unit G1, both surfaces of the negative biconcave lens $L2_1$ in the second lens unit G2, and both surfaces of the positive biconvex lens $L3_1$ in the third lens unit G3.

Subsequently, numerical data of optical members constituting the zoom lens of the fifth embodiment are shown below.

Numerical Data 5

$r_1 = -12.4438$ (aspherical)   $d_1 = 10.8003$   $n_{d1} = 1.84666$   $v_{d1} = 23.78$
$r_2 = \infty$                   $d_2 = 0.1500$
$r_3 = 9.2840$ (aspherical)     $d_3 = 2.8000$    $n_{d3} = 1.80610$   $v_{d3} = 40.92$
$r_4 = 117.8804$                 $d_4 = D4$
$r_5 = -12.4847$ (aspherical)   $d_5 = 0.9000$    $n_{d5} = 1.80610$   $v_{d5} = 40.92$
$r_6 = 4.8207$ (aspherical)     $d_6 = 0.7000$
$r_7 = 7.6884$                   $d_7 = 1.8000$    $n_{d7} = 1.78470$   $v_{d7} = 26.29$
$r_8 = -39.0595$                 $d_8 = D8$
$r_9 = \infty$ (stop)            $d_9 = D9$
$r_{10} = 8.1567$ (aspherical)   $d_{10} = 2.5000$  $n_{d10} = 1.74320$  $v_{d10} = 49.34$
$r_{11} = -21.6861$ (aspherical) $d_{11} = 0.1500$
$r_{12} = 5.7511$                $d_{12} = 1.9998$  $n_{d12} = 1.58913$  $v_{d12} = 61.14$
$r_{13} = \infty$                $d_{13} = 0.7000$  $n_{d13} = 1.84666$  $v_{d13} = 23.78$
$r_{14} = 3.5102$                $d_{14} = D14$
$r_{15} = 7.4387$                $d_{15} = 2.0000$  $n_{d15} = 1.61800$  $v_{d15} = 63.33$
$r_{16} = 83.3687$               $d_{16} = D16$
$r_{17} = \infty$                $d_{17} = 1.0500$  $n_{d17} = 1.54771$  $v_{d17} = 62.84$
$r_{18} = \infty$                $d_{18} = 0.8000$
$r_{19} = \infty$                $d_{19} = 0.8000$  $n_{d19} = 1.51633$  $v_{d19} = 64.14$
$r_{20} = \infty$                $d_{20} = D20$
$r_{21} = \infty$ (imaging plane) $d_{21} = 0$ Aspherical coefficients First surface K = 0
$A_2 = 0$                     $A_4 = 4.6571 \times 10^{-4}$    $A_6 = -3.5976 \times 10^{-6}$
$A_8 = 2.1295 \times 10^{-8}$    $A_{10} = 0$ -continued Third surface K = 0
$A_2 = 0$          $A_4 = -3.1013 \times 10^{-4}$   $A_6 = -8.1037 \times 10^{-8}$
$A_8 = -1.0469 \times 10^{-8}$   $A_{10} = 0$ Fifth surface K = 0
$A_2 = 0$          $A_4 = 5.3799 \times 10^{-4}$    $A_6 = -4.0307 \times 10^{-6}$
$A_8 = -3.6862 \times 10^{-7}$   $A_{10} = 0$ Sixth surface K = 0
$A_2 = 0$          $A_4 = -6.5914 \times 10^{-4}$   $A_6 = -1.9883 \times 10^{-6}$
$A_8 = -3.4368 \times 10^{-6}$   $A_{10} = 0$ Tenth surface K = 0
$A_2 = 0$          $A_4 = -4.7066 \times 10^{-4}$   $A_6 = 4.5364 \times 10^{-6}$
$A_8 = -4.8564 \times 10^{-6}$   $A_{10} = 0$ Eleventh surface K = 0
$A_2 = 0$          $A_4 = -2.9940 \times 10^{-4}$   $A_6 = 2.4034 \times 10^{-6}$
$A_8 = -4.5396 \times 10^{-6}$   $A_{10} = 0$ Zoom data
When the distance D0 is ∞,

|  | Wide-angle | Middle | Telephoto |
|---|---|---|---|
| f (mm) | 5.00181 | 8.69975 | 14.59999 |
| Fno | 2.8024 | 3.3822 | 4.2297 |
| D0 | ∞ | ∞ | ∞ |
| D4 | 1.49907 | 6.02482 | 9.33640 |
| D8 | 8.73759 | 4.20686 | 0.90027 |
| D9 | 5.63898 | 3.47797 | 1.00063 |
| D14 | 3.43640 | 5.66793 | 8.50206 |
| D16 | 1.30034 | 1.23043 | 0.87307 |
| D20 | 1.00000 | 1.00000 | 1.00000 |

Sixth Embodiment

Figure 26:
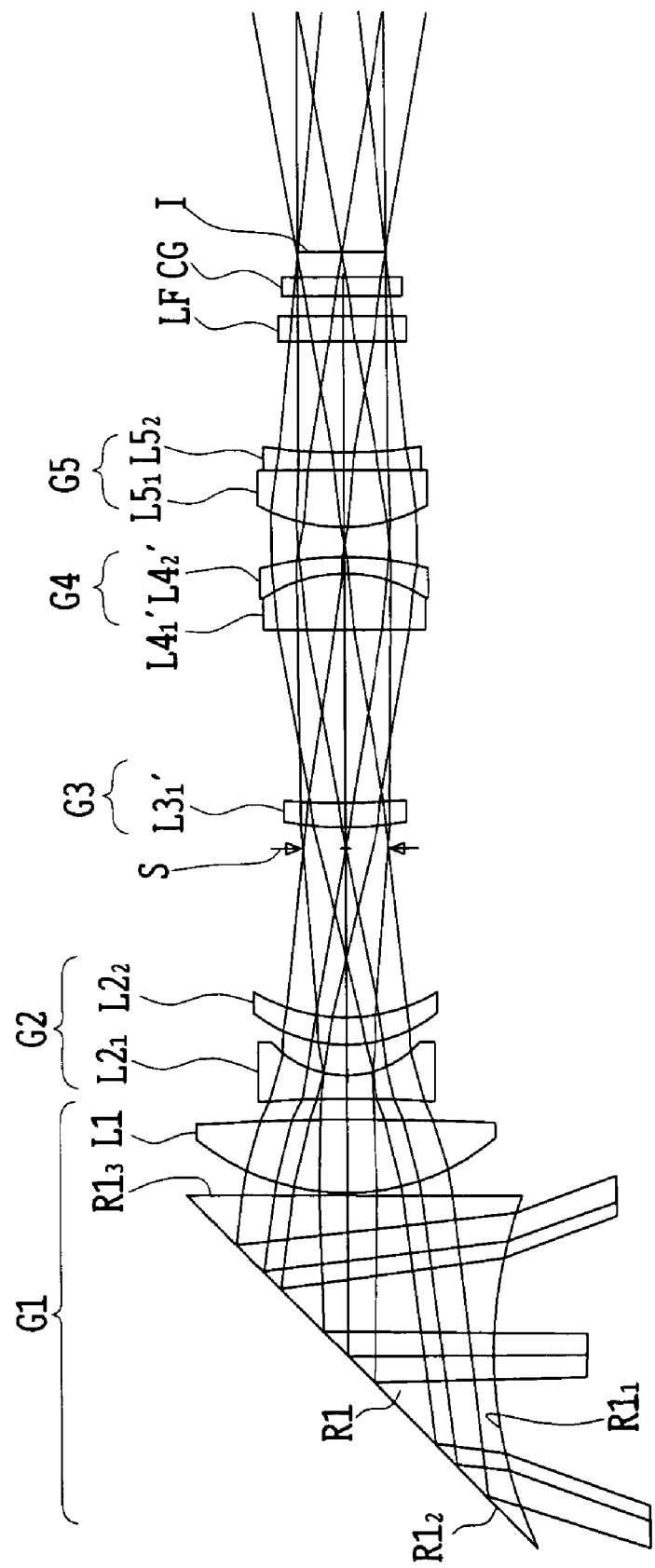
FIG. 26 is a sectional view showing an optical arrangement, developed along the optical axis, at the wide-angle position where the optical path is bent in focusing of the infinite object point, in a sixth embodiment of the zoom lens used in the electronic imaging device according to the present invention.
Figure 27A:
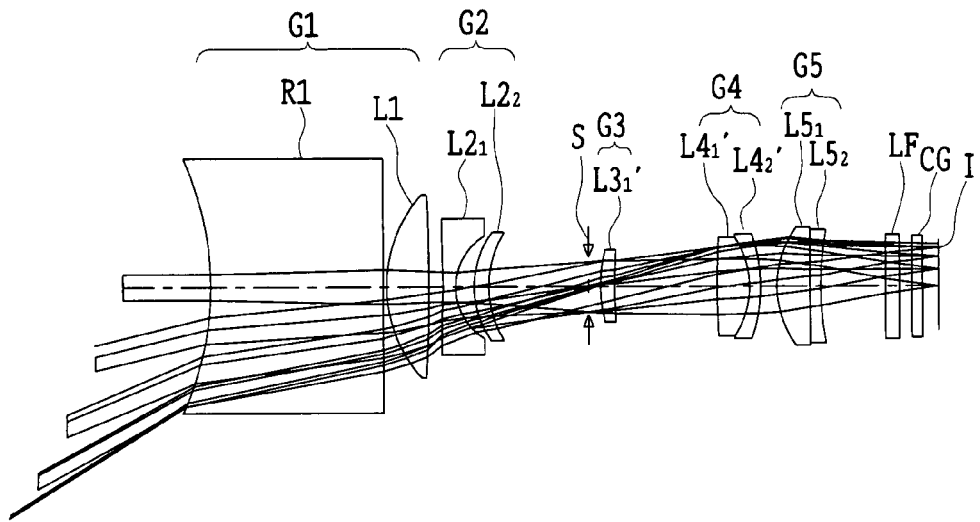
FIGS. 27A, 27B, and 27C are sectional views showing optical arrangements, developed along the optical axis, at wide-angle, middle, and telephoto positions, respectively, in focusing of the infinite object point of the zoom lens in the sixth embodiment.
Figure 27B:
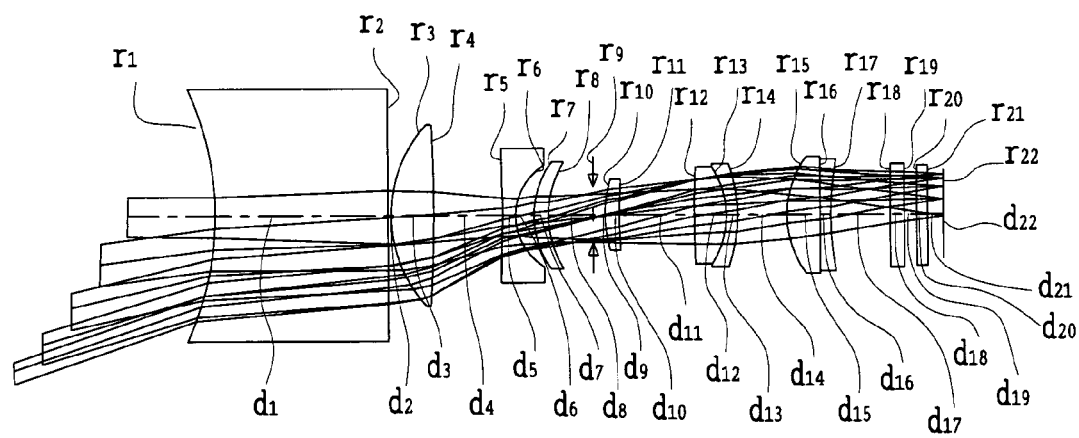
Figure 27C:
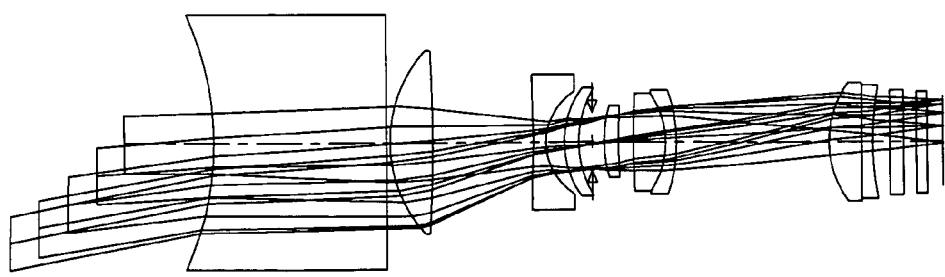

FIG. 26 shows an optical arrangement of the sixth embodiment of the zoom lens used in the electronic imaging device according to the present invention. FIGS. 27A, 27B, and 27C show optical arrangements at wide-angle, middle, and telephoto positions, respectively, of the zoom lens in the sixth embodiment. FIGS. 28A–28D, 29A–29D, and 30A–30D show aberration characteristics of the zoom lens in the sixth embodiment.

The electronic imaging device of the sixth embodiment, as shown in FIG. 26, has, in order from the object side, the zoom lens and the CCD which is the electronic image sensor. The planar plate-like optical low-pass filter LF and the CCD cover glass CG are provided between the zoom lens and the imaging plane I.

The zoom lens comprises, in order from the object side, the first lens unit G1, the second lens unit G2, the aperture stop S, the third lens unit G3, the fourth lens unit G4, and a fifth lens unit G5.

The first lens unit G1 includes, in order from the object side, the reflecting optical element R1 for bending the optical path and a rear-side lens sub-unit with positive refracting power, and has positive refracting power as a whole.

The reflecting optical element R1 is constructed with the prism which has the path entrance surface $R1_1$, the reflecting surface $R1_2$ for bending the optical path, and the exit surface $R1_3$. The path entrance surface $R1_1$ is a concave surface directed toward the object side and is configured as an aspherical surface that divergence is impaired progressively in separating from the optical axis.

The rear-side lens sub-unit is constructed with the positive biconvex lens L1.

The second lens unit G2 includes, in order from the object side, the negative biconcave lens $L2_1$ and the positive meniscus lens $L2_2$ with a convex surface directed toward the object side, and has negative refracting power as a whole.

The third lens unit G3 includes the positive meniscus lens $L3_1'$ with a convex surface directed toward the object side, and has positive refracting power as a whole.

The fourth lens unit G4 includes a cemented lens component made up of the positive biconvex lens $L4_1'$ and a negative meniscus lens $L4_2'$ with a concave surface directed toward the object side, and has positive refracting power as a whole.

The fifth lens unit G5 includes a cemented lens component made up of a positive plano-convex lens $L5_1$, the object-side surface of which is convex and the image-side surface is flat, and a negative plano-concave lens $L5_2$, the object-side surface of which is flat and the image-side surface is concave, and has positive refracting power as a whole.

When the magnification of the zoom lens is changed, varying from the wide-angle position to the telephoto position, in focusing of an infinite object point, the first lens unit G1 is fixed in position, the second lens unit G2 is moved toward only the image side, the aperture stop S is nearly fixed in position, the third lens unit G3 is fixed in position, the fourth lens unit G4 is moved toward only the object side, and the fifth lens unit G5 is moved toward only the image side.

In the focusing operation, the fifth lens unit G5 is moved along the optical axis.

Aspherical surfaces are provided to the path entrance surface $R1_1$ of the reflecting optical element R1 in the first lens unit G1, the object-side surface of the positive biconvex lens L1 in the first lens unit G1, both surfaces of the negative biconcave lens $L2_1$ in the second lens unit G2, the object-side surface of the positive biconvex lens $L4_1'$ in the fourth lens unit G4, and the object-side surface of the positive plano-convex lens $L5_1$ in the fifth lens unit G5.

Subsequently, numerical data of optical members constituting the zoom lens of the sixth embodiment are shown below.

Numerical Data 6

| $r_1 = -14.4447$ (aspherical) | $d_1 = 12.5000$ | $n_{d1} = 1.58423$ | $v_{d1} = 30.49$ |
|---|---|---|---|
| $r_2 = \infty$ | $d_2 = 0.1500$ | | |
| $r_3 = 8.0527$ (aspherical) | $d_3 = 3.0000$ | $n_{d3} = 1.58313$ | $v_{d3} = 59.38$ |
| $r_4 = -126.7237$ | $d_4 = D4$ | | |
| $r_5 = -21.5010$ (aspherical) | $d_5 = 0.9000$ | $n_{d5} = 1.58313$ | $v_{d5} = 59.38$ |
| $r_6 = 4.2823$ (aspherical) | $d_6 = 1.2981$ | | |
| $r_7 = 6.2089$ | $d_7 = 1.1000$ | $n_{d7} = 1.84666$ | $v_{d7} = 23.78$ |
| $r_8 = 7.3510$ | $d_8 = D8$ | | |
| $r_9 = \infty$ (stop) | $d_9 = 0.9000$ | | |
| $r_{10} = 12.4056$ | $d_{10} = 1.0000$ | $n_{d10} = 1.69680$ | $v_{d10} = 55.53$ |
| $r_{11} = 44.2320$ | $d_{11} = D11$ | | |
| $r_{12} = 125.2942$ (aspherical) | $d_{12} = 2.2991$ | $n_{d12} = 1.74320$ | $v_{d12} = 49.34$ |
| $r_{13} = -6.2522$ | $d_{13} = 0.7000$ | $n_{d13} = 1.84666$ | $v_{d13} = 23.78$ |
| $r_{14} = -12.5341$ | $d_{14} = D14$ | | |
| $r_{15} = 7.1355$ (aspherical) | $d_{15} = 2.3000$ | $n_{d15} = 1.58313$ | $v_{d15} = 59.38$ |
| $r_{16} = \infty$ | $d_{16} = 0.7000$ | $n_{d16} = 1.84666$ | $v_{d16} = 23.78$ |
| $r_{17} = 17.7188$ | $d_{17} = D17$ | | |
| $r_{18} = \infty$ | $d_{18} = 1.0500$ | $n_{d18} = 1.54771$ | $v_{d18} = 62.84$ |
| $r_{19} = \infty$ | $d_{19} = 0.8000$ | | |

-continued

| | | | |
|---|---|---|---|
| $r_{20} = \infty$ | $d_{20} = 0.8000$ | $n_{d20} = 1.51633$ | $\nu_{d20} = 64.14$ |
| $r_{21} = \infty$ | $d_{21} = D21$ | | |
| $r_{22} = \infty$ (imaging plane) | $d_{22} = 0$ | | |

Aspherical coefficients

First surface

K = 0
$A_2 = 0$    $A_4 = 2.9800 \times 10^{-4}$    $A_6 = -1.8009 \times 10^{-6}$
$A_8 = 6.3574 \times 10^{-9}$    $A_{10} = 0$ Third surface K = 0
$A_2 = 0$    $A_4 = -3.1272 \times 10^{-4}$    $A_6 = -1.8231 \times 10^{-6}$
$A_8 = -3.2028 \times 10^{-8}$    $A_{10} = 0$ Fifth surface K = 0
$A_2 = 0$    $A_4 = 1.1475 \times 10^{-3}$    $A_6 = -2.2166 \times 10^{-5}$
$A_8 = 2.6509 \times 10^{-7}$    $A_{10} = 0$ Sixth surface K = 0
$A_2 = 0$    $A_4 = 6.0242 \times 10^{-4}$    $A_6 = 1.2705 \times 10^{-5}$
$A_8 = -6.3903 \times 10^{-7}$    $A_{10} = 0$ Twelfth surface K = 0
$A_2 = 0$    $A_4 = 1.3506 \times 10^{-4}$    $A_6 = -1.0082 \times 10^{-5}$
$A_8 = 2.6974 \times 10^{-7}$    $A_{10} = 0$ Fifteenth surface K = 0
$A_2 = 0$    $A_4 = -3.7663 \times 10^{-4}$    $A_6 = 8.2582 \times 10^{-6}$
$A_8 = -2.8872 \times 10^{-7}$    $A_{10} = 0$ Zoom data
When the distance D0 is ∞,

| | Wide-angle | Middle | Telephoto |
|---|---|---|---|
| f (mm) | 5.00359 | 8.70107 | 14.59781 |
| Fno | 2.8371 | 2.9921 | 3.6383 |
| D0 | ∞ | ∞ | ∞ |
| D4 | 0.89636 | 4.65046 | 6.86473 |
| D8 | 6.96426 | 3.20337 | 0.99606 |
| D11 | 7.10397 | 5.09174 | 0.99909 |
| D14 | 1.19908 | 3.51609 | 10.31281 |
| D17 | 4.50865 | 4.20999 | 1.49972 |
| D21 | 1.00000 | 1.00000 | 1.00000 |

Seventh Embodiment

Figure 31:
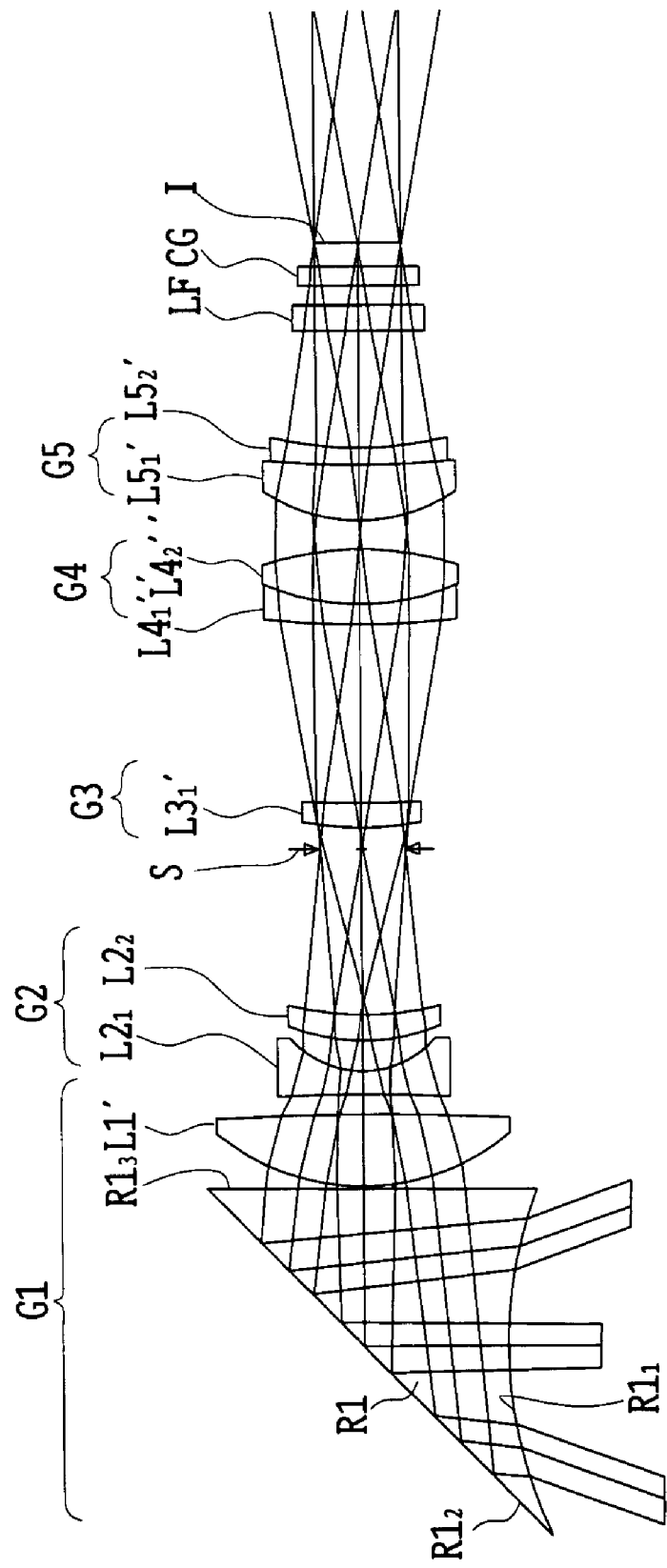
FIG. 31 is a sectional view showing an optical arrangement, developed along the optical axis, at the wide-angle position where the optical path is bent in focusing of the infinite object point, in a seventh embodiment of the zoom lens used in the electronic imaging device according to the present invention.
Figure 32A:
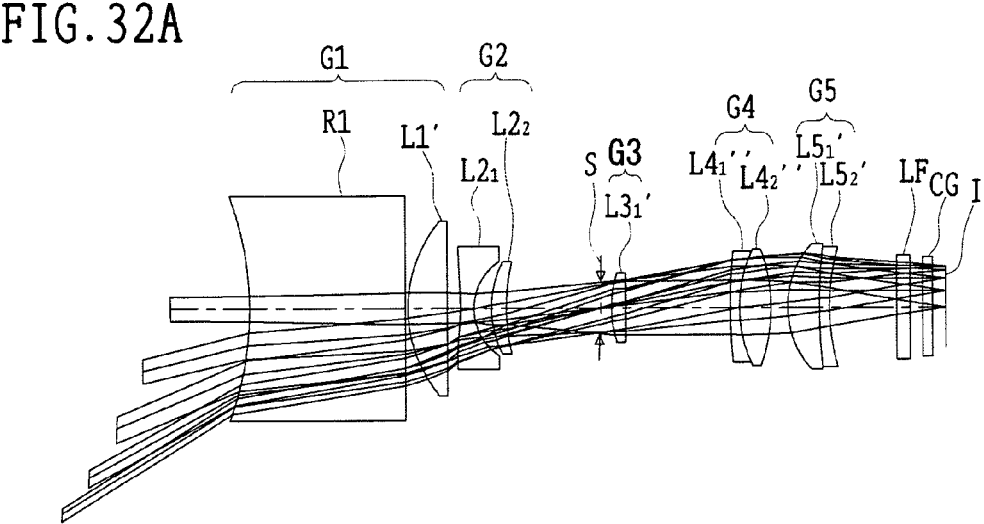
FIGS. 32A, 32B, and 32C are sectional views showing optical arrangements, developed along the optical axis, at wide-angle, middle, and telephoto positions, respectively, in focusing of the infinite object point of the zoom lens in the seventh embodiment.
Figure 32B:
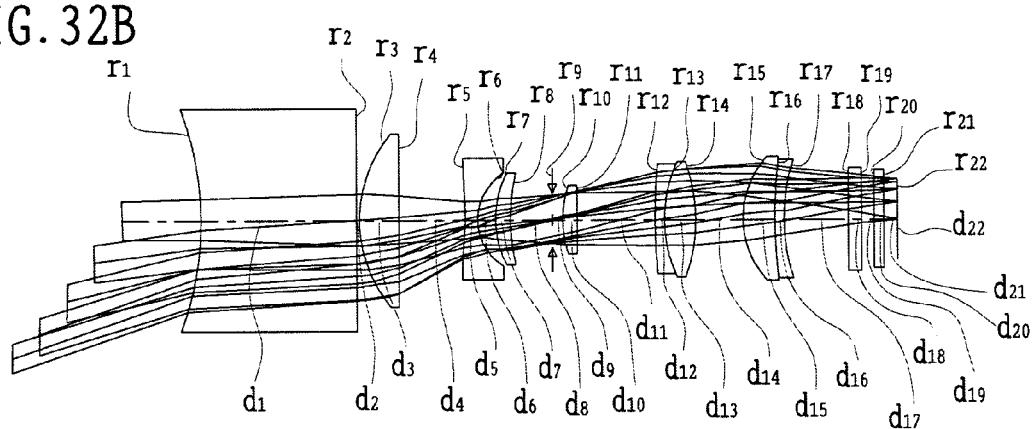
Figure 32C:
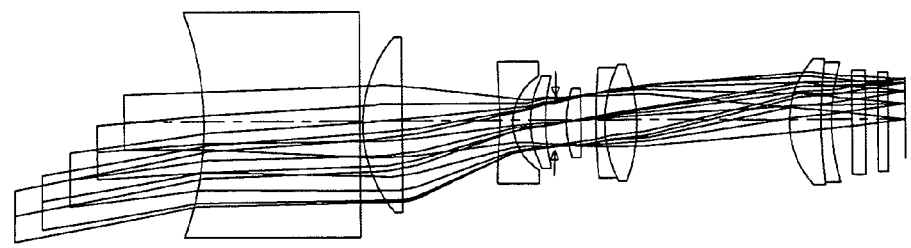

FIG. 31 shows an optical arrangement of the seventh embodiment of the zoom lens used in the electronic imaging device according to the present invention. FIGS. 32A, 32B, and 32C show optical arrangements at wide-angle, middle, and telephoto positions, respectively, of the zoom lens in the seventh embodiment. FIGS. 33A–33D, 34A–34D, and 35A–35D show aberration characteristics of the zoom lens in the seventh embodiment.

The electronic imaging device of the seventh embodiment, as shown in FIG. 31, has, in order from the object side, the zoom lens and the CCD which is the electronic image sensor. The planar plate-like optical low-pass filter LF and the CCD cover glass CG are provided between the zoom lens and the imaging plane I.

The zoom lens comprises, in order from the object side, the first lens unit G1, the second lens unit G2, the aperture stop S, the third lens unit G3, the fourth lens unit G4, and the fifth lens unit G5.

The first lens unit G1 includes, in order from the object side, the reflecting optical element R1 for bending the optical path and a rear-side lens subunit with positive refracting power, and has positive refracting power as a whole.

The reflecting optical element R1 is constructed with the prism which has the path entrance surface $R1_1$, the reflecting surface $R1_2$ for bending the optical path, and the exit surface $R1_3$. The path entrance surface $R1_1$ is a concave surface directed toward the object side and is configured as an aspherical surface that divergence is impaired progressively in separating from the optical axis.

The rear-side lens sub-unit is constructed with the positive meniscus lens L1' with a convex surface directed toward the object side.

The second lens unit G2 includes, in order from the object side, the negative biconcave lens $L2_1$ and the positive meniscus lens $L2_2$ with a convex surface directed toward the object side, and has negative refracting power as a whole.

The third lens unit G3 includes the positive meniscus lens $L3_1'$ with a convex surface directed toward the object side, and has positive refracting power as a whole.

The fourth lens unit G4 includes a cemented lens component made up of a negative meniscus lens $L4_1''$ with a convex surface directed toward the object side and a positive biconvex lens $L4_2''$, and has positive refracting power as a whole.

The fifth lens unit G5 includes a cemented lens component made up of a positive meniscus lens $L5_1'$ with a convex surface directed toward the object side and a negative meniscus lens $L5_2'$ with a convex surface directed toward the object side, and has positive refracting power as a whole.

When the magnification of the zoom lens is changed, varying from the wide-angle position to the telephoto position, in focusing of an infinite object point, the first lens unit G1 is fixed in position, the second lens unit G2 is moved toward only the image side, the aperture stop S is nearly fixed in position, the third lens unit G3 is fixed in position, the fourth lens unit G4 is moved toward only the object side, and the fifth lens unit G5 is moved toward only the image side.

In the focusing operation, the fifth lens unit G5 is moved along the optical axis.

Aspherical surfaces are provided to the path entrance surface $R1_1$ of the reflecting optical element R1 in the first lens unit G1, the object-side surface of the positive meniscus lens L1' in the first lens unit G1, both surfaces of the negative biconcave lens $L2_1$ in the second lens unit G2, the image-side surface of the positive biconvex lens $L4_2''$ in the fourth lens unit G4, and the object-side surface of the positive meniscus lens $L5_1'$ in the fifth lens unit G5.

Subsequently, numerical data of optical members constituting the zoom lens of the seventh embodiment are shown below.

Numerical Data 7

| | | | |
|---|---|---|---|
| $r_1 = -14.5531$ (aspherical) | $d_1 = 11.4994$ | $n_{d1} = 1.74000$ | $\nu_{d1} = 28.30$ |
| $r_2 = \infty$ | $d_2 = 0.1500$ | | |
| $r_3 = 8.2326$ (aspherical) | $d_3 = 3.0000$ | $n_{d3} = 1.69350$ | $\nu_{d3} = 53.21$ |
| $r_4 = 1360.9007$ | $d_4 = D4$ | | |
| $r_5 = -17.3683$ (aspherical) | $d_5 = 0.9000$ | $n_{d5} = 1.58313$ | $\nu_{d5} = 59.38$ |
| $r_6 = 4.0794$ (aspherical) | $d_6 = 1.2997$ | | |
| $r_7 = 7.9053$ | $d_7 = 1.1000$ | $n_{d7} = 1.84666$ | $\nu_{d7} = 23.78$ |
| $r_8 = 12.2166$ | $d_8 = D8$ | | |
| $r_9 = \infty$ (stop) | $d_9 = 0.9000$ | | |

-continued

| | | | |
|---|---|---|---|
| $r_{10} = 12.2928$ | $d_{10} = 1.0000$ | $n_{d10} = 1.48749$ | $v_{d10} = 70.23$ |
| $r_{11} = 164.2683$ | $d_{11} = D11$ | | |
| $r_{12} = 44.1794$ | $d_{12} = 0.7000$ | $n_{d12} = 1.84666$ | $v_{d12} = 23.78$ |
| $r_{13} = 10.0024$ | $d_{13} = 2.2995$ | $n_{d13} = 1.69350$ | $v_{d13} = 53.21$ |
| $r_{14} = -13.4933$ (aspherical) | $d_{14} = D14$ | | |
| $r_{15} = 6.8596$ (aspherical) | $d_{15} = 2.3000$ | $n_{d15} = 1.58313$ | $v_{d15} = 59.38$ |
| $r_{16} = 40.0000$ | $d_{16} = 0.7000$ | $n_{d16} = 1.84666$ | $v_{d16} = 23.78$ |
| $r_{17} = 13.8516$ | $d_{17} = D17$ | | |
| $r_{18} = \infty$ | $d_{18} = 1.0500$ | $n_{d18} = 1.54771$ | $v_{d18} = 62.84$ |
| $r_{19} = \infty$ | $d_{19} = 0.8000$ | | |
| $r_{20} = \infty$ | $d_{20} = 0.8000$ | $n_{d20} = 1.51633$ | $v_{d20} = 64.14$ |
| $r_{21} = \infty$ | $d_{21} = D21$ | | |
| $r_{22} = \infty$ (imaging plane) | $d_{22} = 0$ | | |

Aspherical coefficients

First surface $K = 0$
$A_2 = 0$   $A_4 = 3.2457 \times 10^{-4}$   $A_6 = -2.3766 \times 10^{-6}$
$A_8 = 9.6530 \times 10^{-9}$   $A_{10} = 0$ Third surface $K = 0$
$A_2 = 0$   $A_4 = -3.1994 \times 10^{-4}$   $A_6 = -1.3962 \times 10^{-6}$
$A_8 = -2.3846 \times 10^{-8}$   $A_{10} = 0$ Fifth surface $K = 0$
$A_2 = 0$   $A_4 = 1.7113 \times 10^{-3}$   $A_6 = -5.7828 \times 10^{-5}$
$A_8 = 1.0238 \times 10^{-6}$   $A_{10} = 0$ Sixth surface $K = 0$
$A_2 = 0$   $A_4 = 6.9964 \times 10^{-4}$   $A_6 = 2.2660 \times 10^{-6}$
$A_8 = -6.1362 \times 10^{-6}$   $A_{10} = 0$ Fourteenth surface $K = 0$
$A_2 = 0$   $A_4 = -1.4803 \times 10^{-4}$   $A_6 = 4.4265 \times 10^{-6}$
$A_8 = 2.5493 \times 10^{-8}$   $A_{10} = 0$ Fifteenth surface $K = 0$
$A_2 = 0$   $A_4 = -4.1739 \times 10^{-4}$   $A_6 = 4.7964 \times 10^{-6}$
$A_8 = -1.0438 \times 10^{-7}$   $A_{10} = 0$ Zoom data
When the distance D0 is $\infty$,

| | Wide-angle | Middle | Telephoto |
|---|---|---|---|
| f (mm) | 5.00327 | 8.70141 | 14.59861 |
| Fno | 2.7874 | 2.9911 | 3.6720 |
| D0 | $\infty$ | $\infty$ | $\infty$ |
| D4 | 0.89789 | 4.73864 | 6.92497 |
| D8 | 7.02554 | 3.18395 | 0.99855 |
| D11 | 7.60185 | 5.48916 | 0.99961 |
| D14 | 1.19910 | 3.70255 | 11.15676 |
| D17 | 4.85516 | 4.46720 | 1.49970 |
| D21 | 1.00000 | 1.00000 | 1.00000 |

Subsequently, the values of parameters of the conditions in the embodiments mentioned above are listed in Tables 1A and 1B.

TABLE 1A

| | 1st embodiment | 2nd embodiment | 3rd embodiment | 4th embodiment |
|---|---|---|---|---|
| Lens data | Numerical data 1 | Numerical data 2 | Numerical data 3 | Numerical data 4 |
| Half angle of view ($\omega w$) at wide-angle position | 32.7° | 32.6° | 32.6° | 32.5° |
| Half angle of view ($\omega w$) at middle position | 18.8° | 19.4° | 18.8° | 18.8° |

TABLE 1A-continued

| | 1st embodiment | 2nd embodiment | 3rd embodiment | 4th embodiment |
|---|---|---|---|---|
| Half angle of view ($\omega w$) at telephoto position | 11.4° | 11.6° | 11.6° | 11.6° |
| Lens type | A | A | B | B |
| Maximum image height | 3 | 3 | 3 | 3 |
| ASP11/fw | 0.14453 | 0.09093 | 0.12435 | 0.11628 |
| h11 | 6.4 | 6.4 | 6.4 | 6.4 |
| fw · (n1 − 1)/r1 | −0.27572 | −0.25040 | −0.25734 | −0.28678 |
| dp/fw | 2.49747 | 2.29945 | 2.49935 | 2.29935 |
| log $\gamma R$/log $\gamma$ | 0.11191 | 0.11541 | 0.59827 | 0.47820 |
| $\beta VF$ | −0.95981 | −0.93576 | −0.61109 | −0.63526 |
| fVF/fw | −1.77585 | −1.81838 | −2.36809 | −2.31404 |
| −MM/M2 | 0.82978 | 0.82251 | 0.67942 | 0.64002 |
| D34W/fw | 0.21960 | 0.23994 | 0.70441 | 0.67162 |
| $(R_{RF} + R_{RR})/(R_{RF} − R_{RR})$ | −1.93173 | −1.05317 | −0.96003 | −1.13944 |
| $R_{C3}/R_{C1}$ | 0.89933 | 0.86560 | 0.54783 | 0.64772 |
| fw/$R_{C2}$ | −0.12513 | 0.25005 | −0.05001 | 0.05002 |
| $V_{CP} − V_{CN}$ | 25.5600 | 25.56000 | 37.36000 | 37.36000 |
| MX/s | 0.09419 | 0.08057 | −0.00303 | 0.01308 |
| $(R_{2NF} + R_{2NR})/(R_{2NF} − R_{2NR})$ | 0.70777 | 0.44951 | 0.68240 | 0.45961 |
| f1/fw | 2.90321 | 2.98917 | 4.79018 | 4.57300 |
| f12/fw | 2.34434 | 2.33051 | 3.03758 | 2.76929 |
| $(R_{1PF} + R_{1PR})/(R_{1PF} − R_{1PR})$ | −0.76295 | −0.71679 | −0.95376 | −0.98473 |
| ASP12/fw | −0.02471 | −0.03311 | −0.02619 | −0.02313 |
| h12 | 4.5 | 4.5 | 4.5 | 4.5 |
| $\tau$ 600/$\tau$ 550 | 1.0 | 1.0 | 1.0 | 1.0 |
| $\tau$ 700/$\tau$ 550 | 0.04 | 0.04 | 0.04 | 0.04 |
| $\tau$ 400/$\tau$ 550 | 0.0 | 0.0 | 0.0 | 0.0 |
| $\tau$ 440/$\tau$ 550 | 1.06 | 1.06 | 1.06 | 1.06 |

TABLE 1B

| | 5th embodiment | 6th embodiment | 7th embodiment |
|---|---|---|---|
| Lens data | Numerical data 5 | Numerical data 6 | Numerical data 7 |
| Half angle of view ($\omega w$) at wide-angle position | 32.5° | 32.8° | 32.8° |
| Half angle of view ($\omega w$) at middle position | 18.8° | 19.6° | 19.7° |
| Half angle of view ($\omega w$) at telephoto position | 11.5° | 11.6° | 11.7° |
| Lens type | B | C | C |
| Maximum image height | 3 | 3 | 3 |
| ASP11/fw | 0.11881 | 0.07882 | 0.08168 |
| h11 | 6.4 | 6.4 | 6.4 |
| fw · (n1 − 1)/r1 | −0.34032 | −0.20237 | −0.25441 |
| dp/fw | 2.15927 | 2.49821 | 2.29838 |
| log $\gamma R$/log $\gamma$ | 0.44654 | 0.29097 | 0.28757 |
| $\beta VF$ | −0.64504 | −0.64042 | −0.66185 |
| fVF/fw | −2.25973 | −1.43606 | −1.49392 |
| −MM/M2 | 0.59183 | 1.02290 | 1.09545 |
| D34W/fw | 0.68703 | 0.23964 | 0.23966 |
| $(R_{RF} + R_{RR})/(R_{RF} − R_{RR})$ | −1.19594 | −2.34846 | −2.96212 |
| $R_{C3}/R_{C1}$ | 0.61034 | — | — |
| fw/$R_{C2}$ | 0 | — | — |
| $V_{CP} − V_{CN}$ | 37.36000 | — | — |
| MX/s | 0.01999 | 0.12352 | 0.13313 |
| $(R_{2NF} + R_{2NR})/(R_{2NF} − R_{2NR})$ | 0.44287 | 0.66783 | 0.61960 |
| f1/fw | 4.42605 | 3.26938 | 3.23875 |
| f12/fw | 2.47102 | 2.61649 | 2.38495 |
| $(R_{1PF} + R_{1PR})/(R_{1PF} − R_{1PR})$ | −1.17098 | −0.88050 | −1.01217 |
| ASP12/fw | −0.02592 | −0.02975 | −0.02936 |
| h12 | 4.5 | 4.5 | 4.5 |
| $\tau$ 600/$\tau$ 550 | 1.0 | 1.0 | 1.0 |
| $\tau$ 700/$\tau$ 550 | 0.04 | 0.04 | 0.04 |
| $\tau$ 400/$\tau$ 550 | 0.0 | 0.0 | 0.0 |
| $\tau$ 440/$\tau$ 550 | 1.06 | 1.06 | 1.06 |

The optical low-pass filter in the lens data is constructed with a plurality of filter elements and contains a thickness for cutting off infrared light. For the thickness, not the value of the maximum thickness but the values given in Tables 1 A and 1B are used.

For the pixel pitch a and the filter thickness $t_{LPF}$, any of combinations 1–10 shown in Table 2 may be used.

TABLE 2

|  | 1 | 2 | 3 | 4 | 5 | 6 | 7 | 8 | 9 | 10 |
|---|---|---|---|---|---|---|---|---|---|---|
| a | 3.5 | 3.9 | 3.7 | 2.9 | 2.5 | 2.8 | 2.7 | 2.6 | 3.3 | 3.1 |
| $t_{LPF}$ | 0.55 | 0.58 | 0.52 | 0.38 | 0.30 | 0.25 | 0.25 | 0.26 | 0.24 | 0.25 |

Figure 36:
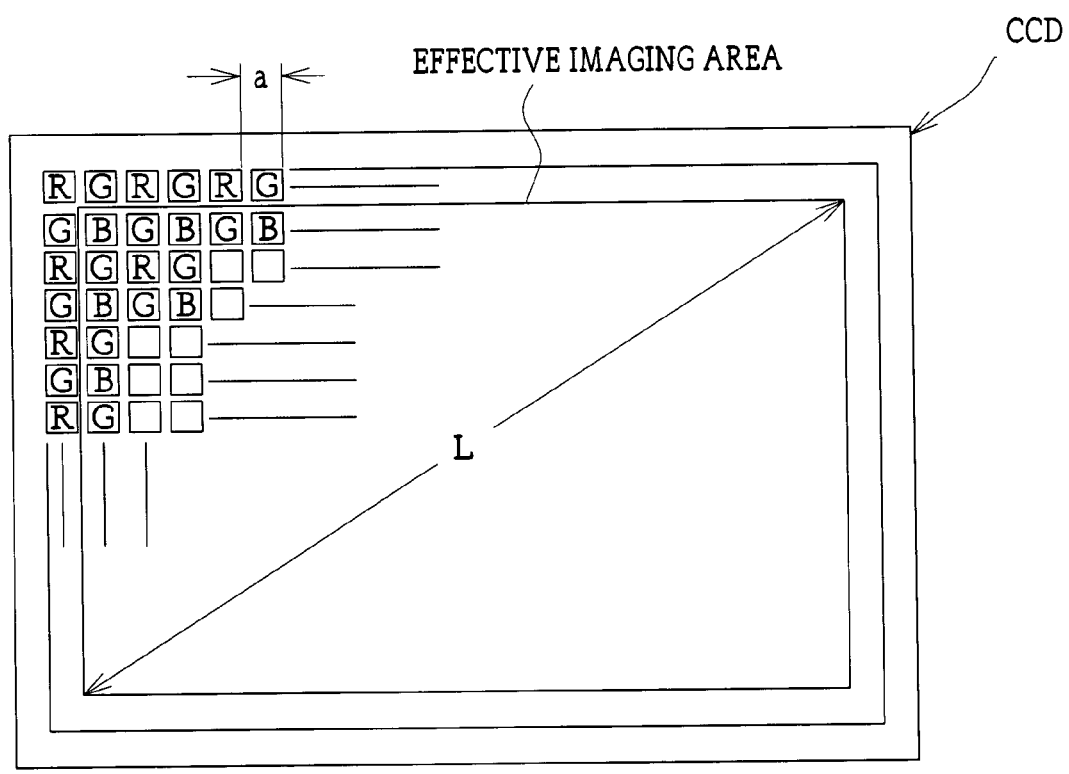
FIG. 36 is an explanatory view showing an example of a pixel array of an electronic image sensor used in each of the embodiments of the present invention.

Here, reference is made to the diagonal length L of the effective imaging area of the pixel pitch a of the electronic image sensor. FIG. 36 shows an example of a pixel array of the electronic image sensor used in each embodiment of the present invention. At the pixel pitch a, pixels for R (red), G (green), and B (blue) or four-color pixels (FIG. 39) for cyan, magenta, yellow, and green are arrayed in a mosaic fashion. The effective imaging area refers to the area of a photoelectric conversion plane on the image sensor used for reproduction (display on the personal computer or printing by the printer) of a photographed image. The effective imaging area depicted in the figure is set in the area narrower than the entire photoelectric conversion plane of the image sensor to the performance of the optical system (an image circle that the performance of the optical system can be ensured). The diagonal length L of the effective imaging area is that of this effective imaging area. Also, the imaging area used for the reproduction of the image may be variously changed, but when the zoom lens of the present invention is used in an imaging device of such a function, the diagonal length L of the effective imaging area is changed. In such a case, the diagonal length L of the effective imaging area in the present invention is assumed to be the maximum value in a possible area.

Each embodiment mentioned above has a near-infrared cutoff filter placed on the image side of the last lens unit or the optical low-pass filter LF in which a near-infrared cutoff coat is applied to the entrance-side surface thereof. The near-infrared cutoff filter or the near-infrared cutoff coat is designed so that the transmittance at a wavelength of 60 nm is more than 80% and the transmittance at a wavelength of 700 nm is less than 10%. Specifically, it has a multilayer film composed of 27 layers described below. However, its design wavelength is 780 nm.

| Substrate | Material | Physical film thickness (nm) | λ/4 |
|---|---|---|---|
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |

-continued

| Substrate | Material | Physical film thickness (nm) | λ/4 |
|---|---|---|---|
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |

Air

Figure 37:
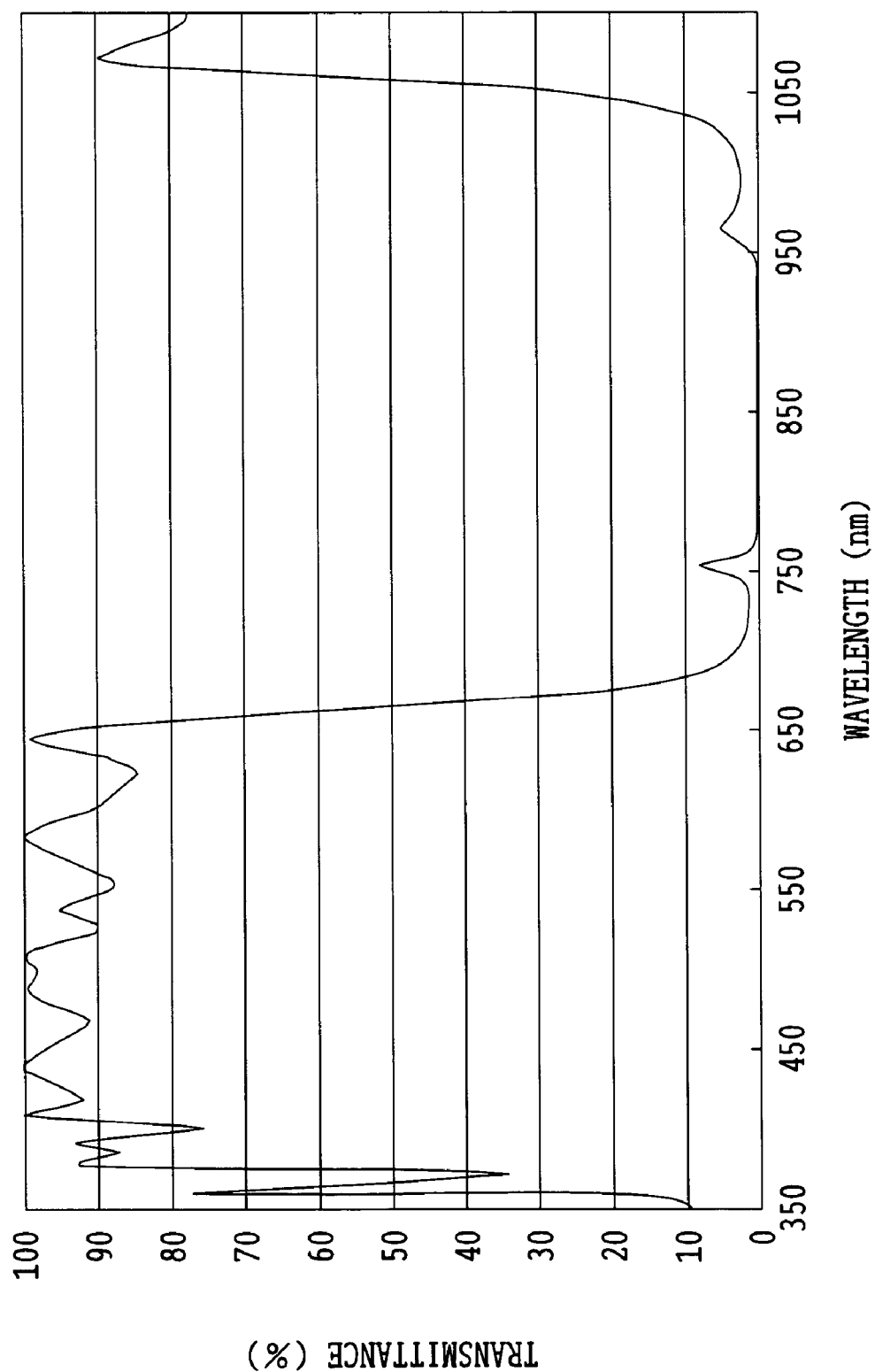
FIG. 37 is a graph showing the transmittance characteristics of an example of a near-infrared sharp-cutoff coat.
Figure 38:
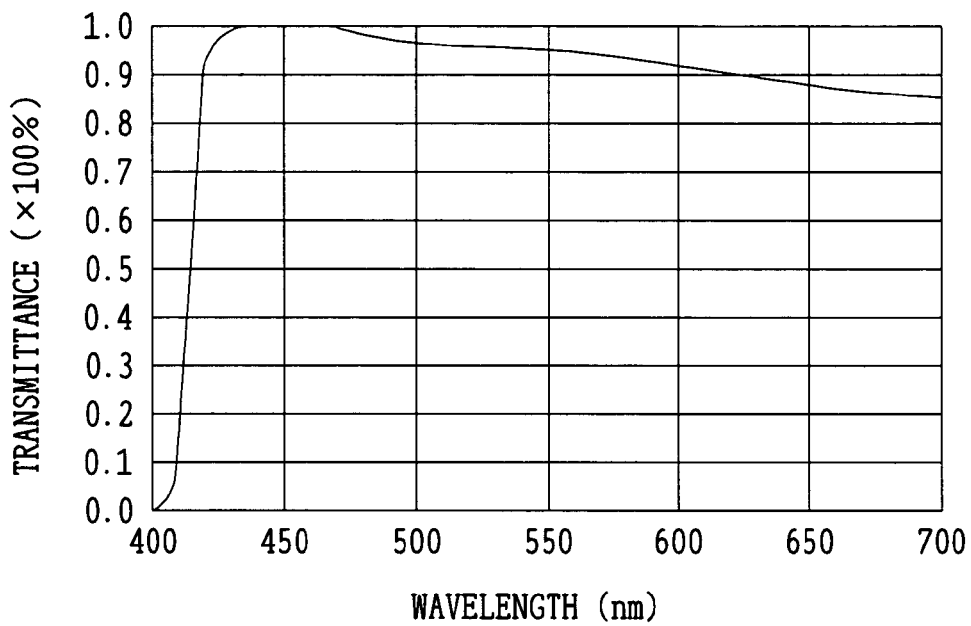
FIG. 38 is a graph showing the transmittance characteristics of an example of a color filter provided on the exit side of a CCD cover glass, or another lens, to which the near-infrared cutoff coat is applied.

The transmittance characteristics of the near-infrared sharp-cutoff coat are as shown in FIG. 37. A color filter reducing the transmission of color in the short-wavelength region such as that shown in FIG. 38 is provided on the side of the exit surface of the low-pass filter LF, or on the side of the exit surface of the CCD cover glass CG, or another lens, to which the near-infrared cutoff coat is applied. Alternatively, a coating is provided to the exit surface. Whereby, color reproducibility of an electronic image is further improved.

Specifically, it is favorable that, owing to this filter or the coating, the ratio of the transmittance between the wavelength of the highest transmittance of wavelengths of 400–700 nm and a wavelength of 420 nm is 15% or more and the ratio of the transmittance between the wavelength of the highest transmittance and a wavelength of 400 nm is 6% or less.

Whereby, a shift between the recognition of the human eye to color and the color of an image produced and reproduced can be reduced. In other words, color on the short-wavelength side which is hard to be recognized with the human vision is easily recognized with the human eye, and the degradation of an image due thereto can be prevented.

If the ratio of the transmittance of the wavelength of 400 nm exceeds 6%, short wavelengths which are hard to be recognized with the human eye will be reproduced to wavelengths which can be recognized. Conversely, if the ratio of the transmittance of the wavelength of 420 nm is below 15%, the reproduction of wavelengths which can be recognized with the human eye becomes difficult and a color balance will be impaired.

A means for limiting such wavelengths brings about an effect by using a complementary mosaic color filter in the imaging system.

In each embodiment mentioned above, as shown in FIG. 38, the coating is made so that the transmittance is 0% at a wavelength of 400 nm and 90% at a wavelength of 420 nm, and the transmittance is the peak of 100% at a wavelength of 440 nm.

By adding the function of the near-infrared sharp-cutoff coat, the color filter is such that, with a transmittance of 99% as a peak, the transmittance is 0% at a wavelength of 400 nm, 80% at a wavelength of 420 nm, 82% at a wavelength of 600 nm, and 2% at a wavelength of 700 nm. Whereby, more true color reproduction is made.

The low-pass filter LF uses three kinds of filter elements which has crystal axes in a horizontal (0°) direction and directions of ±45° at azimuths where an image is projected on the imaging plane, piled along the optical axis. The filter elements are shifted by a μm in the horizontal direction and by SQRT (1/2)× a in the direction of ±45', and thereby moire is suppressed. Here, SQRT refers to the square root.

Figure 39:
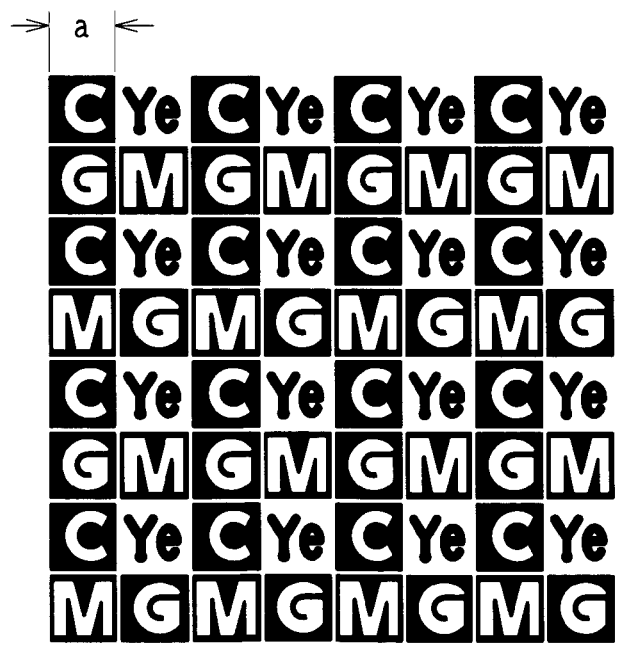
FIG. 39 is a view showing an array of color filter elements of a complementary mosaic color filter.

On the imaging plane I of the CCD, as illustrated in FIG. 39, is provided the complementary mosaic color filter in which four-color filter components of cyan, magenta, yellow, and green are arrayed in a mosaic fashion, corresponding to imaging pixels. These four-color filter components are arrayed in the mosaic fashion so that the number of individual color filter components is almost the same and adjacent pixels do not correspond to the same kind of color filter components. Whereby, more true color reproduction becomes possible.

Specifically, as shown in FIG. 39, it is desirable that the complementary mosaic color filter is constructed with at least four kinds of color filter components and the characteristics of the color filter components are as described below.

A color filter component G of green has the peak of a spectral intensity at a wavelength $G_p$, a color filter component $Y_e$ of yellow has the peak of the spectral intensity at a wavelength $Y_p$, a color filter component C of cyan has the peak of the spectral intensity at a wavelength $C_p$, and a color filter component M of magenta has peaks at wavelengths $M_{P1}$ and $M_{P2}$, satisfying the following conditions:

$$510 \text{ nm} < G_p < 540 \text{ nm}$$

$$5 \text{ nm} < Y_p - G_p < 35 \text{ nm}$$

$$-100 \text{ nm} < C_p - G_p < -5 \text{ nm}$$

$$430 \text{ nm} < M_{P1} < 480 \text{ nm}$$

$$580 \text{ nm} < M_{P2} < 640 \text{ nm}$$

Furthermore, it is favorable for the improvement of color reproducibility that each of the color filter components of green, yellow, and cyan has a spectral intensity of at least 80% at a wavelength of 530 nm with respect to the peak of the spectral intensity, and the color filter component of magenta has a spectral intensity of 10–50% at a wavelength of 530 mm with respect to the peak of the spectral intensity.

Figure 40:
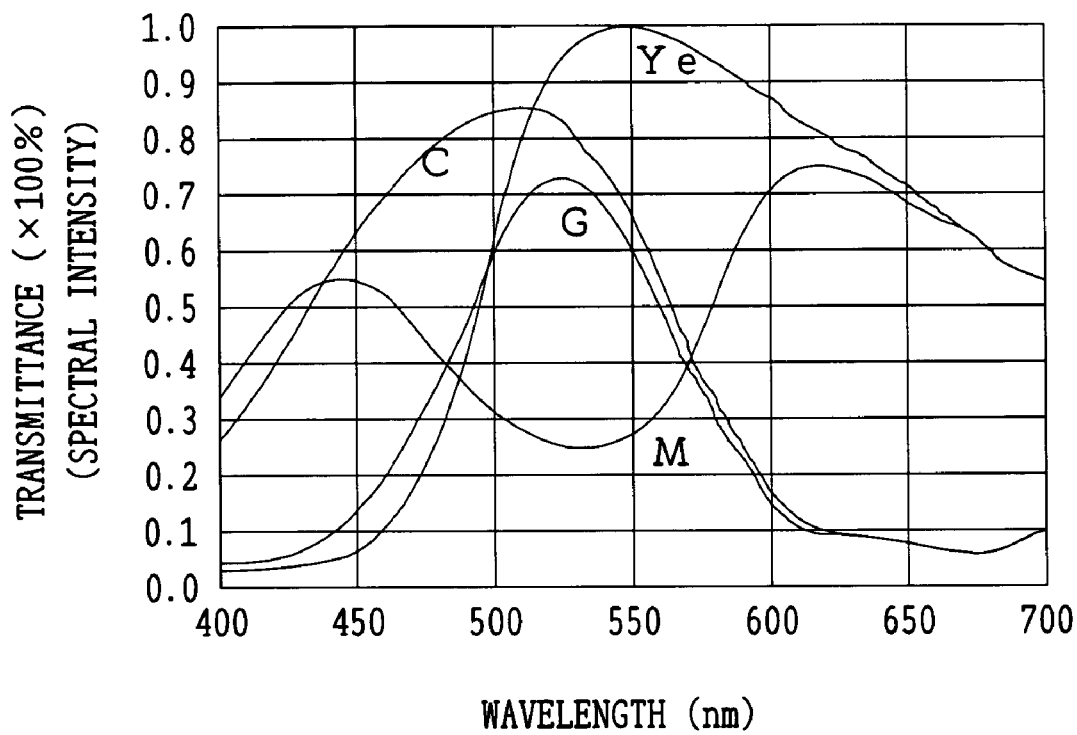
FIG. 40 is a graph showing an example of the wavelength characteristics of the complementary mosaic color filter.

An example of the wavelength characteristics of the color filter components in the above embodiments is shown in FIG. 40. The color filter component G of green has the peak of the spectral intensity at a wavelength of 525 nm. The color filter component $Y_e$ of yellow has the peak of the spectral intensity at a wavelength of 555 nm. The color filter component C of cyan has the peak of the spectral intensity at a wavelength of 510 nm. The color filter component M of magenta has the peaks at wavelengths of 445 nm and 620 nm. The spectral intensities of the color filter components at a wavelength of 530 nm are 99% for G, 95% for $Y_e$, 97% for C, and 38% for M with respect to the peaks of the spectral intensities.

In such a complementary mosaic color filter, colors of the color filter components are electrically converted into signals for R (red), G (green), and B (blue) by a controller, not shown, (or a controller used in a digital camera), through the following signal processing:

luminance signal $$Y = |G + M + Y_e + C| \times \frac{1}{4}$$

color signals $$R - Y = |(M + Y_e) - (G + C)|$$

$$B - Y = |(M + C) - (G + Y_e)|$$

Also, the near-infrared sharp-cutoff coat may be located in any position on the optical path. The number of low-pass filters LF may be two or one as mentioned above.

Figure 41:
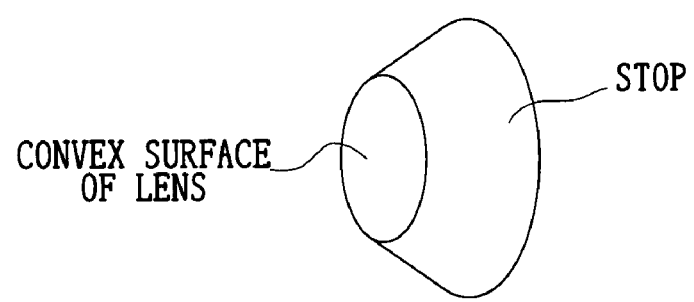
FIG. 41 is an explanatory view showing a modified example of a stop used in the electronic imaging device according to the present invention.

Also, although the stop S is constructed as a flat plate in each embodiment, a black painting member with a circular aperture may be used as another structure. Alternatively, a funnel-shaped stop, such as that shown in FIG. 41, may be covered along the inclination of the convex surface of the lens. A stop may also be provided to a frame supporting a lens.

Each embodiment described above is designed so that the variable transmittance means for adjusting the amount of light in the present invention or a shutter for adjusting light-receiving time can be placed in air spacing on the image side of the third lens unit G3.

Figure 42:
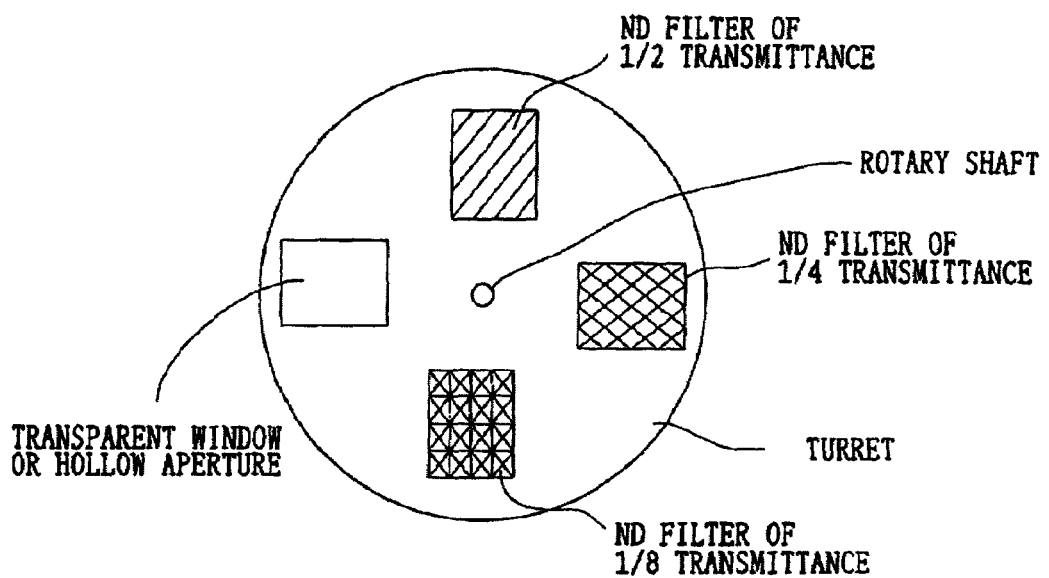
FIG. 42 is an explanatory view showing an example of a light-amount adjusting means used in the electronic imaging device according to the present invention.

The light-amount adjusting means, as shown in FIG. 42, can be used as a turret-like structure in which a transparent window or a hollow aperture, an ND filter of ½ (50%) transmittance, an ND filter of ¼ (25%) transmittance, and others are provided.

Figure 43:
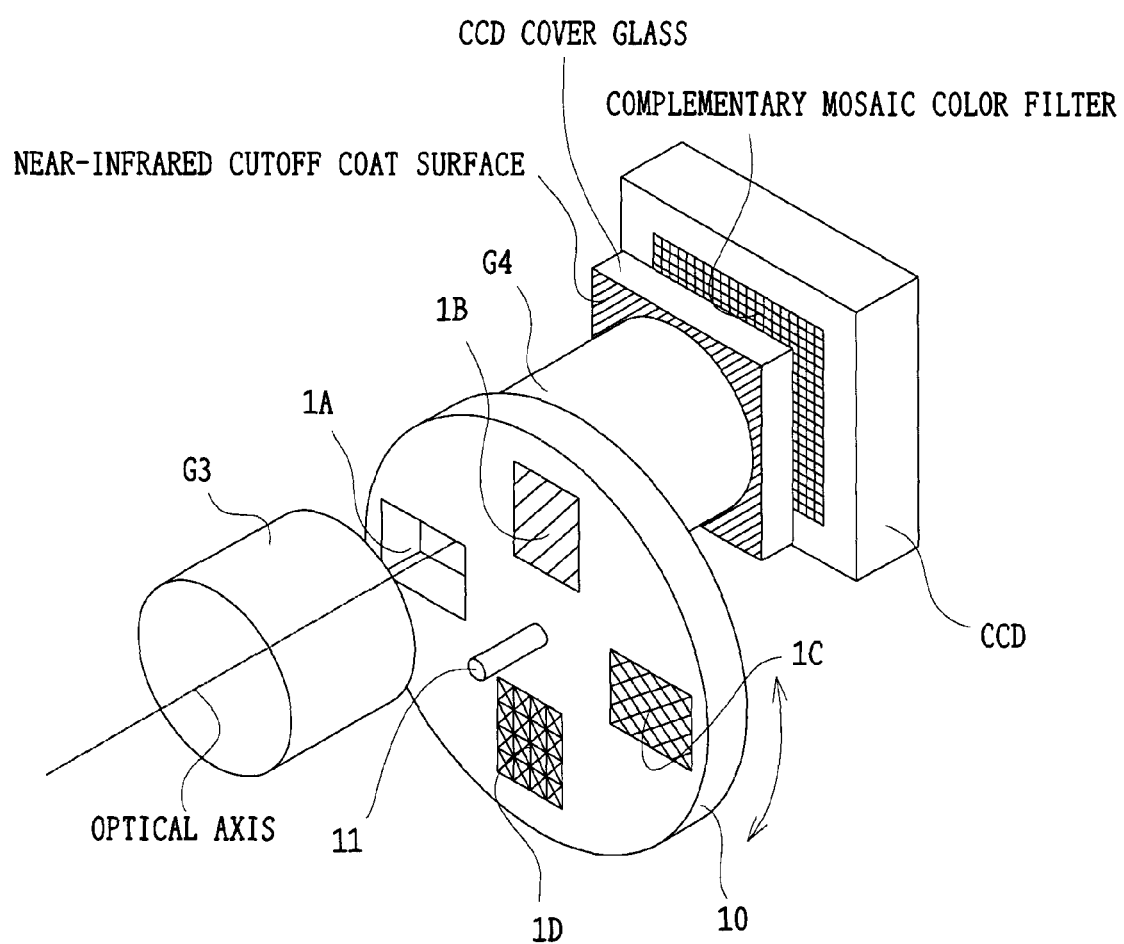
FIG. 43 is a perspective view showing a specific example where the light-amount adjusting means of FIG. 42 is applied to the electronic imaging device according to the present invention.

Its specific example is shown in FIG. 43. In this figure, however, the first and second lens units G1 and G2 are omitted for the sake of convenience. A turret 10, shown in FIG. 42, capable of adjusting brightness at a zero stage, a -first stage, a -second stage, and a -third stage is located on the optical axis between the third and fourth lens units G3 and G4. The turret 10 is provided with aperture sections 1A, 1B, IC, and ID having an ND filter of 100% transmittance, an ND filter of 50% transmittance, an ND filter of 25% transmittance, and an ND filter of 12.5% transmittance, respectively, with respect to the transmittance at a wavelength 550 nm in an area transmitting an effective light beam.

The turret 10 is rotated around a rotary axis 11 and any aperture section is located on the optical axis between the lens units which is spacing different from the position of the stop. Whereby, the light-amount adjustment is made.

Figure 44:
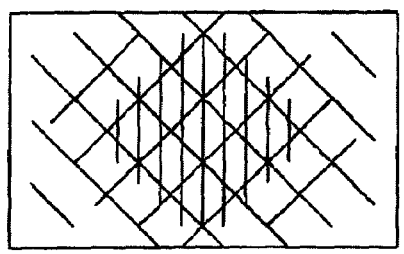
FIG. 44 is an explanatory view showing another example of the light-amount adjusting means applicable to the electronic imaging device according to the present invention.

For the light-amount adjusting means, as shown in FIG. 44, a filter surface in which the light-amount adjustment is possible may be provided so that variation in the amount of light is suppressed. The filter surface of FIG. 44 is constructed so that the transmittance is concentrically different and the amount of light decreases progressively in going to the center.

The filter surface may be placed and constructed so that the amount of light at the center is ensured in preference to others with respect to a dark object to uniform the transmittance, and variation in brightness is compensated with respect to a bright object alone.

In view of the slim design of the entire device, an electro-optical element which is capable of electrically controlling the transmittance can be used.

Figure 45:
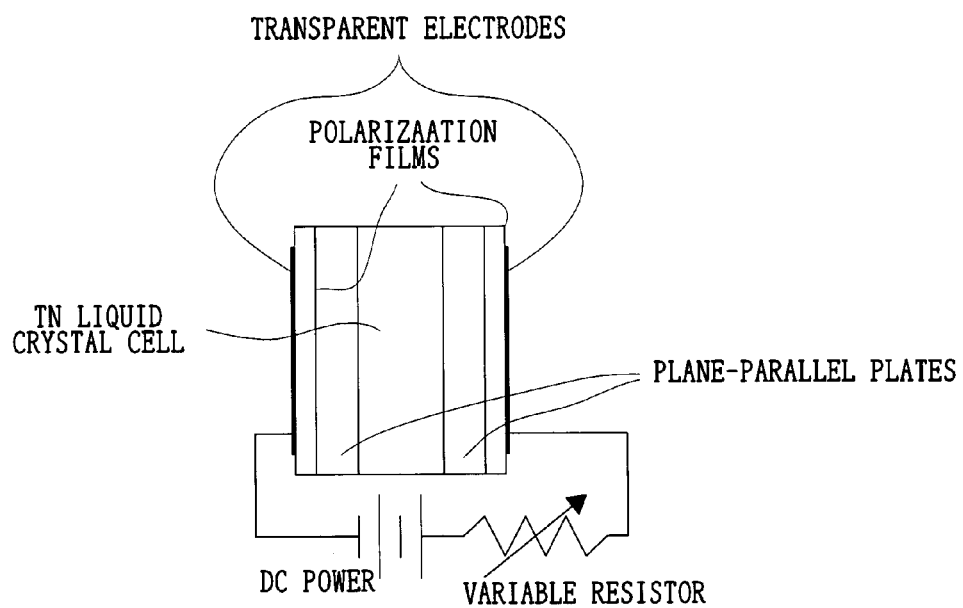
FIG. 45 is an explanatory view showing still another example of the light-amount adjusting means applicable to the electronic imaging device according to the present invention.

The electro-optical element, for example, as illustrated in FIG. 45, can be constructed with a liquid crystal filter in which a TN liquid crystal cell is sandwiched between two plane-parallel plates, each having a polarization film which coincides in polarization direction with a transparent electrode, and voltages applied to the transparent electrodes are properly changed to thereby vary the polarization direction in the liquid crystal and adjust the amount of transmission light.

In this liquid crystal filter, the voltage applied to the TN liquid crystal cell is adjusted through a variable resistor, and thereby the orientation of the TN liquid crystal cell is changed.

Instead of various filters adjusting the transmittance, such as those described above, the shutter adjusting the light-receiving time may be provided as the light-amount adjusting means. Alternatively, the shutter may be placed together with the filters.

The shutter may be constructed as a focal-plane shutter with moving blades situated close to the image plane, or a two-blade lens shutter, a focal-plane shutter, or a liquid crystal shutter, provided on the optical path.

Figure 46A:
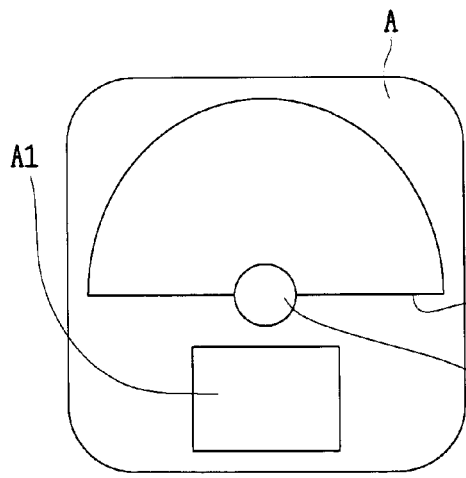
FIG. 46A is a view schematically showing the back side of a rotary focal-plane shutter adjusting light-receiving time, applicable to the electronic imaging device according to the present invention.
Figure 46B:
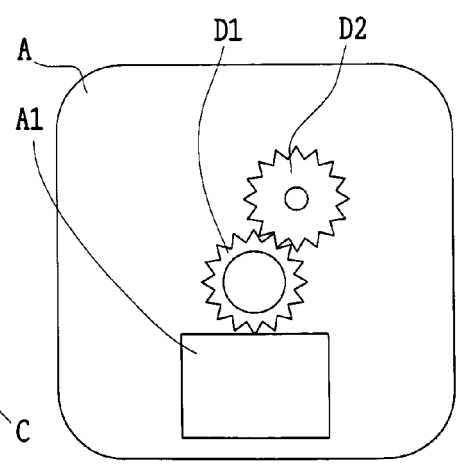
FIG. 46B is a view schematically showing the right side of the rotary focal-plane shutter of FIG. 46A.
Figure 47A:
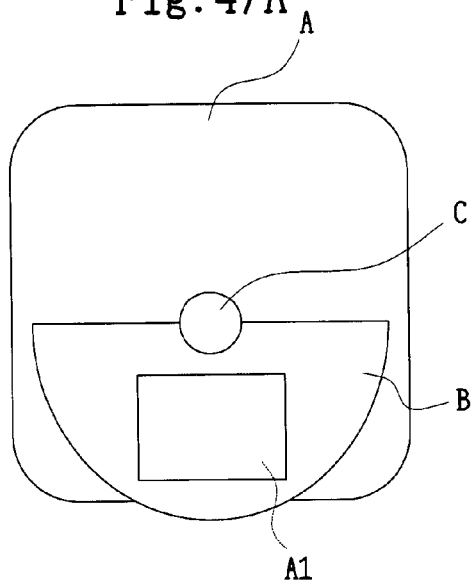
FIG. 47A is a view showing a state where an exposure aperture is completely covered by the blade of the rotary focal-plane shutter of FIG. 46A.
Figure 47B:
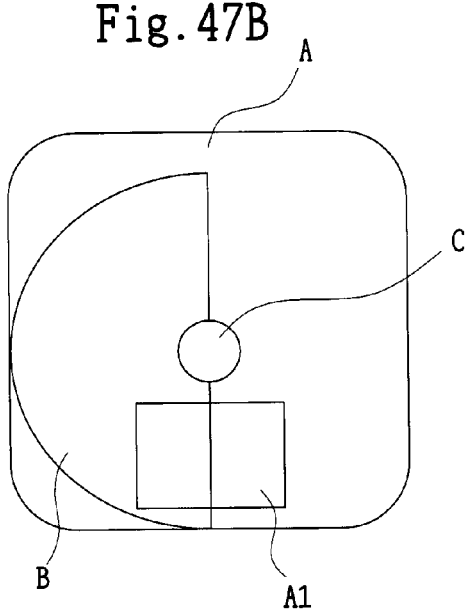
FIG. 47B is a view showing a state where the left half of the exposure aperture is covered by the blade of the rotary focal-plane shutter of FIG. 46A.
Figure 47C:
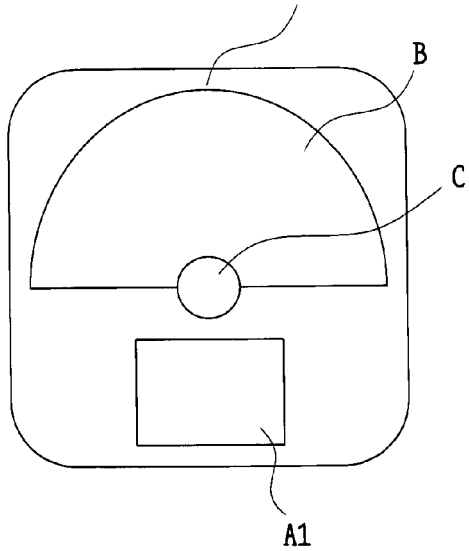
FIG. 47C is a view showing a state where the exposure aperture is fully opened by the blade of the rotary focal-plane shutter of FIG. 46A.
Figure 47D:
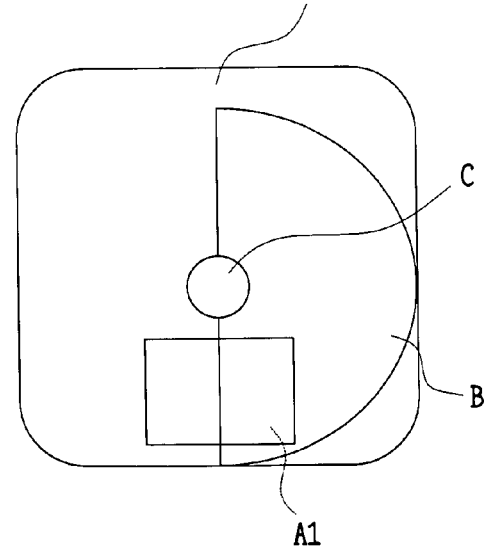
FIG. 47D is a view showing a state where the right half of the exposure aperture is covered by the blade of the rotary focal-plane shutter of FIG. 46A.

FIGS. 46A and 46B show an example of a rotary focal-plane shutter which is one focal-plane shutter adjusting the light-receiving time, applicable to the electronic imaging device of each embodiment in the present invention. FIGS. 47A–47D show states where a rotary shutter blade is turned.

In FIGS. 46A and 46B, reference symbol A represents a shutter base plate, B represents a rotary shutter blade, C represents a rotary shaft of the rotary shutter blade, and D1 and D2 represent gears.

The shutter base plate A is constructed so that it is placed immediately before the image plane, or on an arbitrary optical path, in the electronic imaging device of the present invention. The shutter base plate A is provided with an aperture A1 transmitting the effective light beam of the optical system. The rotary shutter blade B is configured into a nearly semicircular shape. The rotary shaft C of the rotary shutter blade B is constructed integrally with the rotary shutter blade B. The rotary shaft C is turned in regard of the shutter base plate A. The rotary shaft C is connected to the gears D1 and D2 provided on the right side of the shutter base plate A. The gears D1 and D2 are connected to a motor, not shown.

By the drive of the motor, not shown, the rotary shutter blade B is turned sequentially in the order of FIGS. 47A–47D, with the rotary shaft C as a center, through the gears D1 and D2 and the rotary shaft C. The rotary shutter blade B is turned to thereby close and open the aperture A1 of the shutter base plate A, and plays the role of the shutter.

A shutter speed is adjusted by changing the turning speed of the rotary shutter blade B.

In the disclosure so far, reference has been made to the light-amount adjusting means. In the embodiments of the present invention, such a shutter or variable transmittance filter is placed, for example, at the fifteenth surface of each of the first and second embodiments. The light-amount adjusting means may be located at another position if this position is different from that of the aperture stop.

The electrooptical element may also be used as the shutter. This is more favorable for a reduction in the number of parts and compactness of the optical system.

The electronic imaging device using such a path bending zoom lens in the present invention can be used in the imaging device in which an object image is formed by the imaging optical system such as the zoom lens, and this image is received by an image-forming element, such as the CCD or a silver halide film, to photograph, notably in a digital camera, a video camera, a personal computer or a telephone which is an example of an information processor, or a cellular phone which is handy to carry. Its embodiment is shown below.

Figure 48:
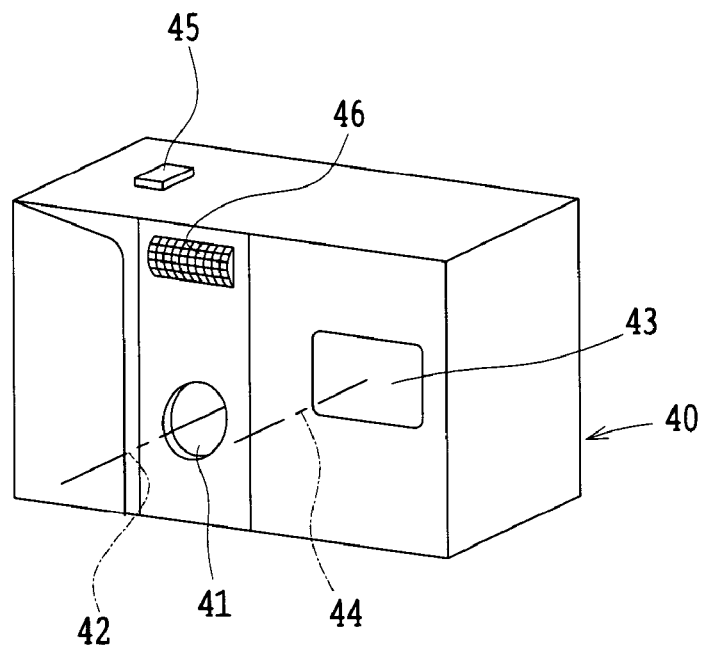
FIG. 48 is a perspective front view showing a digital camera incorporating the path bending zoom lens of the present invention in a photographing optical system.
Figure 49:
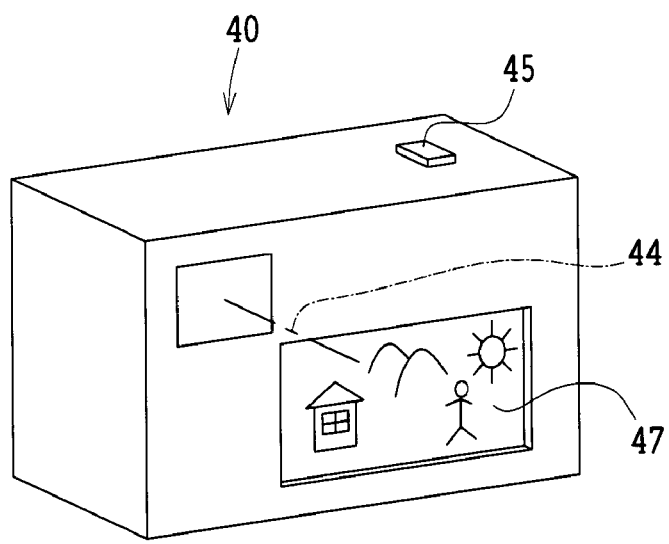
FIG. 49 is a perspective rear view showing the digital camera of FIG. 48.
Figure 50:
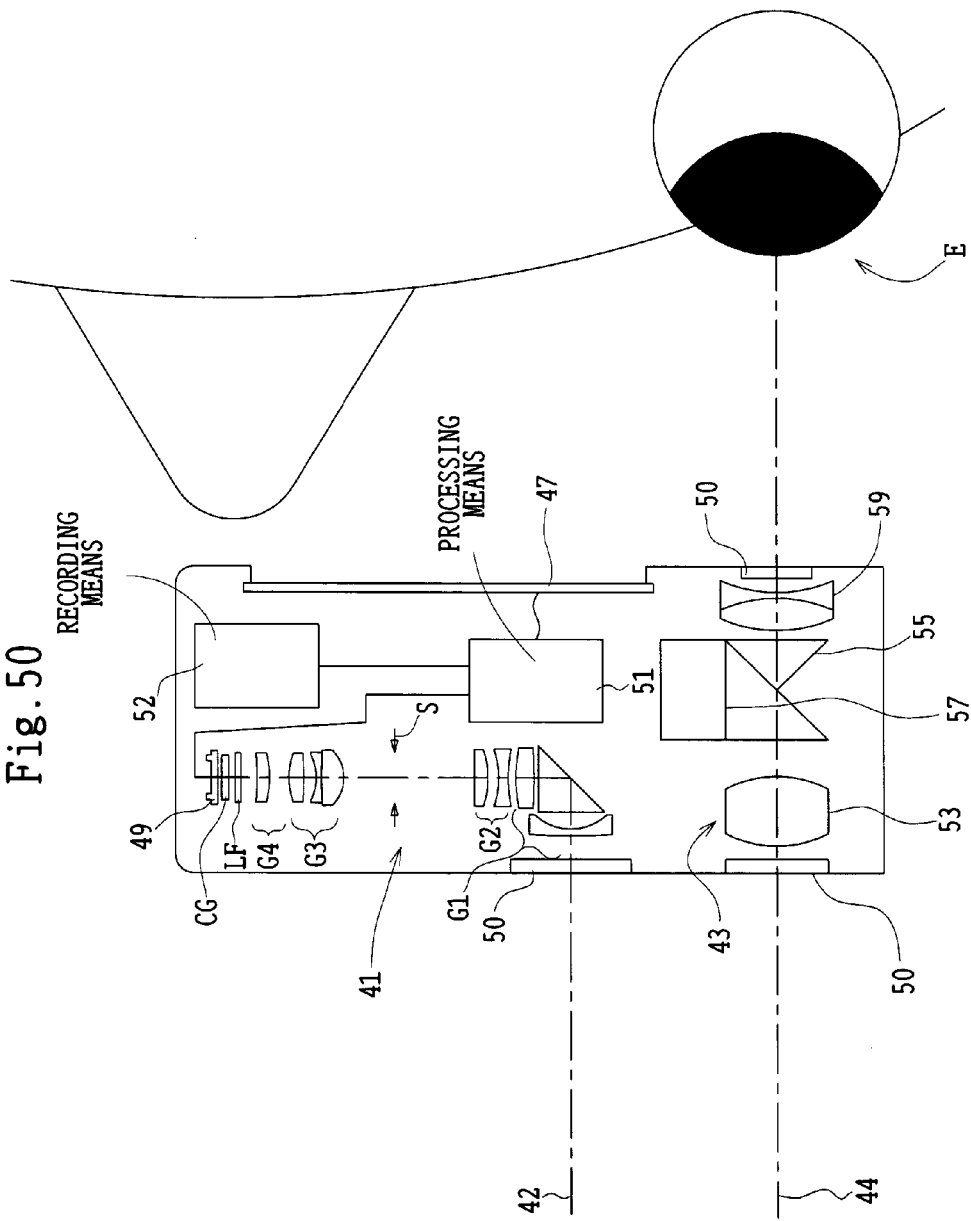
FIG. 50 is a sectional view showing the internal structure of the digital camera of FIG. 48.

FIGS. 48–50 show a digital camera in which the path bending zoom lens of the present invention is incorporated in an photographing optical system 41. In the digital camera of FIG. 50, an imaging optical path is bent in a longitudinal direction of a finder, and an observer's eye viewed from the upper side is shown.

A digital camera 40, in this example, includes the photographing optical system 41 having a photographing optical path 42, a finder optical system 43 having a finder optical path 44, a shutter 45, a flash lamp 46, and a liquid crystal display monitor 47. When the shutter 45 provided on the upper portion of the camera 40 is pushed, photographing is performed through the photographing optical system 41, for example, the path bending zoom lens of the first embodiment.

An object image formed by the photographing optical system 41 is provided on the imaging plane of a CCD 49 through the near-infrared cutoff coat applied to the near-infrared cutoff filter, the CCD cover glass, or another lens.

The object image received by the CCD 49 is displayed on the liquid crystal display monitor 47 provided on the back face of the camera as an electronic image through a processing means 51. A recording means 52 is connected to the processing means 51 and a photographed electronic image can be recorded. Also, the recording means 52 may be provided to be independent of the processing means 51, or may be constructed so that the image is electronically recorded and written by a floppy (trademark) disk, memory card, or MO. A silver halide film camera using a silver halide film instead of the CCD 49 may be employed.

A finder objective optical system 53 is located on the finder optical path 44. An object image formed by the finder objective optical system 53 is provided on a field frame 57 of a Porro prism 55 which is an image erecting member. Behind the Porro prism 55, an eyepiece optical system 59 introducing an erect image into an observer's eye E is located. Also, cover members 50 are placed on the entrance side of the photographing optical system 41 and the finder objective optical system 53 and on the exit side of the eyepiece optical system 59.

The digital camera 40 constructed as mentioned above has an effect on a slim design thereof by bending the optical path in the direction of the major side. Since the photographing optical system 41 is a zoom lens which has a wide angle of view and a high variable magnification ratio, is favorable in aberration and bright, and is provided with a long back focal distance that the filter can be placed, high performance and a cost reduction can be realized.

Also, the photographing optical path of the digital camera 40 may be bent in the direction of the minor side of the finder. In this case, a stroboscopic lamp (or the flash lamp) is placed in the upper direction of the entrance surface of a photographic lens to bring about the layout that the influence of shading caused in strobo-photography of a person can be lessened.

In FIG. 50, plane-parallel plates are used as the cover members 50, but lenses with powers may be used.

Figure 51:
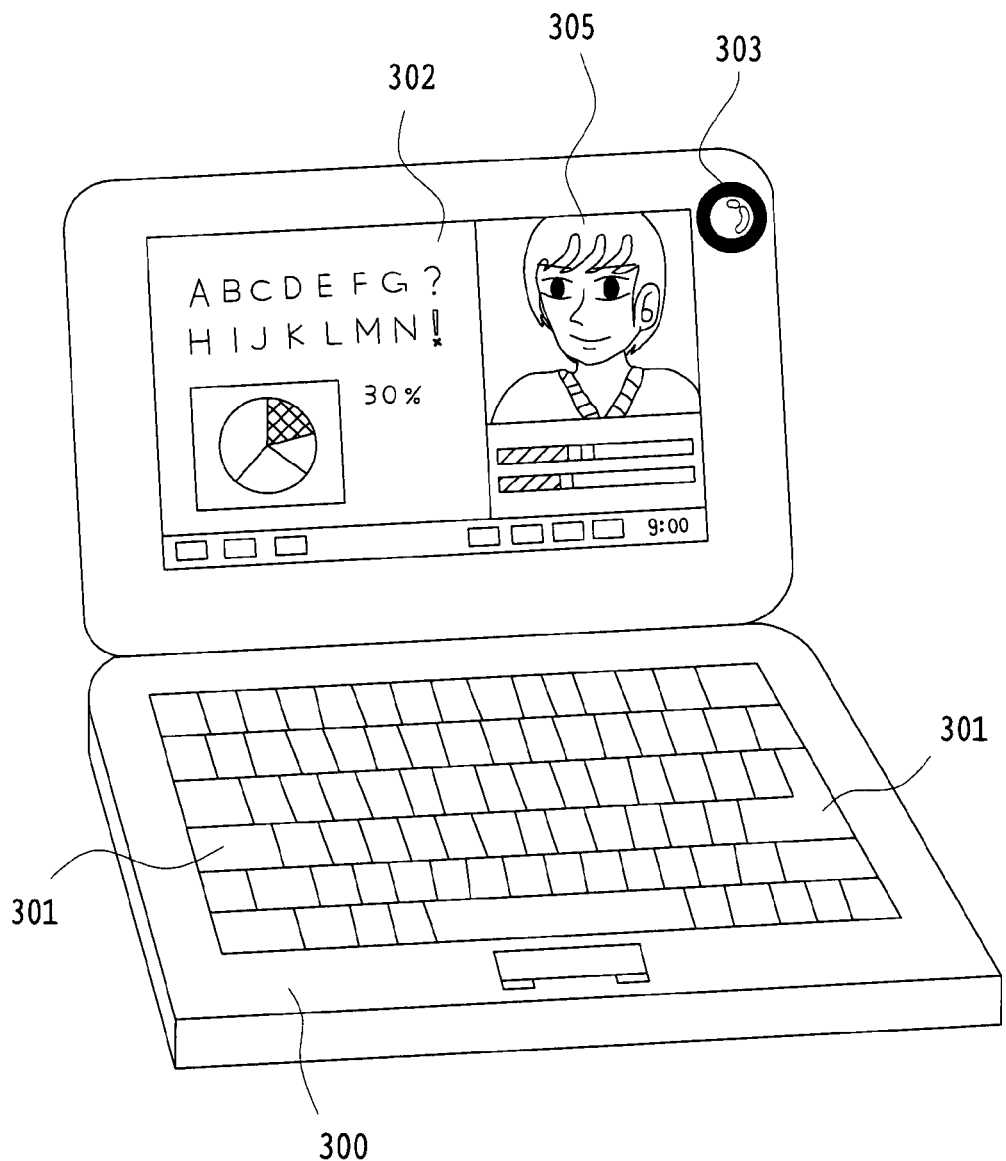
FIG. 51 is a perspective front view showing a personal computer in which the path bending zoom lens of the present invention is incorporated as an objective optical system.
Figure 52:
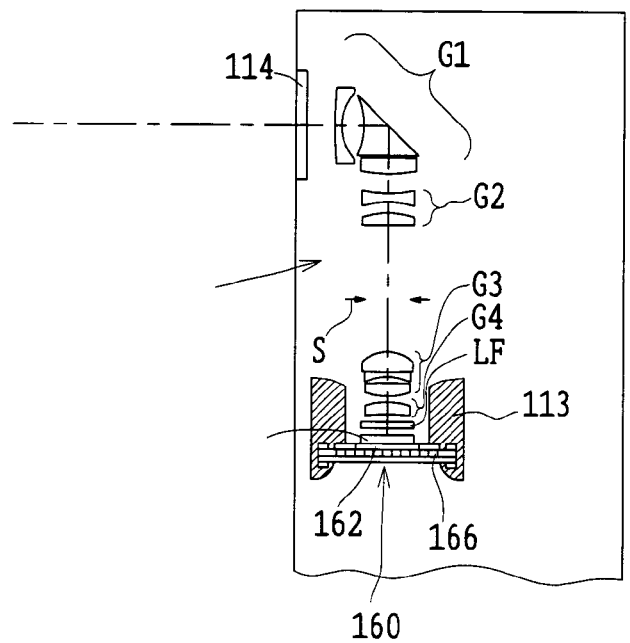
FIG. 52 is a sectional view showing the photographing optical system incorporated in the personal computer of FIG. 51.
Figure 53:
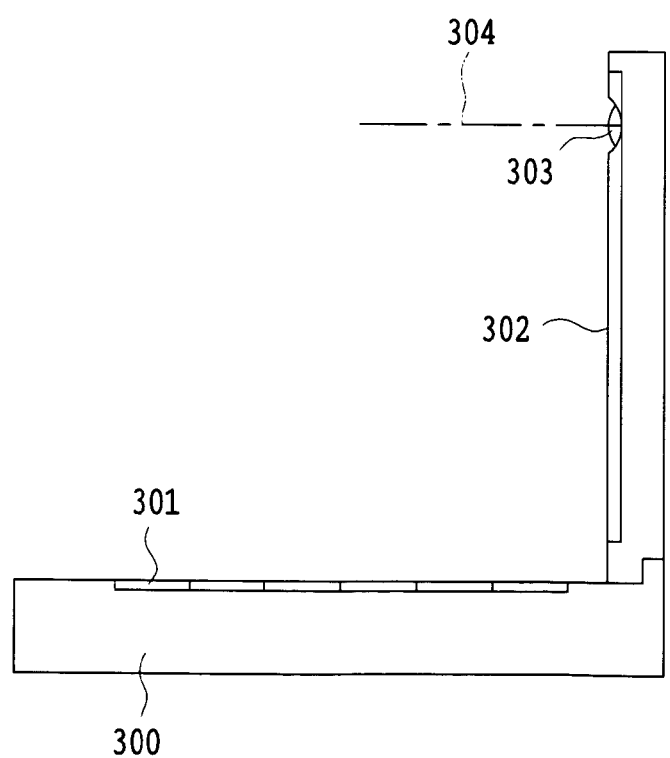
FIG. 53 is a side view showing the personal computer of FIG. 51.

Subsequently, a personal computer of an example of an information processor in which the path bending zoom lens is incorporated as the objective optical system is shown in FIGS. 51–53.

As shown in FIGS. 51–53, a personal computer 300 has a keyboard 301 for inputting information from the exterior by an operator; an information processing means or recording means, not shown; a monitor 302 displaying information for the operator, and an photographing optical system 303 for photographing the operator himself or a surrounding image.

Here, the monitor 302 may be a transmission-type liquid crystal display element illuminated with backlight from the back face, a reflection-type liquid crystal display element reflecting light from the front for display, or a CRT display. In these figures, the photographing optical system 303 is housed in the monitor 302 upper-right, but it may be located, not to speak of this place, on the periphery of the monitor 302 or the keyboard 301.

The photographing optical system 303 has an objective lens 112 including, for example, the path bending zoom lens of the first embodiment of the present invention and an imaging element chip 162 receiving an image. These are housed in the personal computer 300.

Here, the cover glass CG is additionally cemented to the chip 162, and these are integrally constructed as an imaging unit 160, which is fitted into the rear end of a lens frame 113 of the objective lens 112 and can be mounted in a single operation. Therefore, the alignment of the objective lens 112 and the chip 162 and the adjustment of face-to-face spacing are not required, and assembly is simple. At the top (not shown) of the lens frame 113, a cover glass 114 for protecting the objective lens 112 is placed. Also, the driving mechanism of the zoom lens in the lens frame 113 is not shown in the figure.

An object image received by the chip 162 is input into the processing means of the personal computer 300 through a terminal 166 and is displayed as an electronic image on the monitor 302. In FIG. 51, a photographed image 305 of the operator is shown as an example. The image 305 can also be displayed on the personal computer of his communication mate from a remote place, by the processing means, through the internet or the telephone.

Figure 54A:
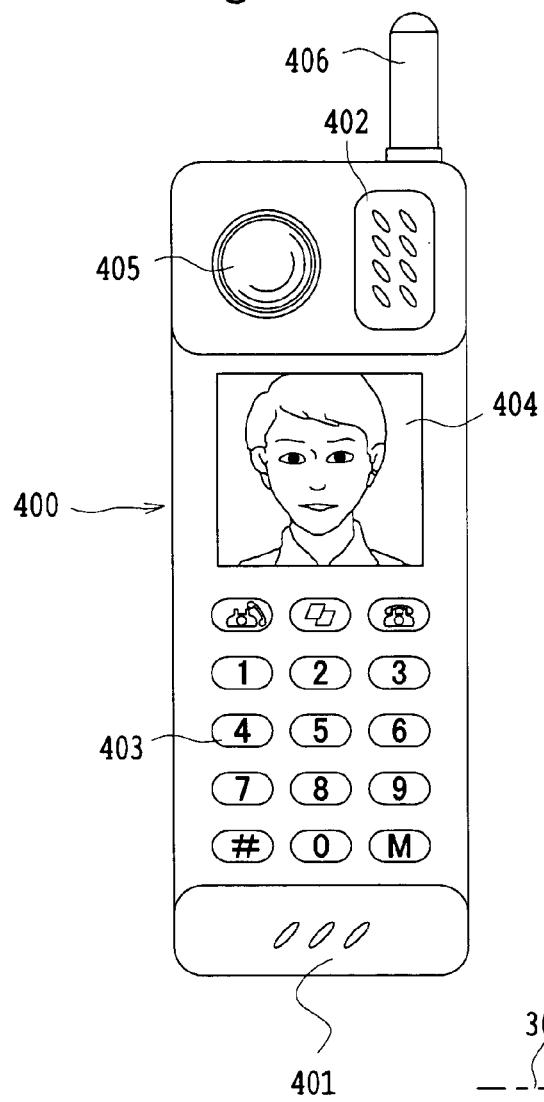
FIG. 54A is a front view showing a cellular phone of an example of an information processor in which the path bending zoom lens of the present invention is incorporated as the photographing optical system.
Figure 54B:
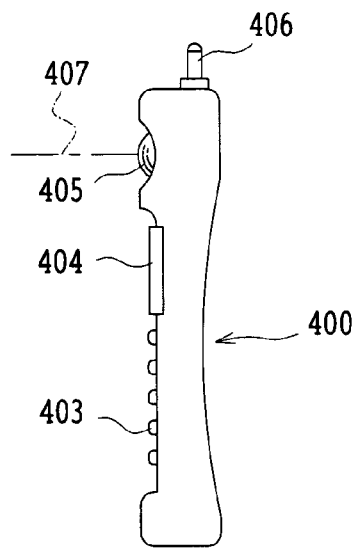
FIG. 54B is a side view showing the cellular phone of FIG. 54A.
Figure 54C:
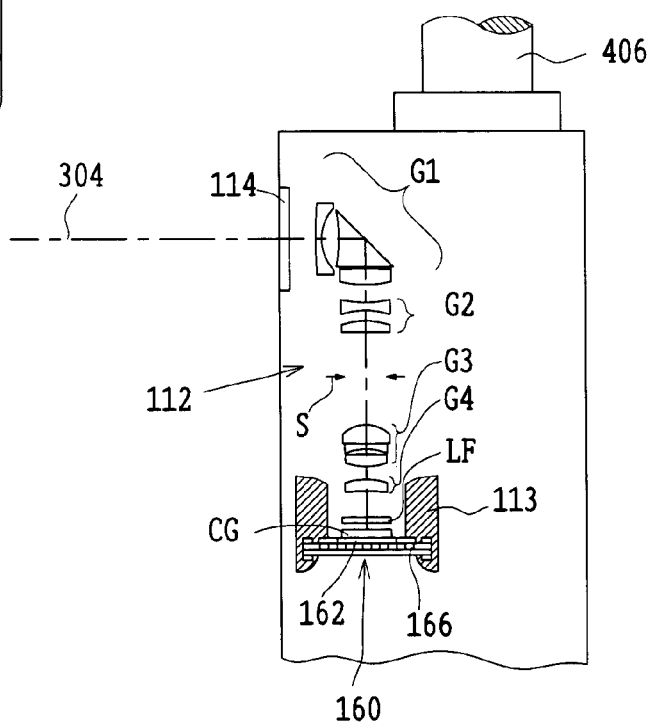
FIG. 54C is a sectional view showing the photographing optical system incorporated in the cellular phone of FIG. 54A.

FIGS. 54A–54C show a telephone which is an example of the information processor in which the path bending zoom lens of the present invention is housed as the photographing optical system, notably a cellular phone which is handy to carry.

A cellular phone 400, as shown in these figures, includes a microphone section 401 inputting an operator's voice as information; a speaker section 402 outputting the voice of a communication mate; input dials 403 in which an operator inputs information; a monitor 404 displaying information, such as photographing images of the operator himself and the communication mate, and telephone numbers; a photographing optical system 405; an antenna 406 transmitting and receiving electric waves for communication; and a processing means (not shown) processing image information, communication information, and an input signal. Here, the monitor 404 is a liquid crystal display element. In these figures, the arrangement of individual parts is not limited to the above description. The photographing optical system 405 has the objective lens 112 including, for example, the path bending zoom lens of the first embodiment in the present invention, located on a photographing optical path 407, and the chip 162 receiving the object image. These are incorporated in the cellular phone 400.

Here, the cover glass CG is additionally cemented to the chip 162, and these are integrally constructed as the imaging unit 160, which is fitted into the rear end of the lens frame 113 of the objective lens 112 and can be mounted in a single operation. Therefore, the alignment of the objective lens 112 and the chip 162 and the adjustment of face-to-face spacing are not required, and assembly is simple. At the top (not shown) of the lens frame 113, the cover glass 114 for protecting the objective lens 112 is placed. Also, the driving mechanism of the zoom lens in the lens frame 113 is not shown in the figure.

An object image received by the chip 162 is input into the processing means, not shown, through the terminal 166 and is displayed as the electronic image on either the monitor 404 or the monitor of the communication mate, or both. Also, the processing means includes a signal processing function that when the image is transmitted to the communication mate, the information of the object image received by the chip 162 is converted into a transmittable signal.

What is claimed is:

1. A zoom lens comprising:
   a first lens unit fixed when a magnification of the zoom lens is changed; and
   at least two positive lens units arranged on an image side of the first lens unit,
   relative spacings between individual lens units being varied when the magnification is changed,
   wherein the first lens unit has a prism containing a reflecting surface at a most object side position, an entrance surface of the prism is configured as a concave surface directed toward an object side, and the concave surface is an aspherical surface that divergence is impaired progressively in separating from an optical axis.

2. A zoom lens according to claim 1, wherein the first lens unit has only a positive lens on the image side of the prism.

3. A zoom lens according to claim 1, wherein, except for a normally fixed lens unit, a most image-side lens unit is moved and thereby focusing is performed.

4. A zoom lens comprising:
   a first lens unit fixed when a magnification of the zoom lens is changed;
   an aperture stop located on an image side of the first lens unit; and
   a lens unit interposed between the first lens unit and the aperture stop,
   wherein the first lens unit has a prism containing a reflecting surface at a most object side position, an entrance surface of the prism is configured as a concave surface directed toward an object side, the concave surface is an aspherical surface that divergence is impaired progressively in separating from an optical axis, and the lens unit is moved in only one direction when the magnification is changed, varying from a wide-angle position to a telephoto position, in focusing of an infinite object point.

5. A zoom lens according to claim 4, wherein the lens unit interposed between the first lens unit and the aperture stop comprises, in order from the object side, a negative lens and a positive lens.

6. A zoom lens according to claim 4, wherein the aperture stop is substantially fixed with respect to an image plane.

7. A zoom lens comprising, in order from the object side:
   a first lens unit with positive refracting power;
   a second lens unit with negative refracting power;
   an aperture stop substantially fixed with respect to an imaging plane;
   a lens unit with positive refracting power; and
   a last lens unit with positive refracting power,
   wherein the first lens unit comprises a prism having a path entrance surface, a reflecting surface for bending a path, and an exit surface, and a rear-side lens subunit, and wherein when a magnification of the zoom lens is changed, the first lens unit remains fixed and the second lens unit and the lens unit with positive refracting power are moved, and the lens unit with positive refracting power is moved in only one direction when the magnification is changed, varying from a wide-angle position to a telephoto position, in focusing of an infinite object point.

8. A zoom lens according to claim 7, wherein the lens unit with positive refracting power has at least one cemented lens component made up of a positive lens and a negative lens.

9. A zoom lens according to claim 7, wherein the lens unit with positive refracting power is first placed on an image side of the aperture stop.

10. A zoom lens according to claim 7, wherein the lens unit with positive refracting power is a third lens unit from an object side and includes, in order from the object side, a cemented lens component made up of a positive lens and a negative lens and a single positive lens.

11. A zoom lens according to claim 7, wherein the lens unit with positive refracting power is a third lens unit from an object side and includes, in order from the object side, a single positive lens and a cemented lens component made up of a positive lens and a negative lens.

12. A zoom lens according to claim 7, wherein the lens unit with positive refracting power is a fourth lens unit from an object side and includes only a cemented lens component made up of a positive lens and a negative lens.

13. A zoom lens according to claim 7, wherein the second lens unit comprises, in order from the object side, a negative lens and a positive lens.

14. A zoom lens according to claim 7, wherein a total number of positive lens units included in the zoom lens is three.

15. A zoom lens according to claim 7, wherein a total number of positive lens units included in the zoom lens is four, the lens unit with positive refracting power is a fourth lens unit from an object side, and each of the lens units with positive refracting power and the last lens unit is constructed of a cemented lens component made up of a positive lens and a negative lens.

16. An electronic imaging device comprising:
a zoom lens; and
an image sensor located at a position of an image plane of the zoom lens,
the zoom lens comprising:
a first lens unit fixed when a magnification of the zoom lens is changed; and
at least two positive lens units arranged on an image side of the first lens unit,
relative spacings between individual lens units being varied when the magnification is changed,
wherein the first lens unit has a prism containing a reflecting surface at a most object-side position, an entrance surface of the prism is configured as a concave surface directed toward an object side, and the concave surface is an aspherical surface that divergence is impaired progressively in separating from an optical axis.

17. A zoom lens comprising, in order from the object side:
a first lens unit with positive refracting power;
a second lens unit with negative refracting power;
an aperture stop substantially fixed with respect to an imaging plane;
a lens unit with positive refracting power; and
a last lens unit with positive refracting power,
wherein when a magnification of the zoom lens is changed, the first lens unit remains fixed and the second lens unit and the lens unit with positive refracting power are moved, and the lens unit with positive refracting power is moved in only one direction when the magnification is changed, varying from a wide-angle position to a telephoto position, in focusing of an infinite object point,
wherein the lens unit with positive refracting power is a third lens unit from an object side and includes, in order from the object side, a cemented lens component made up of a positive lens and a negative lens and a single positive lens,
wherein the first lens unit has a prism having a reflecting surface for bending a path of rays, and a positive lens arranged on an image side of the prism, and
wherein only the positive lens of the first lens unit is arranged between the prism and the second lens unit.

18. A zoom lens comprising, in order from the object side:
a first lens unit with positive refracting power;
a second lens unit with negative refracting power;
an aperture stop substantially fixed with respect to an imaging plane;
a lens unit with positive refracting power; and
a last lens unit with positive refracting power,
wherein when a magnification of the zoom lens is changed, the first lens unit remains fixed and the second lens unit and the lens unit with positive refracting power are moved, and the lens unit with positive refracting power is moved in only one direction when the magnification is changed, varying from a wide-angle position to a telephoto position, in focusing of an infinite object point, and
wherein the lens unit with positive refracting power is a fourth lens unit from an object side and includes only a cemented lens component made up of a positive lens and a negative lens.

\* \* \* \* \*